United States Patent
Sasaki et al.

(10) Patent No.: US 7,163,007 B2
(45) Date of Patent: Jan. 16, 2007

(54) CONTROL SYSTEM FOR INTERNAL COMBUSTION ENGINE

(75) Inventors: Shizuo Sasaki, San Antonio, TX (US); Junmin Wang, San Antonio, TX (US); Gary D Neely, San Antonio, TX (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/178,372

(22) Filed: Jul. 12, 2005

(65) Prior Publication Data

US 2006/0011180 A1  Jan. 19, 2006

(30) Foreign Application Priority Data

| Jul. 14, 2004 | (JP) | ............................. 2004-207813 |
| Jan. 21, 2005 | (JP) | ............................. 2005-013794 |
| Jan. 26, 2005 | (JP) | ............................. 2005-017745 |

(51) Int. Cl.
  *F02D 41/30* (2006.01)
  *F02M 51/00* (2006.01)

(52) U.S. Cl. ..................................... 123/673; 123/480

(58) Field of Classification Search ........ 123/672–674, 123/679, 435–436, 687, 480, 568.21; 701/103–105, 701/108–109; 73/118.1, 118.2; 60/285
See application file for complete search history.

(56) References Cited

U.S. PATENT DOCUMENTS 6,508,241 B1 * 1/2003 Miller et al. ................ 123/672

6,993,909 B1 * 2/2006 Matsunaga et al. ........ 60/605.2
2005/0114011 A1 * 5/2005 Itoyama ....................... 701/108

FOREIGN PATENT DOCUMENTS

| JP | 10-103162 | * | 4/1998 |
| JP | 2006-29171 | * | 2/2006 |

* cited by examiner

*Primary Examiner*—Hai Huynh
(74) *Attorney, Agent, or Firm*—Arent Fox PLLC

(57) ABSTRACT

A control system for an internal combustion engine, which is capable of optimally controlling fuel injection by an injector even in a transient state of the engine. An ECU 2 of the engine provided with an EGR system (14) controls the amount (Fa) of air drawn into cylinders (3a) via an intake system (4). An air flow sensor (27) detects the intake air amount (Fa). The ECU 2 estimates a flow rate (Fe_hat) of EGR gases according to response delay of recirculation of the EGR gases by the EGR system (14), estimates the amount (mo2) of oxygen existing in the cylinder (3a), based on the detected intake air amount (Fa) and the estimated flow rate (Fe_hat) of the EGR gases, determines a fuel injection parameter (Q*) based on the engine speed (Ne) and the estimated in-cylinder oxygen amount (mo2), and controls an injector (6) based on the determined fuel injection parameter (Q*).

14 Claims, 30 Drawing Sheets

F I G. 1 3
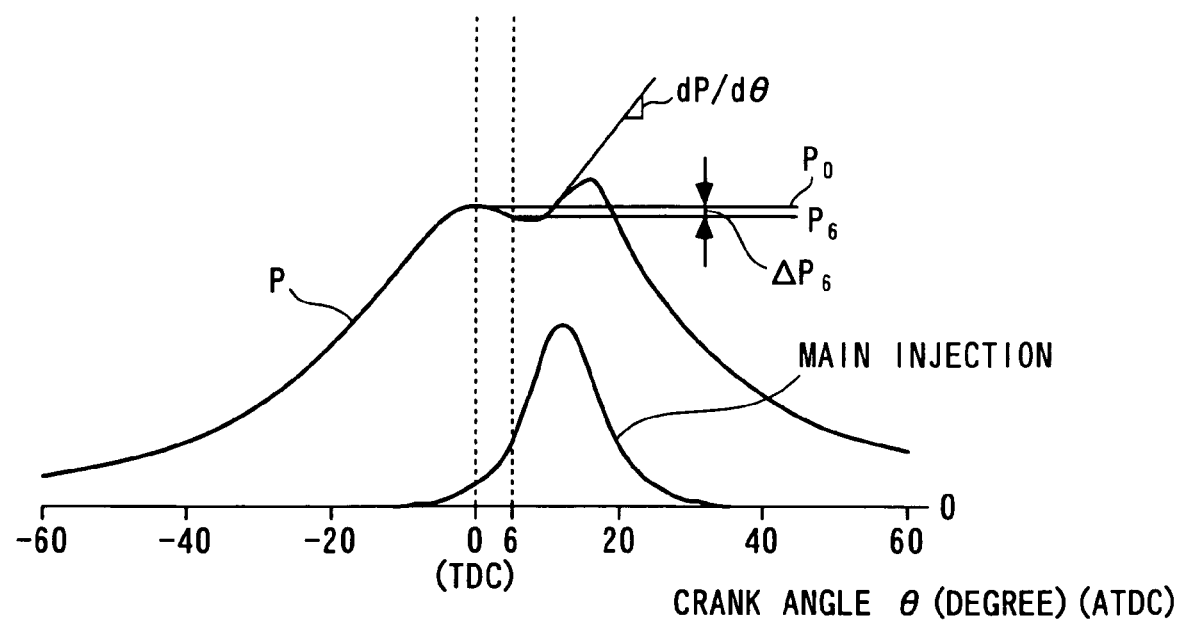

CONTROL SYSTEM FOR INTERNAL COMBUSTION ENGINE

BACKGROUND OF THE INVENTION

1. Field of the Invention

This invention relates to a control system for an internal combustion engine provided with an exhaust recirculation (EGR) system for recirculating part of exhaust gases to an intake system, and more particularly to a control system of the type that performs control of fuel injection by an injector, etc.

2. Description of the Related Art

Conventionally, a control system of this kind has been proposed in Japanese Laid-Open Patent Publication (Kokai) No. H08-61112. In the control system, the amount Ga of intake air drawn into cylinders is detected by an air flow sensor. Further, the total amount Gf of gases to be supplied to the cylinders is mapped in advance using the stepped-on amount of an accelerator pedal and the rotational speed of the engine as parameters, and the total amount Gf is calculated by searching the map according to the parameters detected during operation of the engine. Furthermore, the difference (Gf−Ga) between the total amount Gf of gases and the intake air amount Ga is calculated as the amount Ge of EGR gases to be supplied to the cylinders.

On the other hand, an exhaust manifold has an oxygen concentration sensor inserted therein for detecting the concentration of oxygen in exhaust gases.

The amount of air in the EGR gases is calculated based on the detected oxygen concentration in the exhaust gases and the amount Ge of EGR gases, assuming that the oxygen concentration in the exhaust gases detected by the oxygen concentration sensor is equal to the concentration of oxygen in the EGR gases. Then, the sum of the amount of air in the EGR gases and the intake air amount Ga is calculated as the total amount of air to be supplied to the cylinder, and a fuel injection amount is calculated based on the total air amount and a target air-fuel ratio. The EGR operation is carried out under the above-described control, and even when excessive air is contained in the EGR gases, the fuel injection amount is controlled according to the amount of air actually supplied to the cylinders, whereby the air-fuel ratio is controlled to the target air-fuel ratio with accuracy.

As described above, in the above conventional control system, the concentration of oxygen in exhaust gases is regarded as equal to the concentration of oxygen in EGR gases supplied to the cylinders, and the concentration of oxygen in exhaust gases detected by the oxygen concentration sensor is sequentially used for estimation of the amount of air in the EGR gases, estimation of the total amount of air supplied to the cylinders, and calculation of the fuel injection amount. However, there is a limit to the range of the air-fuel ratio detectable by the oxygen concentration sensor. Therefore, since the diesel engine, for example, has a wide range of the air-fuel ratio to be controlled, the operating region of the engine to which the oxygen concentration sensor can be applied is very narrow. Furthermore, the exhaust manifold having the oxygen concentration sensor inserted therein is distant from the cylinders, which produces a time lag before the EGR gases from the exhaust manifold are actually supplied to the cylinders, and the EGR system itself suffers from delay in operation. Therefore, the actual concentration of oxygen in the EGR gases supplied to the cylinders is not necessarily equal to the concentration of oxygen in exhaust gases. Such deviation in the oxygen concentration increases particularly when the amount of the EGR gases is largely changed, e.g. in a transient state of the engine. Further, in the diesel engine, the EGR gas amount is set to a very large value compared with the gasoline engine, and hence the amount of change in the EGR gas amount in the transient state is also large, which causes an increased deviation in the oxygen concentration. This makes it impossible for the control system to properly estimate the amount of air in the EGR gases and the total amount of air supplied to the cylinders, which causes the fuel injection amount to deviate from an appropriate value, thereby making it impossible to accurately control the air-fuel ratio to the target air-fuel ratio.

The Publication of Japanese Patent No. 2600492 discloses an exhaust emission control system which includes a lean NOx catalyst for absorbing NOx from exhaust gases during a lean burn operation in which the air-fuel ratio of a mixture burned in an internal combustion engine is set to a lean air-fuel ratio leaner than the stoichiometric ratio. In this system, the amount of NOx absorbed in the lean NOx catalyst increases as the lean burn operation is continuously performed. Therefore, the air-fuel ratio is made richer than the stoichiometric ratio before the amount of NOx absorbed in the lean NOx catalyst exceeds the allowable limit, whereby the NOx absorbed in the lean NOx catalyst is reduced. Hereinafter, the above enrichment of the air-fuel ratio is referred to as "the Nox-reducing enrichment".

In the above-described exhaust emission control system disclosed in the Publication of Japanese Patent No. 2600492, when the Nox-reducing enrichment is performed, first, the air-fuel ratio is stepwise switched from the lean air-fuel ratio to a rich air-fuel ratio, and when reduction of NOx is completed, the air-fuel ratio is stepwise returned from the rich air-fuel ratio to the lean air-fuel ratio. Therefore, the system suffers from the problem that it causes engine output torque variation during switching of the air-fuel ratio.

Further, the Publication of Japanese Patent No. 3116876 discloses an internal combustion engine which is configured such that to reduce the amount of NOx in exhaust gases, a relatively large amount of exhaust gases is recirculated to an intake system to thereby lower combustion temperature in the combustion chamber. In this engine, the exhaust gas recirculation rate is set to a higher value than usual, and a relatively large amount of exhaust gases is supplied to the combustion chamber. As a result, the temperature of fuel and gases therearound in the combustion chamber is suppressed to a temperature lower than a temperature at which soot is generated, to thereby prevent generation of soot and reduce the amount of NOx emission.

The low-temperature combustion disclosed in the Publication of Japanese Patent No. 3116876 is possible only in a particular state where load on the engine is low, and hence it is necessary to change the control mode of the engine, particularly the control mode of fuel injection by injectors, along with an increase in load on the engine. However, the Publication of Japanese Patent No. 3116876 does not disclose a method of controlling fuel injection during an increase in the load on the engine, or during transition from a high-load operating condition of the engine to a low-load operating condition thereof under which the low-temperature combustion is possible.

SUMMARY OF THE INVENTION

It is a first object of the present invention to provide a control system for an internal combustion engine, which is capable of optimally controlling fuel injection by an injector even in a transient state of the engine.

It is a second object of the present invention to provide a control system for an internal combustion engine, which is capable of properly controlling an injector that injects fuel into a cylinder during switching of an air-fuel ratio, to thereby suppress torque variation.

It is a third object of the present invention to provide a control system for an internal combustion engine, which is capable of smoothly changing a fuel injection control mode in accordance with an increase or a decrease in load on the engine to suppress excessive switching of the control mode performed in response to a slight change in the load on the engine, and torque variation caused by the switching of the control mode.

To attain the first object, the present invention provides a control system for an internal combustion engine that draws air into a cylinder via an intake system, supplies fuel injected from an injector into the cylinder, and recirculates part of exhaust gases emitted from the engine to the intake system as EGR gases by an EGR system, comprising:

intake air amount control means for controlling an amount of intake air drawn into the cylinders via the intake system;

intake air amount-detecting means for detecting the amount of intake air;

EGR gas flow rate-estimating means for estimating a flow rate of EGR gases according to response delay of recirculation of the EGR gases by the EGR system;

in-cylinder oxygen amount-estimating means for estimating an amount of oxygen existing in the cylinder, based on the detected intake air amount and the estimated flow rate of EGR gases;

engine speed-detecting means for detecting a rotational speed of the engine;

fuel injection parameter-determining means for determining a fuel injection parameter based on the detected rotational speed of the engine and the estimated in-cylinder oxygen amount; and injector control means for controlling the injector based on the determined fuel injection parameter.

With the configuration of this control system, the amount of intake air drawn into the cylinder via the intake system is controlled by the intake air amount control means, and detected by the intake air amount-detecting means. Further, the flow rate of EGR gases recirculated to the intake system is estimated by the EGR gas flow rate-estimating means according to response delay of recirculation of the EGR gases by the EGR system. The amount of oxygen existing in the cylinders is estimated based on the detected intake air amount and the estimated flow rate of the EGR gases. Further, the fuel injection parameter is determined based on the estimated in-cylinder oxygen amount and the detected rotational speed of the engine, and the injector is controlled based on the determined fuel injection parameter.

As described above, according to the present invention, the amount of oxygen existing in the cylinder and contributing to combustion (in-cylinder oxygen amount) is estimated, and the fuel injection parameter for control of fuel injection by the injector is determined based on the estimated in-cylinder oxygen amount and the rotational speed of the engine. Further, the in-cylinder oxygen amount is estimated based on the intake air amount and the flow rate of the EGR gases, and the flow rate of the EGR gases is estimated according to the response delay of recirculation of the EGR gases by the EGR system. Therefore, even in a transient state of the engine, in which the flow rate of EGR gases is largely changed, it is possible to accurately estimate the amount of oxygen actually existing in the cylinder while reflecting the response delay of EGR operation on the in-cylinder oxygen amount. This makes it possible to optimally determine the fuel injection parameter according to the in-cylinder oxygen amount to thereby optimally control the fuel injection by the injector.

Preferably, the fuel injection parameter comprises at least one of an injection time period, injection timing, and injection pressure of the injector.

With the configuration of this preferred embodiment, at least one of an injection time period, injection timing, and injection pressure of the injector is determined based on the rotational speed of the engine and the in-cylinder oxygen amount, as the fuel injection parameter, whereby it is possible to properly control the fuel injection by the injector. Further, by combining two or all of the above parameters, it is possible to control the fuel injection by the injector optimally in a finer-grained manner.

Preferably, the control system further comprises fuel injection parameter-setting means for setting in advance the fuel injection parameter according to the rotational speed of the engine and the in-cylinder oxygen amount, and fuel injection parameter-storing means for storing the set fuel injection parameter, and the fuel injection parameter-determining means determines the fuel injection parameter by reading out the fuel injection parameter from the fuel injection parameter-storing means according to the rotational speed of the engine and the estimated in-cylinder oxygen amount.

With the configuration of this preferred embodiment, optimum fuel injection parameter dependent on the rotational speed of the engine and the estimated in-cylinder oxygen amount is set in advance e.g. by bench test, and stored in the fuel injection parameter-storing means. Therefore, by reading the corresponding fuel injection parameter value from the fuel injection parameter-storing means during operation of the engine according to the rotational speed of the engine and the estimated in-cylinder oxygen amount, it is possible to optimally determine the parameter with ease.

Further preferably, the control system further comprises transient state-determining means for determining whether or not the engine is operated in a transient state, and in-cylinder oxygen amount-correcting means for correcting the in-cylinder oxygen amount when the engine is operated in the transient state, and the fuel injection parameter-determining means determines the fuel injection parameter by reading out the fuel injection parameter from the fuel injection parameter-storing means according to the rotational speed of the engine and the corrected in-cylinder oxygen amount.

With the configuration of this preferred embodiment, when the engine is operated in a transient state, the in-cylinder oxygen amount is corrected, and the fuel injection parameter is read out using the corrected in-cylinder oxygen amount from the fuel injection parameter-storing means, and determined. This makes it possible to commonly use the fuel injection parameter-storing means storing a fuel injection parameter for use in a steady state of the engine, in the transient state as well, and thereby dispense with other storage means for storing a fuel injection parameter for use in the transient state. As a result, it is possible to reduce the storage capacity of the control system and simplify control programs.

Preferably, the control system further comprises accelerator pedal stepped-on amount-detecting means for detecting a stepped-on amount of an accelerator pedal, and load-detecting means for detecting load on the engine, and the fuel injection parameter-determining means determines the fuel injection parameter based on the rotational speed of the engine and the detected stepped-on amount of the accelerator pedal in place of the rotational speed of the engine and the in-cylinder oxygen amount, when the detected load on the engine is higher than a predetermined value.

When load on the engine is high, torque variation with respect to the intake air amount increases, so that if the fuel injection parameter is determined according to the in-cylinder oxygen amount estimated based on the intake air amount, torque variation due to the tolerance of the intake air amount-detecting means increases, whereby engine output torque can be made unstable. Furthermore, in the case of a diesel engine, the driver has no means for changing the in-cylinder oxygen amount in a high-load region (e.g. EGR=0%, and throttle valve opening=100%), and hence it is impossible to change the torque according to an intention of the driver. In view of this, with the configuration of this preferred embodiment, during high-load operation of the engine over which the load on the engine is higher than a predetermined value, the fuel injection parameter is determined not using the in-cylinder oxygen amount but using the stepped-on amount of the accelerator pedal in place thereof and the rotational speed of the engine. Accordingly, during the high-load operation of the engine, the engine output torque can be controlled with accuracy according to actual demanded torque, without being adversely affected by the torque variation due to the tolerance of the intake air amount-detecting means, whereby it is possible to ensure excellent drivability.

Preferably, the control system further comprises combustion state-detecting means for detecting a combustion state of the engine, and fuel injection parameter-correcting means for correcting the fuel injection parameter according to the detected combustion state of the engine.

With the configuration of this preferred embodiment, a combustion state of the engine is detected, and the fuel injection parameter is corrected according to the detected actual combustion state of the engine. This makes it possible to optimize the fuel injection parameter while compensating for influences e.g. of the tolerance of the injector, the tolerance of the intake air amount-detecting means, and an estimation error of the flow rate of the EGR gases by the EGR gas flow rate-estimating means.

More preferably, the control system further comprises corrected fuel injection parameter-storing means for storing the corrected fuel injection parameter, and the fuel injection parameter-determining means determines the fuel injection parameter by reading out the corrected fuel injection parameter from the corrected fuel injection parameter-storing means.

With the configuration of this preferred embodiment, the corrected fuel injection parameter, which has been corrected according to the combustion state of the engine, is stored in the corrected fuel injection parameter-storing means, and read out therefrom to thereby determine the fuel injection parameter. Therefore, it is possible to determine the fuel injection parameter while compensating for aging of the fuel injection system including the injector, and learning the optimum fuel injection parameter, as required.

Preferably, the control system further comprises oxygen concentration-detecting means for detecting concentration of oxygen in exhaust gases, and intake air amount-correcting means for correcting the intake air amount according to the detected oxygen concentration.

With the configuration of this preferred embodiment, the intake air amount is corrected according to detected concentration of oxygen in exhaust gases. Therefore, it is possible to accurately control the air-fuel ratio of gases burned in the engine to a desired air-fuel ratio.

To attain the second object, it is preferred that the control system further comprises switching command means for instructing switching of an air-fuel ratio of a mixture to be burned in the cylinder from a lean air-fuel ratio to a rich air-fuel ratio, or switching thereof from the rich air-fuel ratio to the lean air-fuel ratio, and when the switching command means instructs switching of the air-fuel ratio, the fuel injection parameter-determining means determines the fuel injection parameter such that the fuel injection parameter is progressively changed, according to the estimated in-cylinder oxygen amount before the switching of the air-fuel ratio, and a target in-cylinder oxygen amount after the switching of the air-fuel ratio.

With the configuration of this preferred embodiment, when switching of the air-fuel ratio of a mixture from a lean air-fuel ratio to a rich air-fuel ratio, or switching of the same from the rich air-fuel ratio to the lean air-fuel ratio is instructed, the fuel injection parameter is determined such that it is progressively changed according to the estimated in-cylinder oxygen amount before the switching and a target in-cylinder oxygen amount after the switching. This makes it possible to suppress torque shock caused by the switching of the air-fuel ratio.

More specifically, it is preferable that the fuel injection parameter-determining means comprises ratio calculating means for calculating the ratio of the amount of a change in the estimated in-cylinder oxygen amount after the switching command is issued, to the difference between the estimated in-cylinder oxygen amount before the switching and the target in-cylinder oxygen amount after the switching, and ratio parameter-setting means for setting a ratio parameter such that the ratio parameter is increased as the ratio increases, and determines the fuel injection parameter using the value of the fuel injection parameter before the switching, the target value of the fuel injection parameter after the switching, and the ratio parameter.

Further, it is preferable that when the air-fuel ratio is switched from the lean air-fuel ratio to the rich air-fuel ratio, the ratio parameter-setting means sets the ratio parameter such that the rate of a change in the ratio parameter with respect to a change in the ratio is progressively increased with an increase in the ratio, whereas when the air-fuel ratio is switched from the rich air-fuel ratio to the lean air-fuel ratio, the ratio parameter-setting means sets the ratio parameter such that the rate is progressively decreased with the increase in the oxygen ratio.

Further, it is preferable that the ratio parameter-setting means corrects the ratio parameter according to the lean air-fuel ratio. More specifically, when the air-fuel ratio is switched from the lean air-fuel ratio to the rich air-fuel ratio, the ratio parameter-setting means corrects the ratio parameter such that the ratio parameter is increased as the lean air-fuel ratio is lower, whereas when the air-fuel ratio is switched from the rich air-fuel ratio to the lean air-fuel ratio, the ratio parameter-setting means corrects the ratio parameter such that the ratio parameter is decreased as the lean air-fuel ratio is lower.

To attain the third object, it is preferred that the fuel injection parameter-determining means determines the fuel injection parameter by searching a fuel injection parameter map according to the detected engine speed and the estimated in-cylinder oxygen amount, and the fuel injection parameter map comprises a fuel injection parameter map for use in low-temperature combustion, which is adapted to a low-load operating region of the engine, and a fuel injection parameter map for use in normal combustion, which is adapted to an operating region on a higher-load side than the low-load operating region, the fuel injection parameter-determining means switching the fuel injection parameter map by providing a hysteresis between switching of the fuel injection parameter map from the fuel injection parameter map for use in low-temperature combustion to the fuel injection parameter map for use in normal combustion, and switching of the fuel injection parameter map from the fuel injection parameter map for use in normal combustion to the fuel injection parameter map for use in low-temperature combustion.

With the configuration of this preferred embodiment, the fuel injection parameter is determined by searching the fuel injection parameter map for use in low-temperature combustion and the fuel injection parameter map for use in normal combustion according to the detected engine speed and the estimated in-cylinder oxygen amount. Then, when the fuel injection parameter map in use is switched from the fuel injection parameter map for use in low-temperature combustion to the fuel injection parameter map for use in normal combustion, or from the fuel injection parameter map for use in normal combustion to the fuel injection parameter map for use in low-temperature combustion, the switching is performed with a hysteresis. Therefore, it is possible to suppress excessive switching of the fuel injection parameter map which is performed in response to a slight change in the torque of the engine.

Preferably, the control system further includes air-adjusting parameter-calculating means for calculating an air-adjusting parameter for control of the intake air amount by searching an air-adjusting parameter map according to an operating condition of the engine, and the intake air amount control means controls the intake air amount according to the calculated air-adjusting parameter, the air-adjusting parameter map comprising an air-adjusting parameter map for use in low-temperature combustion, which is adapted to the low-load operating region of the engine, and an air-adjusting parameter map for use in normal combustion, which is adapted to the operating region on the higher-load side, wherein in a case where the air-adjusting parameter-calculating means is using the air-adjusting parameter map for use in low-temperature combustion, when the in-cylinder oxygen amount has reached a first threshold value, the air-adjusting parameter-calculating means switches the air-adjusting parameter map to the air-adjusting parameter map for use in normal combustion, whereas in a case where the air-adjusting parameter-calculating means is using the air-adjusting parameter map for use in normal combustion, when the in-cylinder oxygen amount has reached a second threshold value, which is larger than the first threshold value, and in which output torque of the engine becomes smaller than output torque thereof corresponding to the first threshold value, the air-adjusting parameter-calculating means switches the air-adjusting parameter map to the air-adjusting parameter map for use in low-temperature combustion.

With the configuration of this preferred embodiment, the air-adjusting parameter for control of the intake air amount is calculated by searching the air-adjusting parameter map for use in low-temperature combustion or the air-adjusting parameter map for use in normal combustion, according to an operating condition of the engine. Then, in the case where the air-adjusting parameter map for use in low-temperature combustion is being used, when the in-cylinder oxygen amount has reached a first threshold value, the air-adjusting parameter map is switched to the air-adjusting parameter map for use in normal combustion, whereas in the case where the air-adjusting parameter map for use in normal combustion is being used, when the in-cylinder oxygen amount has reached a second threshold value, which is larger than the first threshold value, and with which engine output torque becomes smaller than a value corresponding to the first threshold value of the in-cylinder oxygen amount, the air-adjusting parameter map is switched to the air-adjusting parameter map for use in low-temperature combustion. Therefore, it is possible to prevent excessive switching of the air-adjusting parameter map for use in calculation of the air-adjusting parameter from being performed in response to a slight change in the torque of the engine.

More preferably, in a case where the fuel injection parameter-determining means is using the fuel injection parameter map for use in low-temperature combustion, when the air-adjusting parameter map has been switched to the air-adjusting parameter map for use in normal combustion, the fuel injection parameter-determining means determines the fuel injection parameter such that the output torque of the engine is held approximately constant until the in-cylinder oxygen amount reaches a third threshold value larger than the second threshold value, and switches the fuel injection parameter map to the fuel injection parameter map for use in normal combustion when the in-cylinder oxygen amount has reached the third threshold value, whereas in a case where the fuel injection parameter-determining means is using the fuel injection parameter map for use in normal combustion, when the air-adjusting parameter map has been switched to the air-adjusting parameter map for use in low-temperature combustion, the fuel injection parameter-determining means determines the fuel injection parameter such that the output torque of the engine is held approximately constant until the in-cylinder oxygen amount reaches a fourth threshold value smaller than the first threshold value, and switches the fuel injection parameter map to the fuel injection parameter map for use in low-temperature combustion when the in-cylinder oxygen amount has reached the fourth threshold value.

With the configuration of this preferred embodiment, in the case where the fuel injection parameter map for use in low-temperature combustion is being used, when the air-adjusting parameter map has been switched to the air-adjusting parameter map for use in normal combustion, the fuel injection parameter is determined such that the output torque of the engine is held approximately constant until the in-cylinder oxygen amount reaches a third threshold value larger than the second threshold value, and the fuel injection parameter map is switched to the fuel injection parameter map for use in normal combustion when the in-cylinder oxygen amount has reached the third threshold value, whereas in the case where the fuel injection parameter map for use in normal combustion is being used, when the air-adjusting parameter map has been switched to the air-adjusting parameter map for use in low-temperature combustion, the fuel injection parameter is determined such that the output torque of the engine is held approximately constant until the in-cylinder oxygen amount reaches a fourth threshold value smaller than the first threshold value, and the fuel injection parameter map is switched to the fuel injection parameter map for use in low-temperature combustion when the in-cylinder oxygen amount has reached the fourth threshold value. This makes it possible to suppress torque variation caused by switching of the air-adjusting parameter map and the fuel injection parameter map which are in use.

Preferably, the control system further comprising accelerator pedal stepped-on amount-detecting means for detecting a stepped-on amount of an accelerator pedal of a vehicle driven by the engine, and the fuel injection parameter-determining means determines the fuel injection parameter by searching a first fuel injection parameter map according to the detected engine speed and the estimated in-cylinder oxygen amount when the engine is in a first operating region, whereas when the engine is in a second operating region on a higher-load side than the first operating region, the fuel injection parameter-determining means determines the fuel injection parameter by searching a second fuel injection parameter map according to the detected engine speed and accelerator pedal stepped-on amount, wherein the fuel injection parameter-determining means determines the fuel injection parameter by using a first transition control map having the fuel injection parameter set according to the engine speed and the accelerator pedal stepped-on amount, when the first fuel injection parameter map is switched to the second fuel injection parameter map, whereas when the second fuel injection parameter map is switched to the first fuel injection parameter map, the fuel injection parameter-determining means determines the fuel injection parameter by using a second transition control map having the fuel injection parameter set according to the engine speed and the in-cylinder oxygen amount.

With the configuration of this preferred embodiment, the fuel injection parameter is determined by searching a first fuel injection parameter map according to the detected engine speed and the estimated in-cylinder oxygen amount when the engine is in a first operating region, whereas when the engine is in a second operating region on a higher-load side than the first operating region, the fuel injection parameter is determined by searching a second fuel injection parameter map according to the detected engine speed and accelerator pedal stepped-on amount. When the fuel injection parameter map in use is switched from the first fuel injection parameter map to the second fuel injection parameter map, a first transition control map set according to the engine speed and the accelerator pedal stepped-on amount is used, whereas when the fuel injection parameter map in use is switched from the second fuel injection parameter map to the first fuel injection parameter map, a second transition control map set according to the engine speed and the in-cylinder oxygen amount is used. Therefore, by properly setting the first and second transition control maps, it is possible to perform smooth switching to suppress torque variation and excessive switching of the fuel injection parameter performed in response to a slight change in load on the engine.

More preferably, when using the first transition control map, the fuel injection parameter-determining means corrects the detected accelerator pedal stepped-on amount according to a value of the accelerator pedal stepped-on amount to be assumed when the in-cylinder oxygen amount has reached a predetermined threshold value of the oxygen amount, and searches the first transition control map according to the corrected accelerator pedal stepped-on amount, whereas when using the second transition control map, the fuel injection parameter-determining means corrects the in-cylinder oxygen amount according to a value of the in-cylinder oxygen amount to be assumed when the accelerator pedal stepped-on amount has reached a predetermined threshold value of the accelerator pedal stepped-on amount, and searches the second transition control map according to the corrected in-cylinder oxygen amount.

With the configuration of this preferred embodiment, when the first transition control map is used, the detected accelerator pedal stepped-on amount is corrected according to a value of the accelerator pedal stepped-on amount to be assumed when the in-cylinder oxygen amount has reached a predetermined threshold value of the oxygen amount, and the first transition control map is searched according to the corrected accelerator pedal stepped-on amount, whereas when the second transition control map is used, the in-cylinder oxygen amount is corrected according to a value of the in-cylinder oxygen amount to be assumed when the accelerator pedal stepped-on amount has reached a predetermined threshold value of the accelerator pedal stepped-on amount, and the second transition control map is searched according to the corrected in-cylinder oxygen amount. Therefore, it is possible to smoothly switch the fuel injection parameter map in various operating conditions of the engine only by providing one first and one second transition control maps in advance.

The above and other objects, features, and advantages of the present invention will become more apparent from the following detailed description taken in conjunction with the accompanying drawings.

BRIEF DESCRIPTION OF THE DRAWINGS

FIG. 13 is a diagram useful in explaining combustion parameters used in the FIG. 12 process;

DETAILED DESCRIPTION OF PREFERRED EMBODIMENTS

Figure 1:
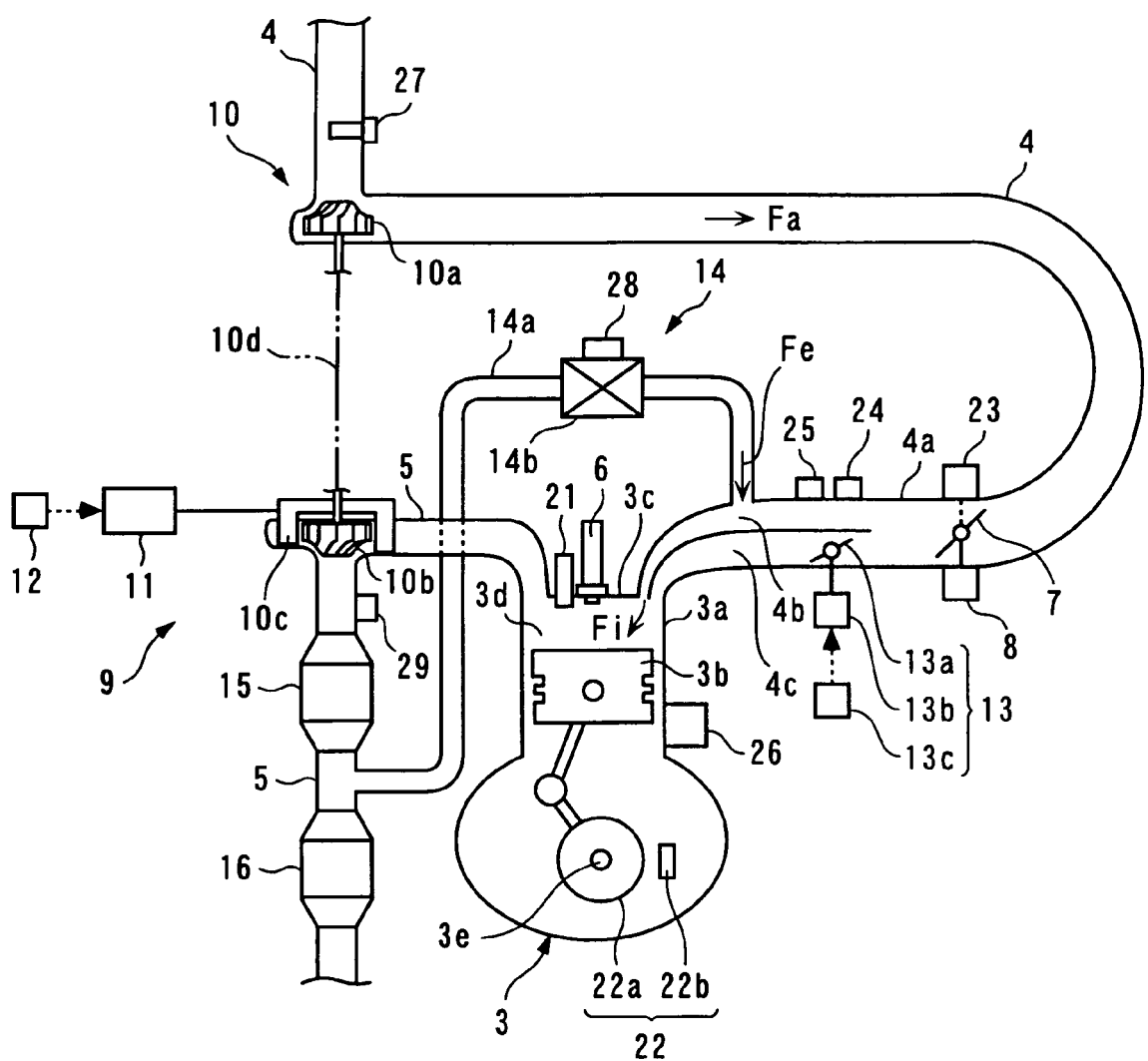
FIG. 1 is a diagram schematically showing the arrangement of a control system according to a first embodiment of the present invention, together with an internal combustion engine.

The invention will now be described in detail with reference to the drawings showing embodiments thereof. An internal combustion engine (hereinafter simply referred to as "the engine") 3 shown in FIG. 1, to which is applied a control system according to a first embodiment of the present invention, is a diesel engine having e.g. four cylinders (only one of which is shown), and installed on an automotive vehicle (not shown). Defined between a piston 3b and a cylinder head 3c of each cylinder 3a is a combustion chamber 3d. To the combustion chamber 3d are connected an intake pipe 4 (intake system) and an exhaust pipe 5, and an intake valve and an exhaust valve (neither of which is shown) are arranged in an intake port of the intake pipe 4 and an exhaust port of the exhaust pipe 5, respectively. Further, a fuel injection valve (hereinafter referred to as "the injector") 6 and an in-cylinder pressure sensor 21 are mounted through the cylinder head 3c in a manner facing the combustion chamber 3d.

Figure 2:
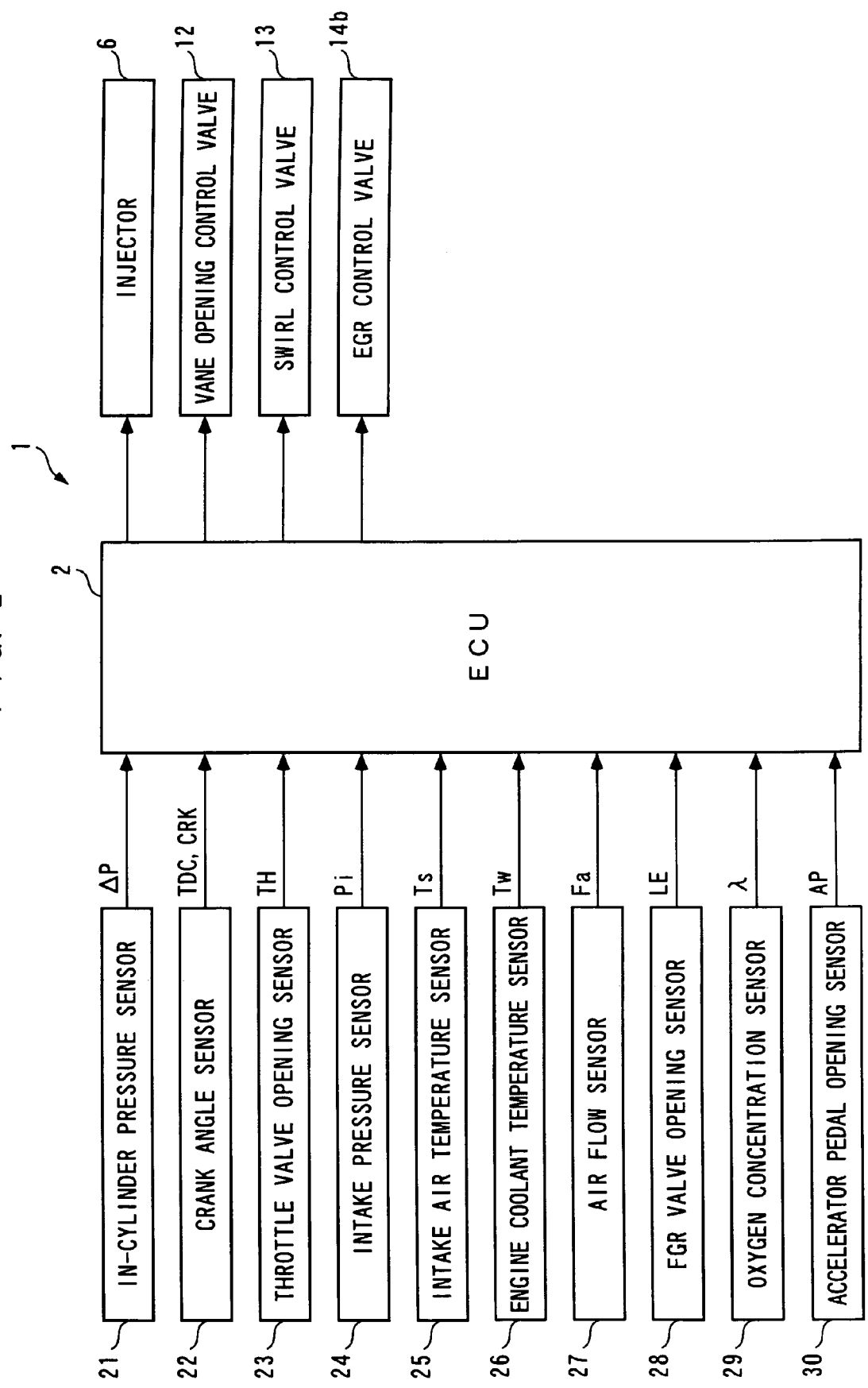
FIG. 2 is a block diagram schematically showing the configuration of the control system.

The injector 6 is disposed in the center of the cylinder head 3c, and connected to a high-pressure pump (not shown) via a common rail (not shown). Fuel in a fuel tank (not shown) is pressurized by the high-pressure pump, and then sent to the injector 6 via the common rail to be injected from the injector 6 into the combustion chamber 3d. Injection pressure Pe, an injection time period De (valve-opening time period), and injection timing TMe (valve-opening timing) of the injector 6 are controlled by control signals from an electronic control unit (hereinafter referred to as "the ECU") 2 shown in FIG. 2. In the following description, reference is also made to FIG. 2.

The in-cylinder pressure sensor 21 (combustion state-detecting means) is e.g. of a piezoelectric element type, which detects the amount $\Delta P$ of a change in the in-cylinder pressure P based on displacement of a piezoelectric element (not shown) thereof occurring with a change in pressure P in the combustion chamber 3d (hereinafter referred to as "the in-cylinder pressure P"), and delivers a signal indicative of the detected amount $\Delta P$ to the ECU 2. The ECU 2 calculates the in-cylinder pressure P by integration of the signal from the in-cylinder pressure sensor 21.

Further, a magnet rotor 22a is mounted on a crankshaft 3e of the engine 3. The magnet rotor 22a and an MRE pickup form a crank angle sensor 22 (engine speed-detecting means) that delivers a CRK signal and a TDC signal, which are both pulse signals, to the ECU 2 in accordance with rotation of the crankshaft 3e.

Each pulse of the CRK signal is generated whenever the crankshaft 3e rotates through a predetermined angle (e.g. 30 degrees). The ECU 2 determines the rotational speed NE of the engine 3 (hereinafter referred to as "the engine speed NE") based on the CRK signal. The TDC signal is indicative of the piston 3b of each cylinder 3a being at a predetermined crank angle position in the vicinity of the top dead center (TDC) at the start of the suction stroke of the piston, and in the case of the four-cylinder engine of the illustrated example, it is delivered whenever the crankshaft 3e rotates through 180 degrees.

A throttle valve 7 (intake amount control means, intake air amount-correcting means) is disposed in the intake pipe 4 at a location upstream of a collecting section of an intake manifold 4a. To the throttle valve 7 is connected an actuator 8 for actuating the throttle valve 7. The actuator 8 is comprised of a motor and a gear mechanism, neither of which is shown, such that operation thereof is controlled by a control signal from the ECU 2, whereby the degree TH of opening of the throttle valve 7 (hereinafter referred to as "the throttle valve opening TH") is changed to accordingly control the amount of air drawn into the combustion chamber 3d. The throttle valve opening TH is sensed by a throttle valve opening sensor 23, and a signal indicative of the sensed throttle valve opening TH is delivered to the ECU 2.

The intake manifold 4a has an intake pressure sensor 24 and an intake air temperature sensor 25 inserted therein. The intake pressure sensor 24 senses pressure Pi within the intake manifold 4a (hereinafter referred to as "the intake manifold pressure Pi"), and delivers a signal indicative of the sensed intake manifold pressure Pi to the ECU 2. The intake air temperature sensor 25 is implemented e.g. by a thermistor, and senses temperature Ts in the intake manifold 4a (hereinafter referred to as "the intake manifold temperature Ts") to deliver a signal indicative of the sensed intake manifold temperature Ts to the ECU 2. The cylinder block of the engine 3 has an engine coolant temperature sensor 26 mounted therein. The engine coolant temperature sensor 26 is implemented e.g. by a thermistor, and senses temperature Tw of coolant circulating through the cylinder block (hereinafter referred to as "the engine coolant temperature Tw") to deliver a signal indicative of the sensed engine coolant temperature Tw to the ECU 2.

Further, the intake pipe 4 has a supercharging device 9 disposed therein. The supercharging device 9 is comprised of a turbo charger-type supercharger 10, an actuator 11 connected to the supercharger 10, and a vane opening control valve 12. The supercharger 10 includes a compressor blade 10a rotatably mounted in the intake pipe 4 at a location upstream of the throttle valve 7, a turbine blade 10b and a plurality of rotatable variable vanes 10c (only two of which are shown) provided in intermediate portions of the exhaust pipe 5, and a shaft 10d integrally formed with the two blades 10a and 10b such that the shaft 10d connects them. In the supercharger 10, as the turbine blade 10b is driven for rotation by exhaust gases flowing through the exhaust pipe 5, the compressor blade 10a integrally formed with the turbine blade 10b is also rotated, whereby the supercharger 10 is caused to perform a supercharging operation.

Each variable vane 10c is connected to the actuator 11 such that the degree VO of opening of the vane 10c (hereinafter referred to as "the vane opening VO") is controlled via the actuator 11. The actuator 11 is of a diaphragm type which is operated by negative pressure, and connected to a negative pressure pump (not shown). The above-described vane opening control valve 12 is provided midway between the actuator 11 and the negative pressure pump. The negative pressure pump is operated by the engine 3 as a drive source, for supplying generated negative pressure to the actuator 11. The vane opening control valve 12 is formed by an electromagnetic valve, and the degree of opening thereof is controlled by a control signal from the ECU 2, whereby negative pressure to be supplied to the actuator 11 is changed to change the vane opening VO of each variable vane 10c. Thus, boost pressure is controlled.

Further, an air flow sensor 27 (intake air amount-detecting means) is inserted into the intake pipe 4 at a location upstream of the supercharger 10.

The air flow sensor 27 detects the amount of intake air flowing through the intake pipe 4, and delivers a signal indicative of the sensed intake air amount to the ECU 2.

Furthermore, the intake manifold 4a of the intake pipe 4 is divided into a swirl passage 4b and a bypass passage 4c between the collecting section of the intake manifold 4a and each branch portion thereof. The bypass passage 4c is provided with a swirl device 13 for generating a swirl in the combustion chamber 3d. The swirl device 13 is comprised of a swirl valve 13a, an actuator 13b for actuating the swirl valve 13a, and a swirl control valve 13c. The actuator 13b and the swirl control valve 13c are configured similarly to the actuator 11 and the vane opening control valve 12 of the supercharging device 9, respectively. The swirl control valve 13c is connected to the above-described negative pressure pump. With this arrangement, the degree of opening of the swirl control valve 13c is controlled by a control signal from the ECU2, whereby negative pressure supplied to the actuator 13b is changed to change the degree SVO of opening of the swirl valve 13a, whereby the strength of the swirl is controlled.

Further, an exhaust gas recirculation pipe (hereinafter referred to as "the EGR pipe") 14a is connected between a portion of a collecting section of the swirl passages 4b in the intake manifold 4a and a portion of the exhaust pipe 5, at a location immediately downstream of an oxidation catalyst 15, referred to hereinafter, in the exhaust pipe 5, and an exhaust gas recirculation device (hereinafter referred to as "the EGR device") 14 is formed by the EGR pipe 14a and an exhaust gas recirculation control valve (hereinafter referred to as "the EGR control valve") 14b disposed across an intermediate portion of the EGR pipe 14a. Part of exhaust gases emitted from the engine 3 is recirculated as EGR gases into the intake pipe 4 via the EGR pipe 14a. The EGR control valve 14b is implemented by a linear solenoid valve, and the degree LE of opening thereof (hereinafter referred to as "the EGR valve opening LE") is controlled by a control signal from the ECU 2, whereby an EGR gas flow rate Fe is controlled. The EGR valve opening LE is sensed by an EGR valve opening sensor 28, and a signal indicative of the sensed EGR valve opening is delivered to the ECU 2.

Further, in the exhaust pipe 5, there are arranged the oxidation catalyst 15 and an NOx absorbing catalyst 16 from upstream to downstream in the mentioned order at respective locations downstream of the supercharger 10. The oxidation catalyst 15 oxidizes HC and CO in exhaust gases to reduce exhaust emission. Further, the NOx absorbing catalyst 16 absorbs NOx in exhaust gases under a lean oxidizing atmosphere, and reduces the absorbed NOx under a rich reducing atmosphere.

Furthermore, an oxygen concentration sensor 29 is inserted into the exhaust pipe 5 between the supercharger 10 and the oxidation catalyst 15. The oxygen concentration sensor 29 (oxygen concentration-detecting means) linearly senses the concentration $\lambda$ of oxygen in exhaust gases, and delivers a signal indicative of the sensed oxygen concentration to the ECU 2. The ECU 2 calculates the air-fuel ratio A/F of gases burned in the combustion chamber 3d based on the oxygen concentration $\lambda$. Furthermore, an accelerator pedal opening sensor 30 (accelerator pedal stepped-on amount-detecting means) senses the stepped-on amount AP of an accelerator pedal, not shown, of the vehicle (hereinafter referred to as "the accelerator pedal opening AP") and delivers a signal indicative of the sensed accelerator pedal opening AP to the ECU 2.

In the present embodiment, the ECU 2 forms part of intake air amount control means, EGR gas flow rate-estimating means, in-cylinder oxygen amount-estimating means, engine speed-detecting means, fuel injection parameter-determining means, injector control means, fuel injection parameter-setting means, fuel injection parameter-storing means, transient state-determining means, in-cylinder oxygen amount-correcting means, load-detecting means, combustion state-detecting means, fuel injection parameter-correcting means, corrected fuel injection parameter-storing means, and intake air amount-correcting means. The ECU 2 is implemented by a microcomputer including an I/O interface, a CPU, a RAM, and a ROM. The ECU 2 performs arithmetic operations based on the detection signals delivered from the above-mentioned sensors 21 to 30, in accordance with control programs read from the ROM. More specifically, the ECU 2 determines an operating condition of the engine 3 from the detection signals, determines the combustion mode of the engine 3 based on the result of the determination, controls the amount of intake air by controlling the throttle valve opening TH depending on the determined combustion mode, and controls the fuel injection carried out by the injector 6.

The above-described combustion mode of the engine 3 is largely classified into a low-temperature combustion mode and a normal combustion mode other than the low-temperature combustion mode. The low-temperature combustion mode is executed in a low-load region after completion of the warming up of the engine 3, whereas the normal combustion mode is executed in a higher-load region than the low-load region. Further, in both of the combustion modes, the lean operation in which the air-fuel ratio of the mixture is controlled to a leaner value than a stoichiometric fuel-air ratio is normally carried out, and the rich operation in which the air-fuel ratio is controlled to be richer than the stoichiometric fuel-air ratio is carried out as required so as to reduce NOx absorbed by the NOx absorbing catalyst 16, or remove sulfur attached from fuel to the NOx absorbing catalyst 16.

Figure 3:
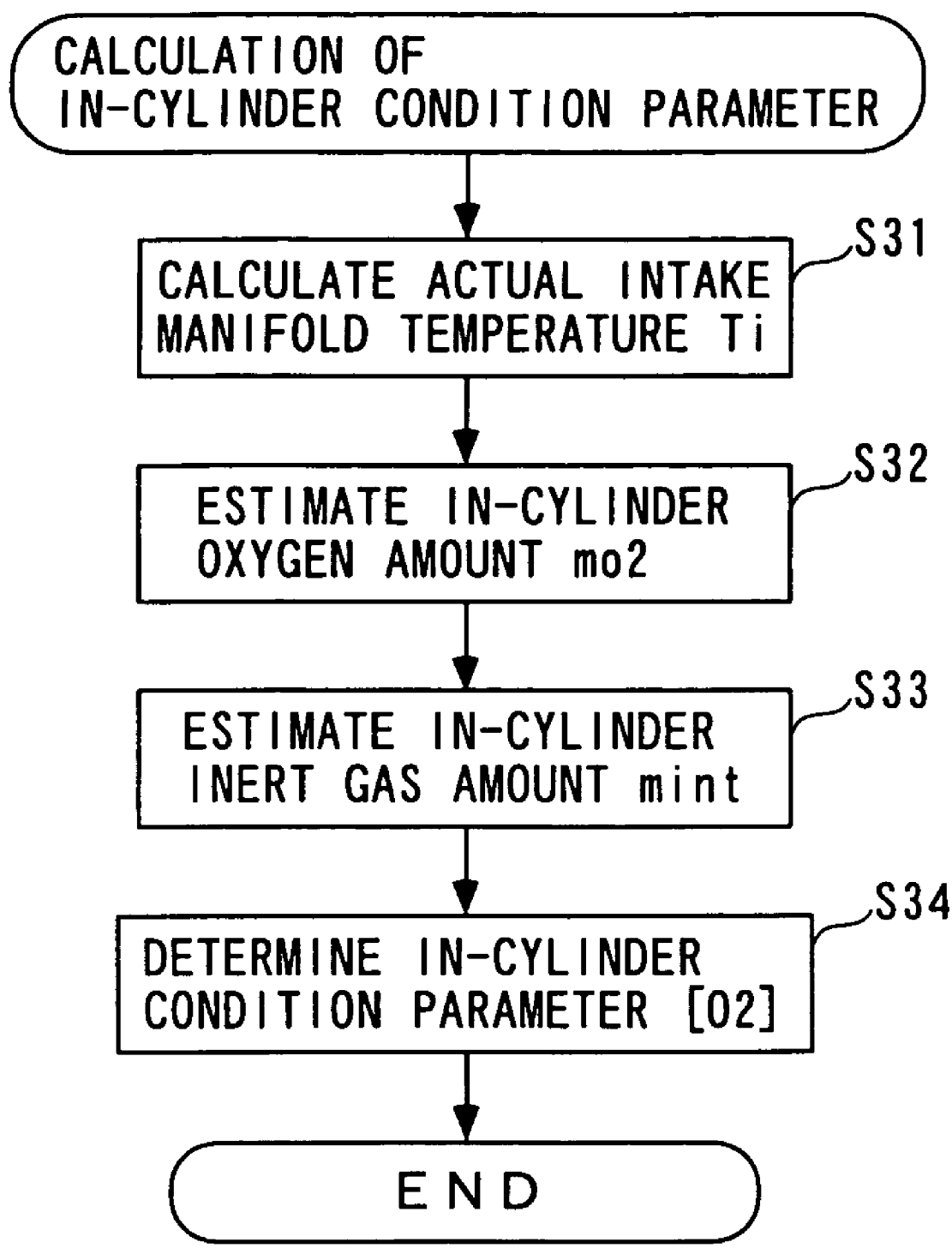
FIG. 3 is a flowchart showing a process for calculating an in-cylinder condition parameter.

Hereinafter, a description will be given of processes carried out by the ECU 2. FIG. 3 shows a process for calculating an in-cylinder condition parameter [O2] for use in the fuel injection control. The in-cylinder condition parameter [O2] represents a state within each cylinder 3a immediately before injection of fuel, and is comprised of three parameters in total, i.e. an in-cylinder oxygen amount mo2, an in-cylinder inert gas amount mint, and an actual intake manifold temperature Ti. The in-cylinder oxygen amount mo2 represents the amount of oxygen existing in the cylinder 3a before injection of fuel. The in-cylinder inert gas amount mint represents the amount of inert gases (gases other than oxygen, not contributing to combustion) existing in the cylinder 3a before injection of fuel. Further, the actual intake manifold temperature Ti represents an actual temperature of the intake manifold 4a. Out of the three parameters, the in-cylinder oxygen amount mo2 is a main parameter having a main influence on combustion. In contrast, the in-cylinder inert gas amount mint and the actual intake manifold temperature Ti are sub parameters for complementing the in-cylinder oxygen amount mo2, which are substantially unconditionally determined according to the in-cylinder oxygen amount mo2 in a steady state of the engine 3, and used to correct the in-cylinder oxygen amount mo2 in a transient state of the engine 3, as will be described hereinafter.

In this process, first, the actual intake manifold temperature Ti is calculated based on the intake manifold temperature Ts detected by the intake air temperature sensor 25, by the following equation (1) (step 31):

$$Ti = Ts/(\tau o \cdot s + 1) \qquad (1)$$

wherein $\tau o$ represents a time constant of the intake air temperature sensor 25, and s represents a Laplace transform operator.

By the above calculation, it is possible to properly estimate the actual intake manifold temperature Ti in real time based on the result of detection by the intake air temperature sensor 25, while compensating for response delay of the sensor 25.

Then, the in-cylinder oxygen amount mo2 is calculated through estimation (step 32). This calculation is performed based on the intake air amount Fa detected by the air flow sensor 27, the intake manifold pressure Pi detected by the intake pressure sensor 24, and the actual intake manifold temperature Ti estimated in the step 31, further using an EGR model, described hereinafter, by the following procedure:

A. Estimation of EGR rate Ri
B. Estimation of in-cylinder oxygen amount mo2

A. Estimation of EGR Rate Ri

A basic equation for calculating the EGR rate Ri is given by the following equation (2):

$$Ri = Fe\_hat/Fi \qquad (2)$$

wherein Fi represents a total gas flow rate of gases flowing into the cylinders 3a, and Fe_hat represents an estimated value of the flow rate of EGR gases flowing into the cylinder 3a (estimated EGR gas flow rate), which is obtained by taking into account response delay of the EGR system 14 in the transient state of the engine 3 between the lean operation and the rich operation.

In the equation (2), the total gas flow rate Fi is calculated using a known speed density method by the following equation (3):

$$Fi = Ne \cdot Vd \cdot Pi \cdot \eta v / (60 \times 2R \cdot Ti) \qquad (3)$$

wherein Ne represents the engine speed (rpm), Vd the displacement of the engine, Pi the intake manifold pressure, $\eta v$ the volumetric efficiency of the engine, R a gas constant, and Ti the intake manifold temperature.

It should be noted that the volumetric efficiency $\eta$ is obtained e.g. by determining a map value according to the engine speed Ne and the intake manifold pressure Pi by searching a map set in advance based on the results of experiments, and correcting the determined map value according to the actual intake manifold temperature Ti.

On the other hand, when the ideal gas law is applied to the intake manifold 4a under a constant temperature condition, there holds between the EGR gas flow rate Fe, the intake air amount Fa, and the total gas flow rate Fi, the relationship expressed by the following equation (4):

$$dPi/dt = (R \cdot Ti/Vi) \cdot (Fe + Fa - Fi) \qquad (4)$$

wherein Vi represents an intake manifold capacity.

When the equation (4) is solved for the EGR gas flow rate Fe, there is obtained the following equation (5):

$$Fe = (dPi/dt) \cdot Vi/(R \cdot Ti) - Fa + Fi \qquad (5)$$

Further, when the equation (5) is transformed by introducing the Laplace transform operator (dPi/dt=sPi), there is obtained the following equation (6):

$$Fe = s \cdot Pi \cdot Vi/(R \cdot Ti) - Fa + Fi \qquad (6)$$

On the other hand, if a first-order lag in response of the EGR system 14 is taken into account, the estimated value Fe_hat of the EGR gas flow rate is expressed by the following equation (7):

$$Fe\_hat = (1/(\tau s + 1)) \cdot Fe \qquad (7)$$

Accordingly, from the equations (6) and (7), the estimated value Fe_hat of the EGR gas flow rate is expressed by the following equation (8):

$$Fe\_hat = \qquad (8)$$
$$(s \cdot Pi/(\tau s + 1))(Vi/(R \cdot Ti)) - (1/(\tau s + 1)) \cdot Fa + (1/(\tau s + 1)) \cdot Fi$$

wherein $s \cdot Pi/(\tau s+1)$ represents an approximate value of dPi/dt, which is obtained by using a value difference filter $s/(\tau s+1)$, and $\tau$ represents a time constant determined based on the results of experiments.

Therefore, the EGR rate Ri in the transient state can be calculated by substituting the total gas flow rate Fi calculated by the equation (3) and the estimated value Fe_hat of the EGR gas flow rate in the transient state, calculated by the equation (8), into the equation (2).

Further, in the steady state of the engine 3, there holds the following equation (9):

$$Fe\_hat = Fe = Fi - Fa \qquad (9)$$

Therefore, from the equations (9) and (2), the EGR rate Ri in the steady state of the engine 3 is determined by the following the equation (10):

$$Ri = (Fi - Fa)/Fi \quad (10)$$

B. Estimation of In-cylinder Oxygen Amount mo2

Then, the in-cylinder oxygen amount mo2 is estimated based on the total gas flow rate Fi and the EGR rate Ri, calculated as above.

A basic equation for calculating the in-cylinder oxygen amount mo2 is given by the following equation (11):

$$mo2 = ma \times \phi(O2)a + me \times \phi(O2)e \quad (11)$$

wherein ma represents the amount of air flowing into a cylinder 3a every combustion cycle, me the amount of the EGR gases flowing into the cylinder 3a every combustion cycle, $\phi(O2)a$ the concentration of oxygen in the air (constant), and $\phi(O2)e$ the concentration of oxygen in the EGR gases.

The air amount ma and the EGR gas amount me in the equation (11) are calculated based on the total gas flow rate Fi and the EGR rate Ri by the respective following equations (12) and (13):

$$ma = (Fi \times (1-Ri) \times 60 \times 2)/(Ne \times ncyl) \quad (12)$$

$$me = (Fi \times Ri \times 60 \times 2)/(Ne \times ncyl) \quad (13)$$

wherein ncyl represents the number of cylinders of the engine.

Further, when the response delay of the EGR system 14 is taken into account, the oxygen concentration $\phi(O2)e$ in the EGR gases can be determined by the following equation (14):

$$\phi(O_2)_e^i = a_0 \times \phi(O_2)_{exh}^{i-1} + a_1 \times \phi(O_2)_{exh}^{i-2} + \quad (14)$$
$$a_2 \times \phi(O_2)_{exh}^{i-3} + \cdots + a_{n-1} \times \phi(O_2)_{exh}^{i-1}$$

wherein a superscript i represents a combustion cycle, and $a_0, a_1, a_2, \ldots a_n$ represent weighting coefficients determined based on the results of experiments, depending on operating conditions of the engine 3 and the capacity of the exhaust manifold.

Further, $\phi(O2)exh$ represents the concentration of oxygen in exhaust gases, and is calculated in the lean operation by the following equation (15):

$$\phi(O_2)_{exh}^{i-1} = \frac{m_a^{i-1} \times \phi(O_2)_a + m_e^{i-1} \times \phi(O_2)_e^{i-1} - m_f^{i-1} \times L_{st} \times \phi(O_2)_a}{m_a^{i-1} + m_e^{i-1} + m_f^{i-1}} \quad (15)$$

wherein mf represents the amount of fuel injected into the cylinder 3a, and Lst a stoichiometric fuel-air ratio determined according to the type of fuel. More specifically, in the equation (15), $mf \times Lst \times \phi(O2)a$ corresponds to the amount of oxygen consumed by complete combustion of fuel in the injected fuel amount, in the lean operation. It should be noted that according to the equations (14) and (15), to calculate the oxygen concentration $\phi(O2)e$ in the EGR gases, an initial value of the oxygen concentration $\phi(O2)exh$ in exhaust gases is necessitated. When a condition that EGR is stopped immediately after the start of the engine 3 is set, for example, $\phi(O2)e=0$ holds, and hence the initial value of the oxygen concentration $\phi(O2)exh$ can be calculated using the equation (14) and so forth according to the intake air amount Fa and the fuel injection amount mf at the time.

Therefore, the in-cylinder oxygen amount mo2 in the lean operation can be calculated by substituting the oxygen concentration $\phi(O2)e$ in the EGR gases, calculated by the equation (14), and the air amount ma and the EGR gas amount me, calculated by the respective equations (12) and (13), into the equation (11). Further, in the rich operation, $\phi(O2)exh=0$ holds since oxygen in the cylinder is completely consumed by combustion, and hence by substituting $\phi(O2)exh=0$ into the equation (14), it is possible to determine the oxygen concentration $\phi(O2)e$ in the EGR gases, and calculate the in-cylinder oxygen amount mo2.

Referring again to FIG. 3, in a step 33 following the step 32, the in-cylinder inert gas amount mint is calculated. As described hereinbefore, since the in-cylinder inert gases are gases other than oxygen, which exist in the cylinder 3a, the in-cylinder inert gas amount mint is calculated using the in-cylinder oxygen amount mo2 determined in the step 32, by the following equation (16):

$$mint = (ma + me) - mo2 \quad (16)$$

Then, the in-cylinder condition parameter [O2] is determined using the actual intake manifold temperature Ti, the in-cylinder oxygen amount mo2, and the in-cylinder inert gas amount mint as a set (step 34), followed by terminating the present process.

As is apparent from the above description, in the process for calculating the in-cylinder condition parameter [O2], the in-cylinder oxygen amount mo2, the in-cylinder inert gas amount mint, and the actual intake manifold temperature Ti are estimated in all the operating conditions of the engine 3 including the transient state, using the intake air amount Fa detected by the air flow sensor 27, the intake manifold pressure Pi detected by the intake pressure sensor 24, the intake manifold temperature Ts detected by the intake air temperature sensor 25, and the EGR model. Then, the in-cylinder condition parameter [O2] indicative of conditions in the cylinder 3a immediately before the injection of fuel is determined using the above three parameters as a set. Since the in-cylinder condition parameter [O2] represents the conditions in the cylinder 3a immediately before the injection of fuel, as described above, it may be configured to include an engine coolant temperature Tw.

Figure 4:
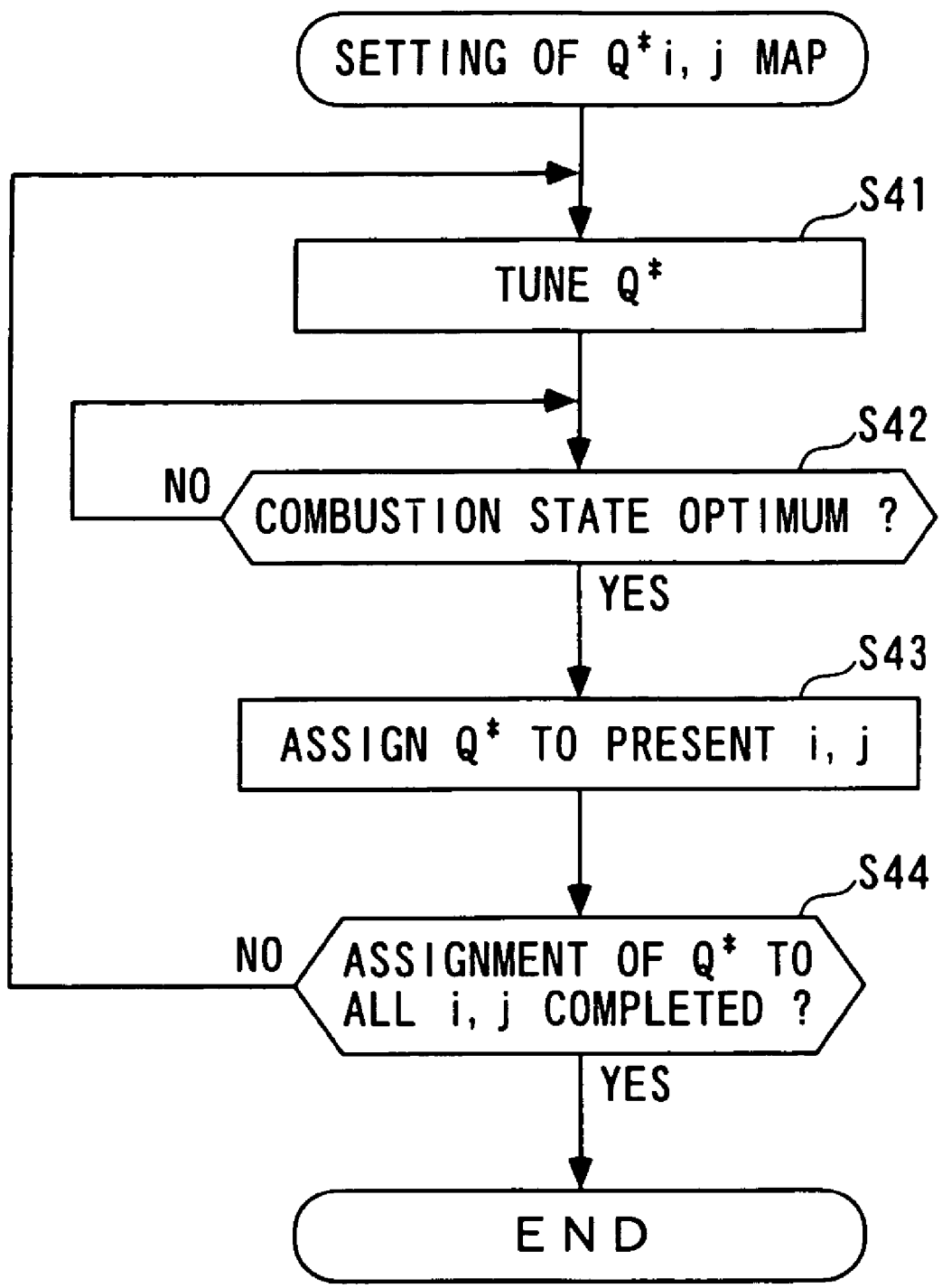
FIG. 4 is a flowchart showing a process for setting a $Q^*i,j$ map.

FIG. 4 shows a map-setting process for setting a $Q^*i,j$ map. The $Q^*i,j$ map is for determining an optimum fuel injection parameter $Q^*i,j$ for the in-cylinder condition parameter [O2] and the engine speed Ne, in the steady state of the engine 3. The fuel injection parameter $Q^*i,j$ is comprised of the three control parameters in total: injection pressure Pe, an injection time period De, and injection timing TMe of the injector 6. The subscript i represents an address of the engine speed Ne, while the subscript j an address of the in-cylinder condition parameter [O2]. The map-setting process is performed in advance by bench test.

In the above map-setting process, first, the fuel injection parameter $Q^*$, that is, the injection pressure Pe, the injection time period Te, and the injection timing TMe are tuned (adjusted) while controlling the accelerator pedal opening AP, the degree of opening of the vane opening control valve 12, the EGR valve opening LE, and so forth, to respective certain fixed values (step 41). Then, in this state, it is determined whether or not the combustion state has become optimum (step 42). This determination is performed according to one predetermined appropriate criterion, e.g. according to any of the following criteria: the amount of NOx emission is minimum (best NOx); the fuel economy is best (best fuel economy); and the engine output is maximum (best output). Alternatively, the determination may be carried out according to each of these criteria to thereby set the fuel injection parameter $Q^*$.

Figure 5:
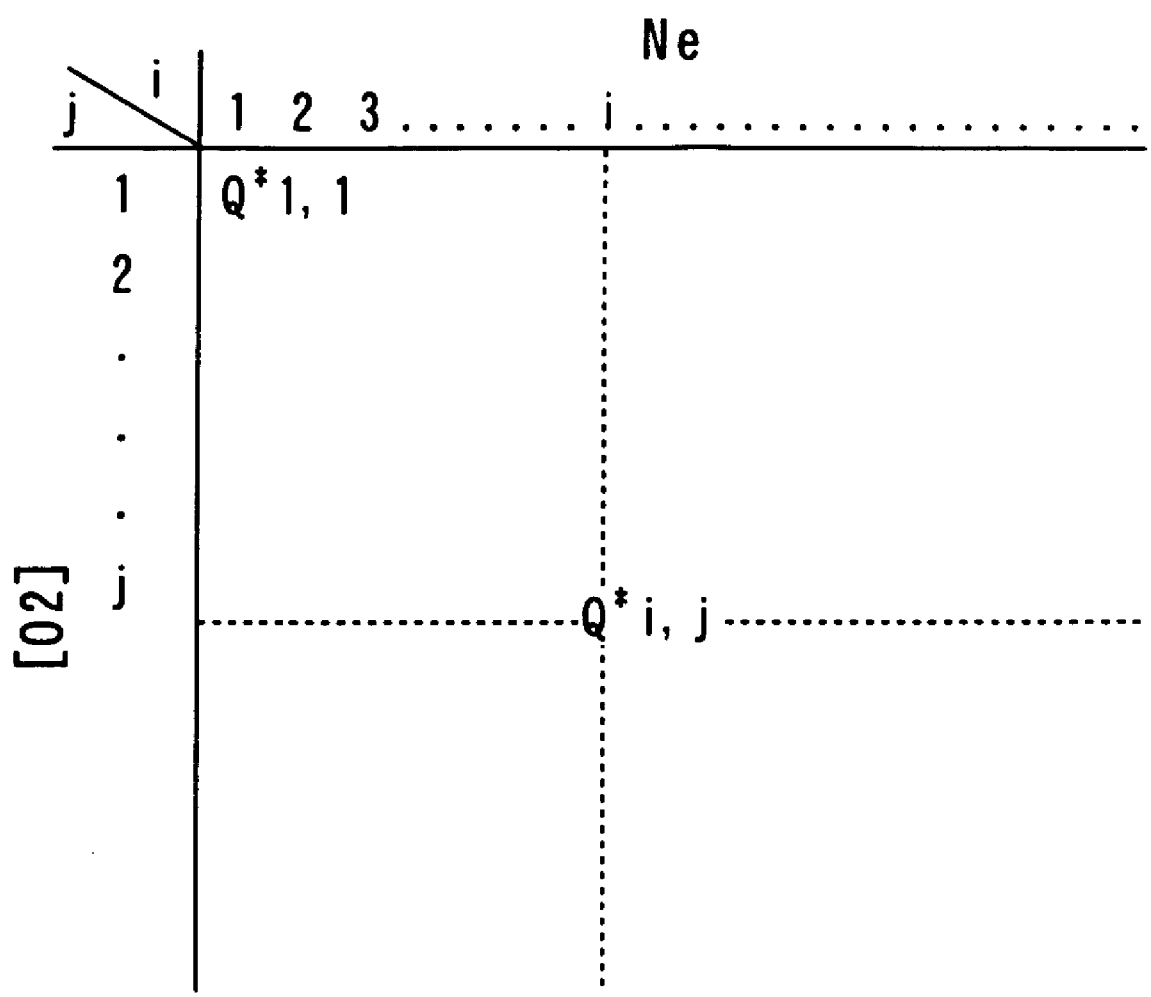
FIG. 5 is a diagram showing the $Q^*i,j$ map.

If the answer to the question of the step 42 is affirmative (Yes), i.e. when the combustion state has become optimum, a value of the fuel injection parameter Q* at this time is assigned to an address i,j determined by the respective addresses i and j associated with the present values of the engine speed Ne and the in-cylinder condition parameter [O2] (step 43). Thus, one value (more specifically, one set of parameter values) of the fuel injection parameter Q*i,j is determined. Then, it is determined whether or not the fuel injection parameter Q* has been assigned to all addresses i,j defined by all possible pairs of the addresses i and j associated with the Ne values and [O2] values. If the answer to this question is negative (No), the above-described steps 41 to 43 are repeatedly performed, and when the answer has become affirmative (Yes), the present process is terminated. As a result, the Q*i,j map as shown in FIG. 5 is obtained, in which the fuel injection parameter Q*i,j is assigned to all addresses i,j defined by the addresses i and j associated with the values of the engine speed Ne and the in-cylinder condition parameter [O2].

Therefore, if the engine speed Ne and the in-cylinder condition parameter [O2] are determined in the steady state of the engine 3, the fuel injection parameter Q*i,j corresponding to the address i,j thereof is read out from the Q*i,j map, whereby it is possible to unconditionally determine the optimum fuel injection parameter Q*, that is, the respective optimum values of the injection pressure Pe, the injection time period De, and the injection timing TMe, for the present state of the combustion chamber 3d. Further, when the fuel injection parameter Q*i,j is determined, torque T of the engine 3 to be obtained at this time is also unconditionally determined with the address i,j as a function, and the determined torque Ti,j is stored as a value of a Ti,j map (not shown).

It should be noted that the Q*i,j map and the Ti,j map are each set separately for the lean operation and for the rich operation, and further the rich operation map is set separately for reducing NOx and for removing sulfur. Further, in the engine control according to the present embodiment, all the control parameters including the fuel injection parameter Q*i,j and the torque T are set based on the address i,j.

The above Q*i,j map is set assuming that the engine 3 is in the steady state. This is because if the engine 3 is in the steady state, the in-cylinder inert gas amount mint and the actual intake manifold temperature Ti are almost unconditionally determined with respect to a certain value of the in-cylinder oxygen amount mo2, and the relationship between the three parameters can be regarded as substantially constant, and hence the optimum fuel injection parameter Q* is also unconditionally determined for the state of the combustion chamber 3d represented by the above three parameters. In the transient state of the engine 3, however, the relationship between the three parameters deviates from that in the steady state of the engine 3. For example, even if the in-cylinder oxygen amount mo2 is the same as in the steady state of the engine 3, the in-cylinder inert gas amount mint and the actual intake manifold temperature Ti assume different values from values they assume in the steady state of the engine 3, so that the combustion state also varies accordingly. Therefore, in the transient state of the engine 3, it is impossible to determine the optimum fuel injection parameter Q* simply by referring to the Q*i,j map.

In view of this, to quantitatively compensate for influence which the deviations of the in-cylinder inert gas amount mint and the actual intake manifold temperature Ti in the transient state of the engine 3 have on the combustion of fuel, a correction function f(α, β)i,j is introduced which is expressed by the following equation (17):

$$f(\alpha, \beta)i,j = (\text{mint}/\text{mints})^{-\alpha i,j} \times (Ti/Tis)^{\beta i,j} \quad (17)$$

The above correction function f(α, β)i,j is used to convert an actual in-cylinder oxygen amount mo2 in the transient state of the engine 3 into an in-cylinder oxygen amount mo2v in the steady state of the engine 3, which is equivalent to the actual in-cylinder oxygen amount mo2, (hereinafter referred to as "the imaginary in-cylinder oxygen amount mo2v"), as expressed by the following equation (18):

$$mo2v = mo2 \times f(\alpha, \beta)i,j \quad (18)$$

In the equation (17), mints and Tis represent an in-cylinder inert gas amount and an actual intake manifold temperature in the steady state of the engine 3, respectively. Further, mint and Ti represent the actual in-cylinder inert gas amount and the actual intake manifold temperature in the transient state of the engine 3, respectively, which are calculated by the method described above. More specifically, in the equation (17), the first term $(\text{mint}/\text{mints})^{-\alpha i,j}$ represents the degree of influence of the deviation of the in-cylinder inert gas amount on the combustion of fuel, and the second term $(Ti/Tis)^{\beta i,j}$ represents the degree of influence of the deviation of the intake manifold temperature on the combustion of fuel. Further, αi,j, and βi,j represent correction variables for defining the above degree of influence. Therefore, in an operating condition of the engine 3, in which the EGR system 14 is stopped, and it is judged that there is no influence of the in-cylinder inert gas amount on the control, the correction variable α is set to a value of 0.

Figure 6:
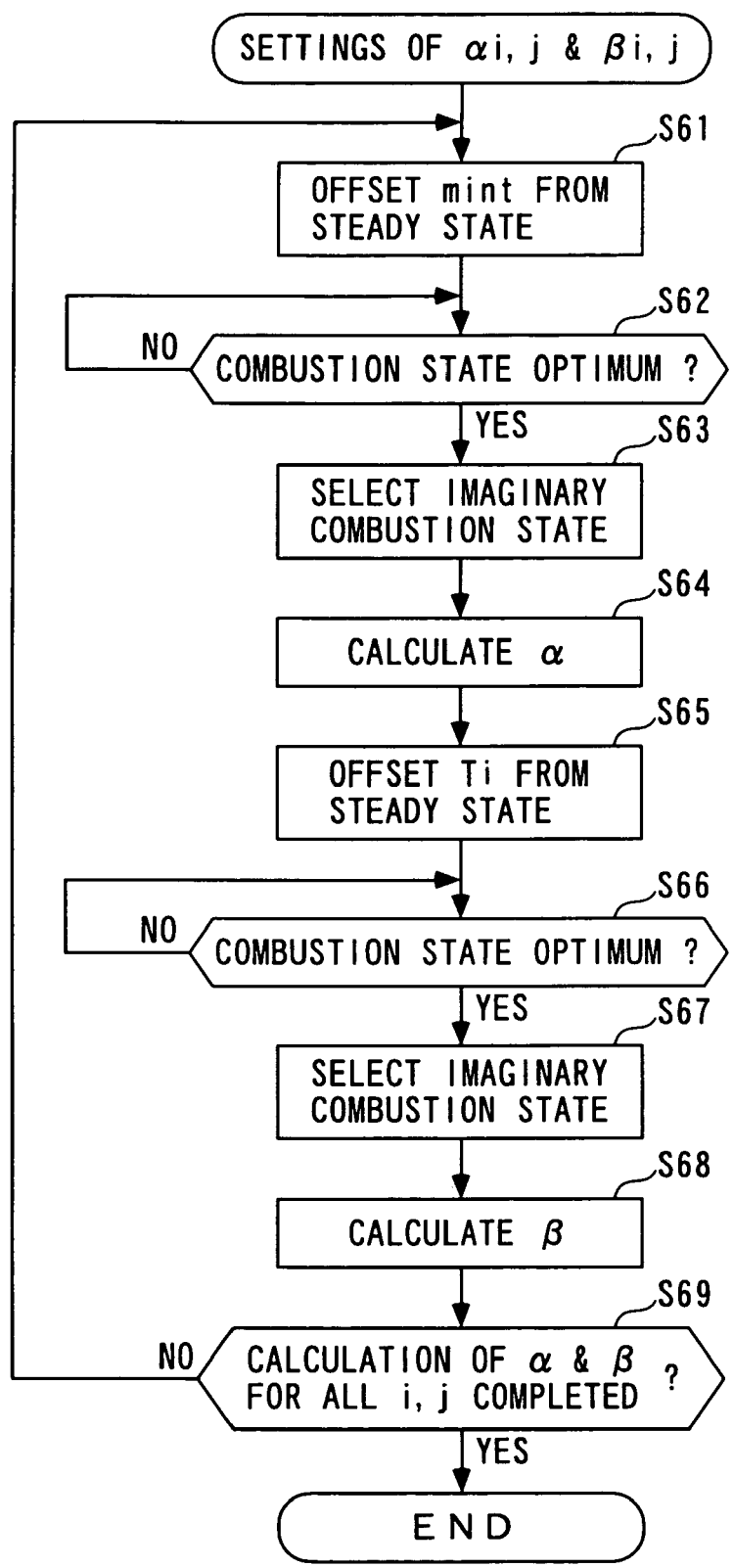
FIG. 6 is a flowchart showing a process for setting correction variables $\alpha i,j$ and $\beta i,j$.

FIG. 6 shows a correction variable-setting process for setting the correction variables αi,j and βi,j. This process is performed in advance by bench test, similarly to the Q*i,j map-setting process described hereinabove. In the correction variable-setting process, first, the degree of opening of the vane opening control valve 12 and/or the EGR valve opening LE are/is changed from (a) value(s) thereof assumed in the steady state of the engine 3 in which the engine 3 is operated at constant engine speed Ne by a fixed value of the in-cylinder condition parameter [O2], whereby only the in-cylinder inert gas amount mint is offset (changed slightly) (step 61). Then, it is determined whether or not the combustion state has become optimum while tuning the fuel injection parameter Q* in the above offset state of the in-cylinder inert gas amount mint (step 62). This determination is performed according to the same criteria as employed for setting the Q*i,j map.

If the answer to the question of the step 62 is affirmative (Yes), a combustion state in the steady state of the engine 3, which is closest to the present combustion state, is selected from the Q*i,j map as an imaginary combustion state (step 63). This selection is performed e.g. by determining in advance an approximate function of a heat generation ratio at each address i,j in the Q*i,j map, and identifying an address j having a value of the approximate function closest to the present value of heat generation ratio, on an address i corresponding to a value of the engine speed Ne before offsetting the in-cylinder inert gas amount mint. When the address i,j is identified as described above, a value of the in-cylinder condition parameter [O2] as well is identified, and a value of the in-cylinder oxygen amount mo2 included in the value of the in-cylinder condition parameter [O2] is determined as the imaginary in-cylinder oxygen amount mo2v.

Then, the correction variable α is calculated (step 64). This calculation is performed as follows: The imaginary in-cylinder oxygen amount mo2v is determined in the above step 63, and the in-cylinder oxygen amount mo2 is calculated by the equation (11) as required, and hence the correction function f(α, β)i,j is determined using the values of mo2v and mo2 and the equation (18), by the following equation (19):

$$f(\alpha, \beta)i,j = mo2v/mo2 \quad (19)$$

On the other hand, the in-cylinder inert gas amount mint in the equation (17) is calculated by the equation (16) as required, and the in-cylinder inert gas amount mints in the steady state of the engine 3 is already known from the address j before offsetting the in-cylinder inert gas amount mint. Further, Ti/Tis is equal to a value of 1 since the intake manifold temperature Ti is not offset. Therefore, the following equation (20) holds, and the correction variable α can be calculated by the equations (20) and (19).

$$f(\alpha, \beta)i,j = (mint/mints)^{-\alpha i,j} \quad (20)$$

Subsequently, to calculate the correction variable β, the degree of opening of the vane opening control valve 12 and/or the EGR valve opening LE are/is changed from the value(s) thereof assumed in the steady state of the engine 3, whereby only the actual intake manifold temperature Ti is offset (step 65). Hereinafter, similarly to the steps 62 to 64, it is determined whether or not the combustion state has become optimum (step 66); a combustion state in the steady state of the engine 3, which is closest to an optimum combustion state, is selected as an imaginary combustion state (step 67); and the correction variable β is calculated using the selected imaginary combustion state and the equations (17) and (18) (step 68). Thus, the correction variables α and β are set with respect to one address i,j. Then, it is determined whether or not the correction variables α and β have been calculated for all the addresses i,j corresponding to all possible pairs of Ne values and [O2] values (step 69). If the answer to this question is negative (No), the above-described steps 61 to 68 are repeatedly performed, and when the answer has become affirmative (Yes), the present process is terminated. Thus, the correction variables α and β are set for all the addresses i,j, and stored in an α i,j map and a βi,j map, and the correction function f(α, β)i,j is set according to the map values αi,j and βi,j.

Figure 7:
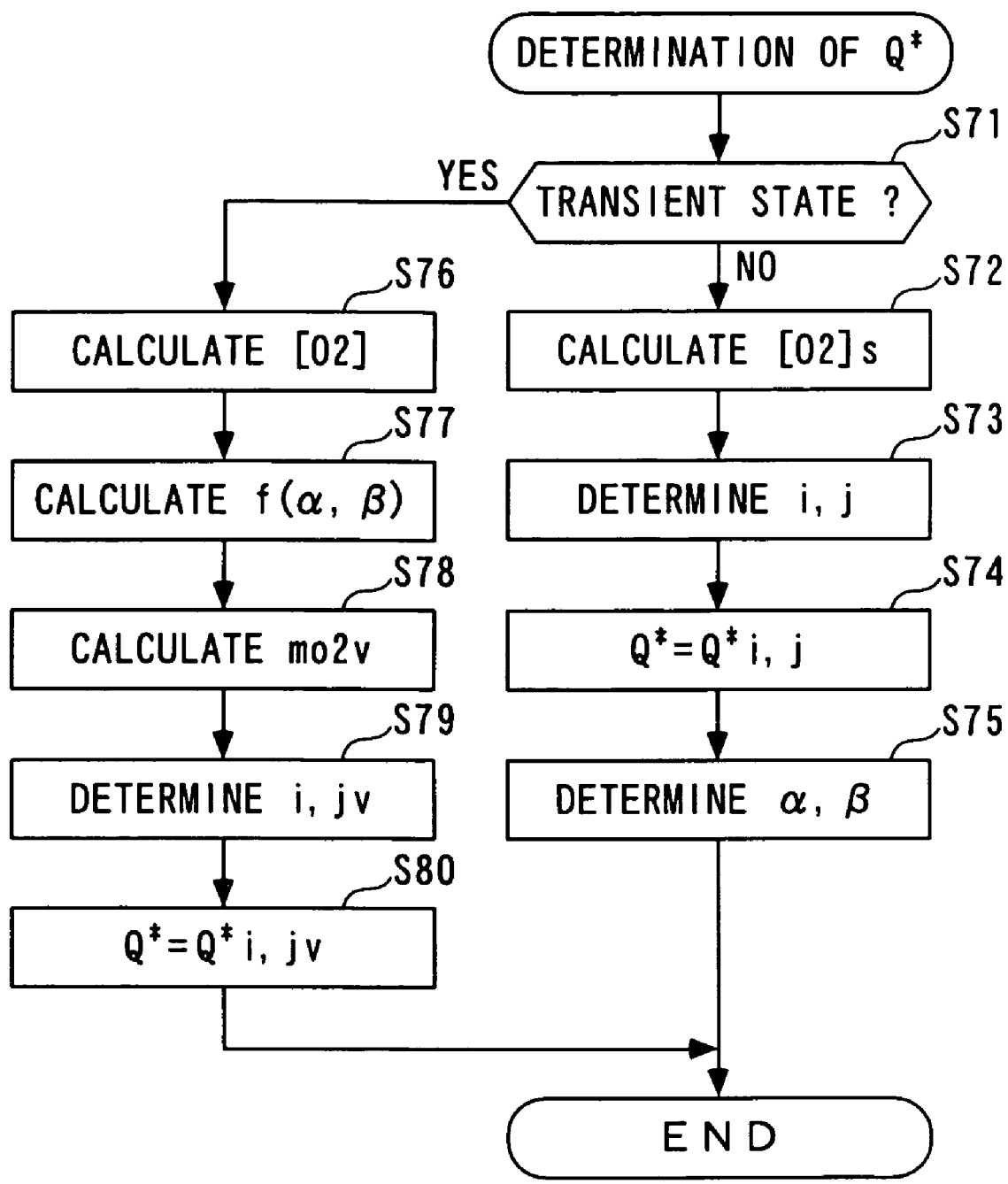
FIG. 7 is a flowchart showing a process for determining a fuel injection parameter $Q^*$.

FIG. 7 shows a process for determining the fuel injection parameter Q*i,j during operation of the engine 3, using the Q*i,j map and the correction function f(α, β)i,j, set in advance as described above. First, it is determined whether or not the engine 3 is in a transient state (step 71). If the answer to this question is negative (No), i.e. if the engine 3 is in a steady state, the in-cylinder condition parameter [O2]s (in-cylinder oxygen amount mo2s, in-cylinder inert gas amount mints, and actual intake manifold temperature Tis) in the steady state are calculated by the above-described method (step 72). Next, the address i,j corresponding to the engine speed Ne and the calculated in-cylinder condition parameter [O2] are determined (step 73), and the fuel injection parameter Q*i,j corresponding to the determined address i,j is read out from the Q*i,j map and determined as the fuel injection parameter Q* (step 74). Further, the correction variables α and β are determined by searching the αi,j map and the βi,j map (step 75).

If the answer to the question of the step 71 is affirmative (Yes), i.e. if the engine 3 has shifted from the steady state to the transient state, the in-cylinder condition parameter [O2] (mo2, mint, and Ti) in the steady state is calculated (step 76). Then, the correction function f(α, β)i,j is calculated by the equation (17), using the calculated values of mint and Ti, the values of mints and Tis in the steady state, which are calculated in the step 72, and the correction variables α and β determined in the step 75.

Figure 8:
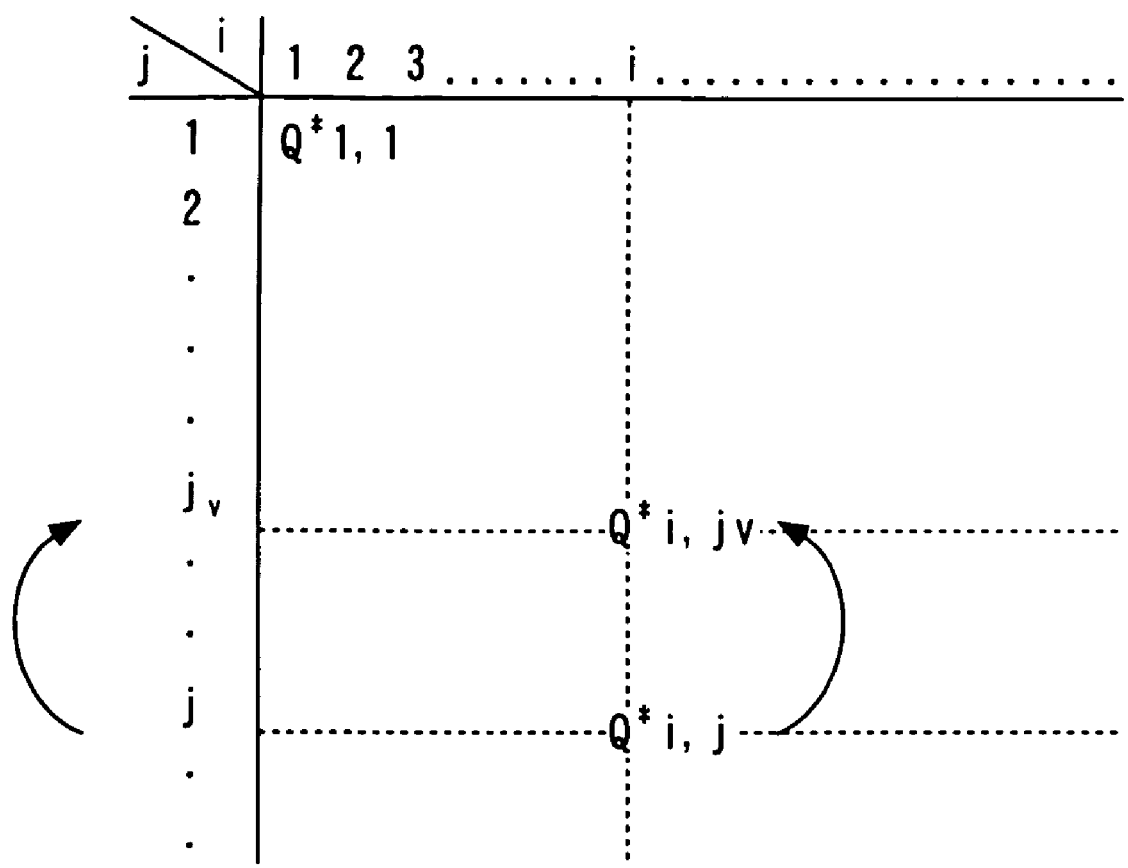
FIG. 8 is a diagram useful in explaining a method of determining an imaginary address $i,jv$.

Subsequently, the imaginary in-cylinder oxygen amount mo2v is determined by the equation (18) using the calculated correction function f(α, β)i,j, and the in-cylinder oxygen amount mo2 calculated in the step 76. Thus, the actual in-cylinder oxygen amount mo2 in the transient state of the engine 3 is converted into the imaginary in-cylinder oxygen amount mo2v in the steady state of the engine 3. Then, a value of the in-cylinder condition parameter [O2] including a value of the in-cylinder oxygen amount mo2 closest to the calculated imaginary in-cylinder oxygen amount mo2v is selected on the same address i, and an address i,j corresponding to the value of the in-cylinder condition parameter [O2] is determined as an imaginary address i,jv (step 79). Thus, as shown in FIG. 8, the address of the in-cylinder condition parameter [O2] is moved from j in the steady state of the engine 3 to jv in the transient state thereof, in the Q*i,j map. Then, a fuel injection parameter Q*i,jv corresponding to the imaginary address i,jv is read out from the Q*i,j map, and determined as the fuel injection parameter Q*. Further, when the fuel injection parameter Q*i,jv is determined, torque T of the engine 3 obtained at this time can be determined from the Ti,j map by assuming that T=Ti,jv holds.

Figure 9:
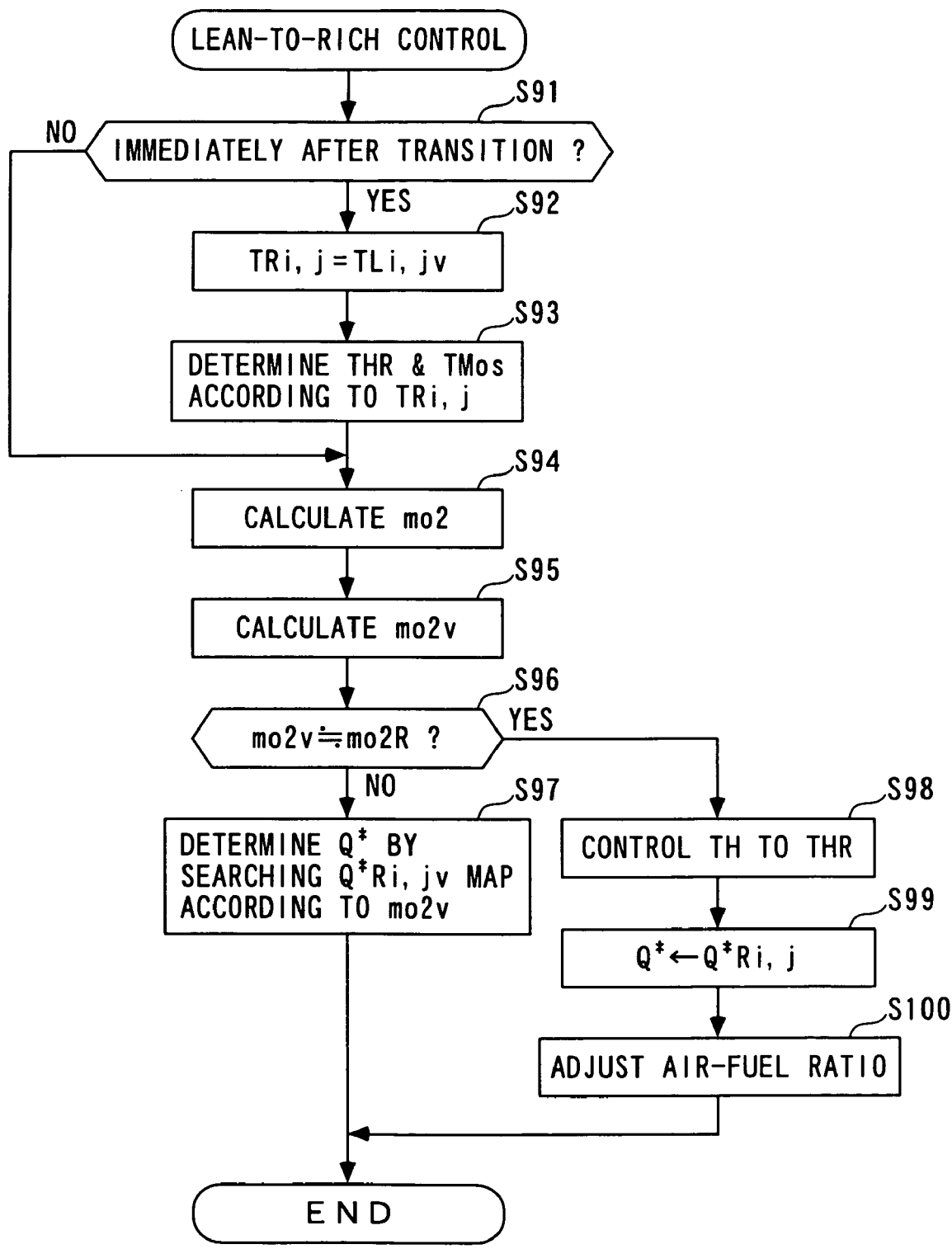
FIG. 9 is a flowchart showing a control process performed during transition from a lean operation to a rich operation.

FIG. 9 shows a control process including a fuel injection control process performed during transition from the lean operation to the rich operation. In this process, first, it is determined whether or not the present loop is performed immediately after transition from the lean operation to the rich operation (step 91). If the answer to this question is affirmative (Yes), i.e. if the present loop is performed immediately after the transition, an address i,j, which corresponds to the same engine speed Ne as assumed immediately before the transition, and at the same time sets the same torque value as a value of torque Tli,jv assumed immediately before the transition, is identified in a TRi,j map for use in the rich operation, and torque TRi,j (=TLi,jv) at the address i,j is set as the target torque of a transition destination (step 92). When the address i,j of the transition destination is identified as described above, a target fuel injection parameter Q*Ri,j and a target in-cylinder oxygen amount mo2R are accordingly determined automatically.

Then, a target throttle valve opening THR and an overshooting time period TMos corresponding to a transition time period are set according to the target torque TRi,j set in the step 92 (step 93), and the throttle valve 7 is driven according to the settings, followed by the process proceeding to a step 94. Further, if the answer to the question of the step 91 is negative (No), i.e. if the present loop is not performed immediately after the transition, the process skips over the steps 92 and 93 to a step 94. In the step 94, the actual in-cylinder oxygen amount mo2 is calculated, and then the calculated in-cylinder oxygen amount mo2 is corrected by the correction function f(α, β)i,j, whereby the imaginary in-cylinder oxygen amount mo2v is calculated (step 95).

Next, it is determined whether or not the calculated imaginary in-cylinder oxygen amount mo2v has become approximately equal to the target in-cylinder oxygen amount mo2R obtained in the step 92 (step 96). If the answer to this question is negative (No), it is judged that the transition to the rich operation is being performed, and fuel injection is controlled according to the imaginary in-cylinder oxygen amount mo2v, to the target of the map value Q*Ri,jv calculated by searching the Q*Ri,j map for use in the rich operation (step 97). On the other hand, if the answer to the question of the step 96 is affirmative (Yes), i.e. if the imaginary in-cylinder oxygen amount mo2v has become approximately equal to the target in-cylinder oxygen amount mo2R, it is judged that the transition time is over, and the throttle valve opening TH is set to the target throttle valve opening THR (step 98), while the fuel injection parameter Q* is set to the target fuel injection parameter Q*Ri,j (step 99). Then, the throttle valve opening TH, boost pressure, and so forth are finely adjusted according to the result of detection by the oxygen concentration sensor 29, whereby the air-fuel ratio A/F is adjusted (step 100), followed by terminating the present process. After the transition time is over, fuel injection control in the steady state of the engine 3 is carried out according to the engine speed Ne and the in-cylinder condition parameter [O2] based on the Q*Ri,j map for use in the rich operation.

Figure 10:
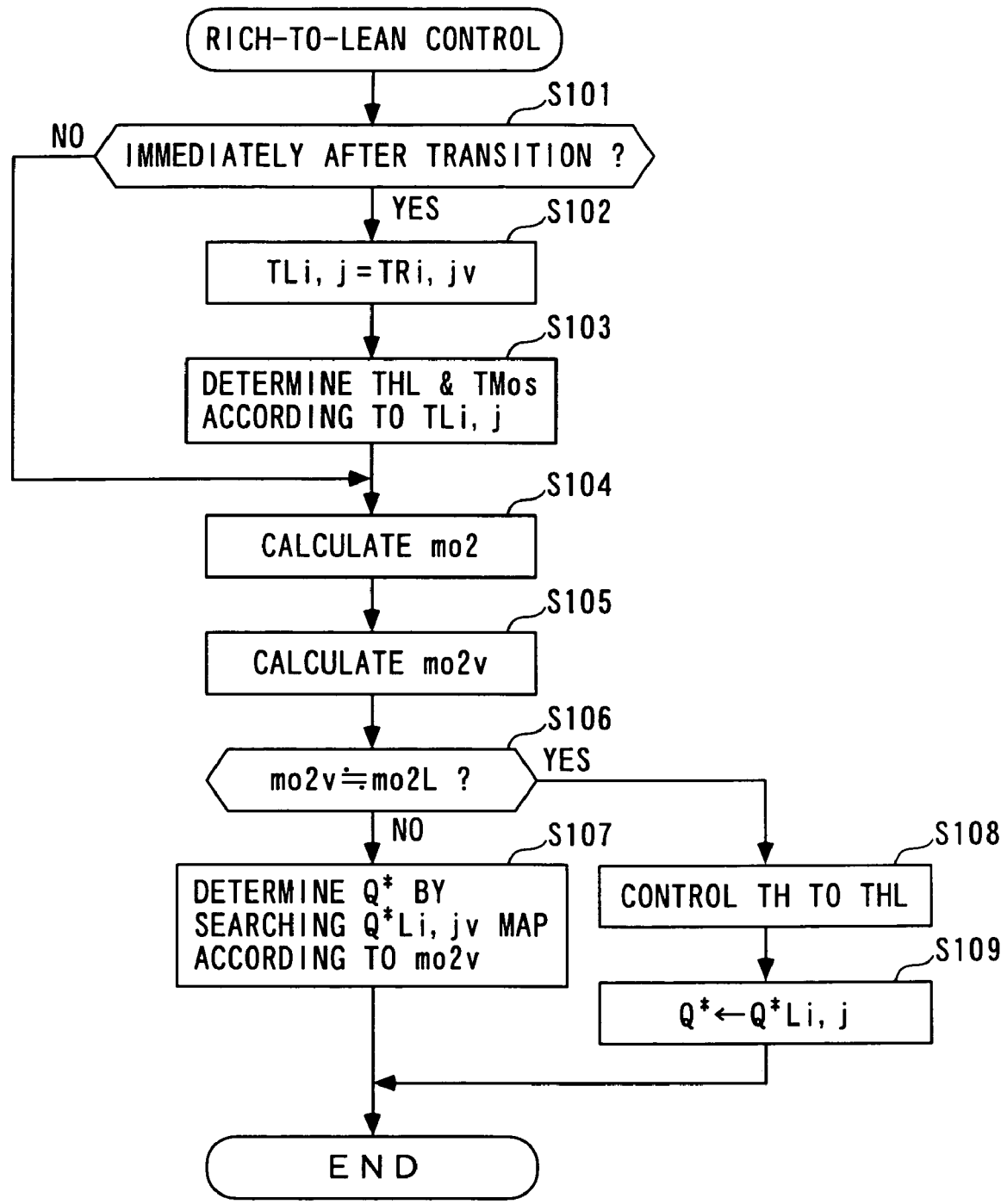
FIG. 10 is a flowchart showing a control process performed during transition from the rich operation to the lean operation.

FIG. 10 shows a control process including a fuel injection control process performed during a transition time period from the rich operation to the lean operation, inversely to the case shown in FIG. 9. Basically, this process is carried out similarly to the FIG. 9 process except that the relationship between the rich and lean operations is inverted. More specifically, immediately after transition from the rich operation to the lean operation (Yes to step 101), an address i,j, which corresponds to the same engine speed Ne as assumed immediately before the transition, and at the same time sets the same torque value as a value of torque TRi,jv assumed immediately before the transition, is identified in a TLi,j map for use in the lean operation, and torque TLi,j at the address i,j is set to a target torque in the lean operation (step 102). By the identification of the address i,j, the target fuel injection parameter Q*Li,j and the target in-cylinder oxygen amount mo2L as well are determined automatically.

Then, the target throttle valve opening THL and the overshooting time period TMos are set according to the target torque TLi,j (step 103), and the throttle valve 7 is driven according to the settings. Next, the actual in-cylinder oxygen amount mo2 is calculated (step 104), and the calculated in-cylinder oxygen amount mo2 is corrected by the correction function f($\alpha$, $\beta$)i,j, whereby the imaginary in-cylinder oxygen amount mo2v is calculated (step 105).

If the imaginary in-cylinder oxygen amount mo2v has not reached the target in-cylinder oxygen amount mo2L (No to step 106), i.e. if the transition to the lean operation is being performed, fuel injection is controlled according to the imaginary in-cylinder oxygen amount mo2v, to the target of the map value Q*Li,jv calculated by searching the Q*Li,j map for use in the lean operation (step 107). On the other hand, if the imaginary in-cylinder oxygen amount mo2v has become approximately equal to the target in-cylinder oxygen amount mo2L (Yes to step 106), i.e. if the transition time is over, the throttle valve opening TH is controlled to the target throttle valve opening THL (step 108), and the fuel injection parameter Q* is set to the target fuel injection parameter Q*Li,j (step 109), followed by terminating the present process. After the transition time is over, fuel injection control in the steady state of the engine 3 is carried out according to the engine speed Ne and the in-cylinder condition parameter [O2] based on the Q*Li,j map for use in the lean operation.

As described above, in the present embodiment, while the Q*i,j map for use in the steady state is set in advance, the in-cylinder condition parameter [O2] including the actual in-cylinder oxygen amount mo2 is calculated as required in the transient state of the engine 3, and the in-cylinder condition parameter [O2] is corrected by the correction function f($\alpha$, $\beta$)i,j, whereby the actual in-cylinder oxygen amount mo2 in the transient state is converted into the imaginary in-cylinder oxygen amount mo2v in the steady state. Then, the fuel injection parameter Q*i,jv is determined using the Q*i,j map for use in the steady state, according to the converted imaginary in-cylinder oxygen amount mo2v.

As a result, in the transient state of the engine 3, it is possible to accurately determine the optimum fuel injection parameter Q* for the actual combustion state while quantitatively compensate for influence which the deviations of the in-cylinder inert gas amount mint and the actual intake manifold temperature Ti, caused by the response delay of the EGR system 14 and the like, have on the combustion of fuel. Further, since the Q*i,j map for use in the steady state of the engine 3 can be used also in the transient state of the engine 3, it becomes completely unnecessary to provide maps for use in the transient state. For example, since there is no need to provide a large number of maps depending on the degrees of the deviations of the in-cylinder inert gas amount mint and the actual intake manifold temperature Ti in the transient state, it is possible to simplify the control programs, and facilitate the tuning of the engine 3.

In the method of determining the fuel injection parameter Q*, described hereinabove, the in-cylinder condition parameter [O2] including the in-cylinder oxygen amount mo2 is calculated e.g. based on the intake air amount Fa detected by the air flow sensor 27; the fuel injection parameter Q* is determined e.g. based on the in-cylinder condition parameter [O2]; and further the torque T is determined. On the other hand, when the engine 3 is in a high-load region, torque variation with respect to the intake air amount Fa increases, so that when the fuel injection parameter Q* is determined by the above method, torque variation due to the tolerance of the air flow sensor 27 increases, which makes output torque of the engine 3 unstable, and sometimes causes a torque step or like problem.

Figure 11:
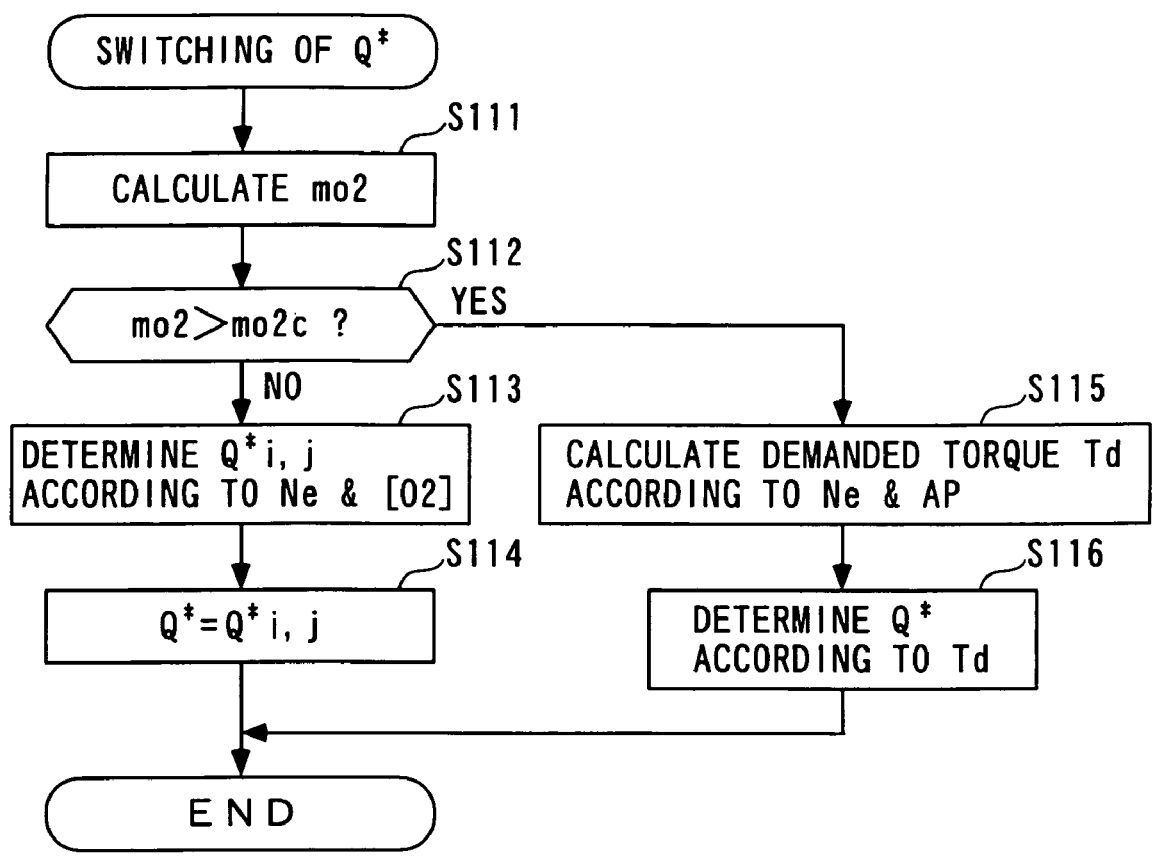
FIG. 11 is a flowchart showing a process for switching the fuel injection parameter $Q^*$.

To solve the above problem, in the present embodiment, the method of determining the fuel injection parameter Q* is configured to be switched depending on load on the engine 3. FIG. 11 shows a process for switching the method. In this process, first, the in-cylinder oxygen amount mo2 is calculated as a load parameter indicative of the load on the engine 3 (step 111). Then, it is determined whether or not the calculated in-cylinder oxygen amount mo2 is larger than a predetermined threshold value mo2c (step 112). If the answer to this question is negative (No), i.e. if mo2≦mo2c holds, it is judged that the load on the engine 3 is not high, and the map value Q*i,j is determined following the above-described method, by searching the Q*i,j map according to the engine speed Ne and the in-cylinder condition parameter [O2] (step 113), and set to the fuel injection parameter Q* (step 114).

On the other hand, if the answer to the question of the step 112 is affirmative (Yes), i.e. if mo2>mo2c holds, it is judged that the load on the engine 3 is high, and demanded torque is calculated according to the engine speed Ne and the accelerator pedal opening AP (step 115). Then, the fuel injection parameter Q* is determined according to the calculated demanded torque (step 116), followed by terminating the present process. As described hereinabove, when the load on the engine 3 is high, the fuel injection parameter Q* is directly determined according to the engine speed Ne and the accelerator pedal opening AP without using the in-cylinder condition parameter [O2]. Therefore, during high-load operation of the engine 3, the output torque of the engine 3 can be controlled with accuracy according to the actual demanded torque without being adversely affected by torque variation due to the tolerance of the air flow sensor 27, whereby it is possible to ensure excellent drivability.

Next, in-cylinder pressure feedback (F/B) control for correcting the fuel injection parameter Q* according to in-cylinder pressure P detected by the in-cylinder pressure sensor 21 will be described with reference to FIGS. 12 to 17. The in-cylinder pressure F/B control is for optimizing the fuel injection parameter Q* by compensating for the tolerance of a fuel injection system including the injector 6, particularly the tolerance of the fuel injection amount, the tolerance of the air flow sensor 27, an error of the EGR model for calculating the in-cylinder condition parameter [O2], and so forth, according to the in-cylinder pressure P, as required. To this end, in the in-cylinder pressure F/B control, an allowable range (maximum allowable value and minimum allowable value) of the combustion parameter indicative of the combustion state is set in advance for each address i,j. Further, the combustion parameter is extracted from the detected in-cylinder pressure P during operation of the engine 3, and when the extracted combustion parameter is out of the allowable range, the fuel injection parameter Q*i,j in the Q*i,j map is rewritten and updated.

Figure 12:
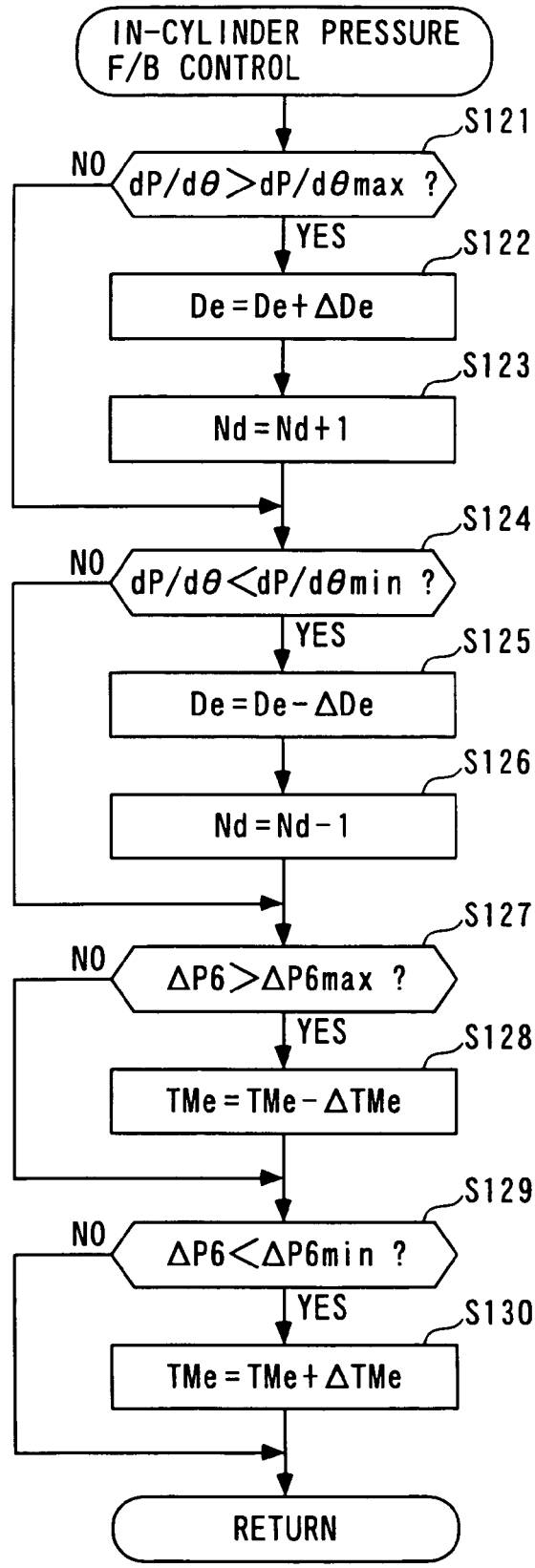
FIG. 12 is a flowchart showing an in-cylinder pressure feedback control process in the case where pilot injection is not performed in a low-temperature combustion mode.

FIGS. 12 and 13 show an in-cylinder pressure F/B control process in the case where pilot injection is not performed in the low-temperature combustion mode. In this case, fixed point differential pressure $\Delta P6$ and a maximum pressure increasing rate $dP/d\theta$ as shown in FIG. 13 are used as combustion parameters. The fixed point differential pressure $\Delta P6$ indicates the difference (=P6−P0) between a value P6 of the in-cylinder pressure P obtained when a crank angle $\theta$ indicates a predetermined or fixed point (6 degrees, in this case) after the TDC position, and a value P0 of the in-cylinder pressure P obtained when the crank angle $\theta$ indicates the TDC position. It should be noted that suitable angles other than the above may be used as the two fixed points of the crank angle $\theta$. Further, the maximum pressure increasing rate $dP/d\theta$ indicates the maximum value of the increasing rate of the in-cylinder pressure P with respect to the crank angle $\theta$ after the TDC position.

In the FIG. 12 control process, first, it is determined whether or not the maximum pressure increasing rate $dP/d\theta$ is larger than a predetermined maximum allowable value $dP/d\theta_{max}$ set for the present address i,j (step 121). If the answer to this question is affirmative (Yes), i.e. if $dP/d\theta > dP/d\theta_{max}$ holds, it is judged that out of the present fuel injection parameter Q*i,j, the injection time period De is too short, and to increase the injection time period De, a value obtained by adding a predetermined value $\Delta De$ to the value of De is set to a new value of the injection time period De to update the injection time period De (step 122). Then, an increase/decrease counter Nd for counting the number of times of increase/decrease in the injection time period De is incremented (step 123). If the answer to the question of the step 121 is negative (No), it is determined whether or not the maximum pressure increasing rate $dP/d\theta$ is smaller than a predetermined minimum allowable value $dP/d\theta_{min}$ (step 124). If the answer to this question is affirmative (Yes), i.e. if $dP/d\theta < dP/d\theta_{min}$ holds, it is judged that the injection time period De is too long, and to decrease the injection time period De, a value obtained by subtracting the predetermined value $\Delta De$ from the value of De is set to a new value of the injection time period De to update the injection time period De (step 125). Then, the increase/decrease counter Nd is decremented (step 126). On the other hand, if the answer to the question of the step 124 is negative (No), i.e. if $dP/d\theta_{min} \leq dP/d\theta \leq dP/d\theta_{max}$ holds, it is judged that the maximum pressure increasing rate $dP/d\theta$ is within the allowable range, and the process proceeds to a step 127 without correcting the injection time period De.

In the step 127, it is determined whether or not the fixed point differential pressure $\Delta P6$ is larger than a predetermined maximum allowable value $\Delta P6_{max}$. If the answer to this question is affirmative (Yes), i.e. if $\Delta P6 > \Delta P6_{max}$ holds, it is judged that out of the present fuel injection parameter Q*i,j, the injection timing TMe is too early, and to retard the injection timing TMe, a value obtained by subtracting a predetermined value $\Delta TMe$ from the value of TMe is set to a new value of the injection time period De to update the injection timing TMe (step 128). If the answer to the question of the step 127 is negative (No), it is determined whether or not the fixed point differential pressure $\Delta P6$ is smaller than a predetermined minimum allowable value $\Delta P6_{min}$ (step 129). If the answer to this question is affirmative (Yes), i.e. if $\Delta P6 < \Delta P6_{min}$ in holds, it is judged that the injection timing TMe is too late, and to advance the injection timing TMe, a value obtained by adding the predetermined value $\Delta TMe$ to the value of TMe is set to a new value of the injection timing TMe to update the injection timing TMe (step 130). On the other hand, if the answer to the question of the step 129 is negative (No), i.e. if $\Delta P6_{min} \leq \Delta P6 \leq \Delta P6_{max}$ holds, it is judged that the fixed point differential pressure $\Delta P6$ is within the allowable range, and the present process is immediately terminated, without correcting the injection timing TMe.

As described above, when the pilot injection is not performed in the low-temperature combustion mode, by comparing the maximum pressure increasing rate $dP/d\theta$, which is a combustion parameter, with the maximum and minimum allowable values $dP/d\theta_{max}$ and $dP/d\theta_{min}$ set for each address i,j, the injection time period De can be optimized as required. Further, by comparing the fixed point differential pressure $\Delta P6$, which is another combustion parameter, with the maximum and minimum allowable values $\Delta P6_{max}$ and $\Delta P6_{min}$ set for each address i,j, the injection timing TMe can be optimized as required.

Figure 14:
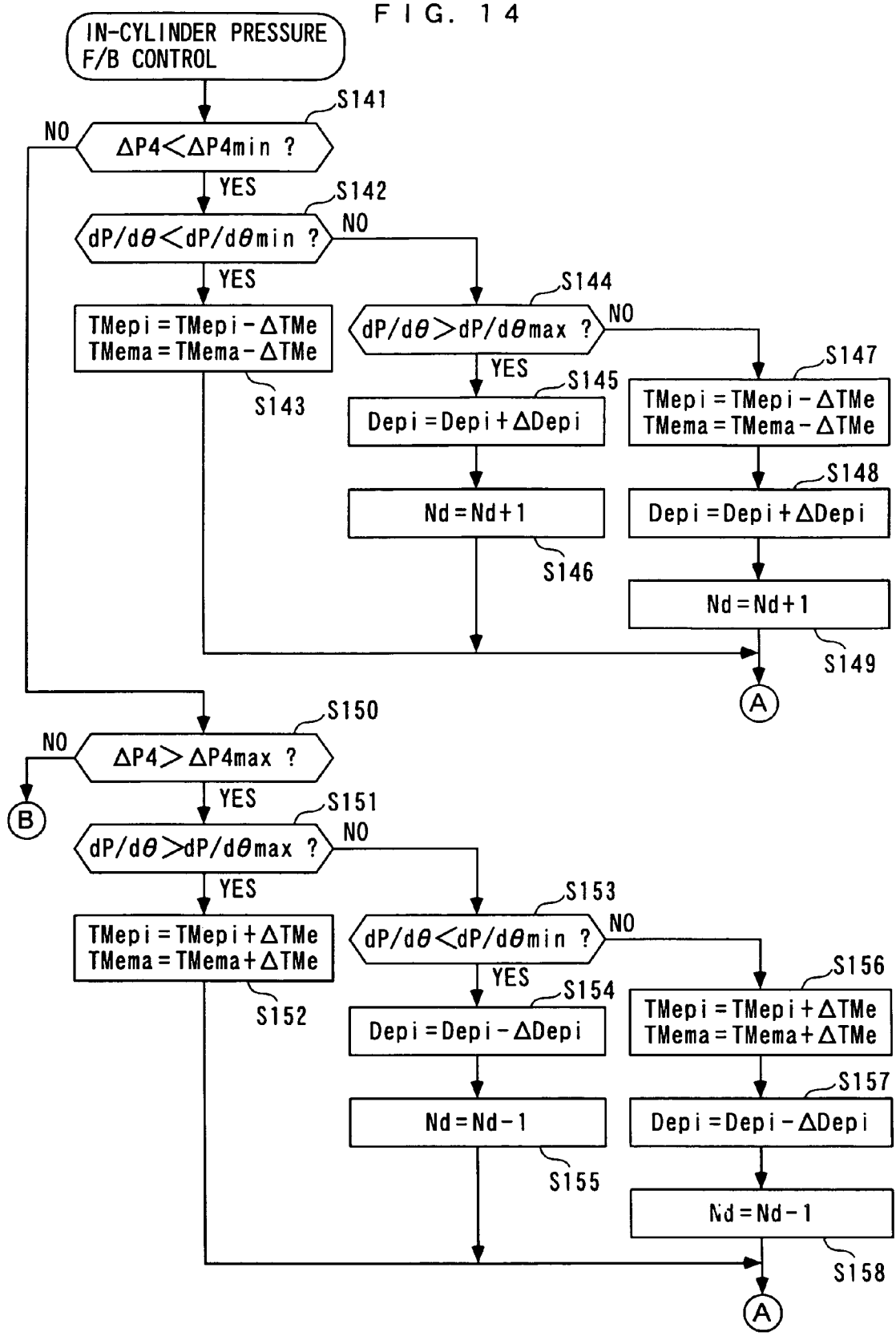
FIG. 14 is a flowchart showing an in-cylinder pressure feedback control process in the case where the pilot injection is performed in a normal combustion mode.
Figure 15:
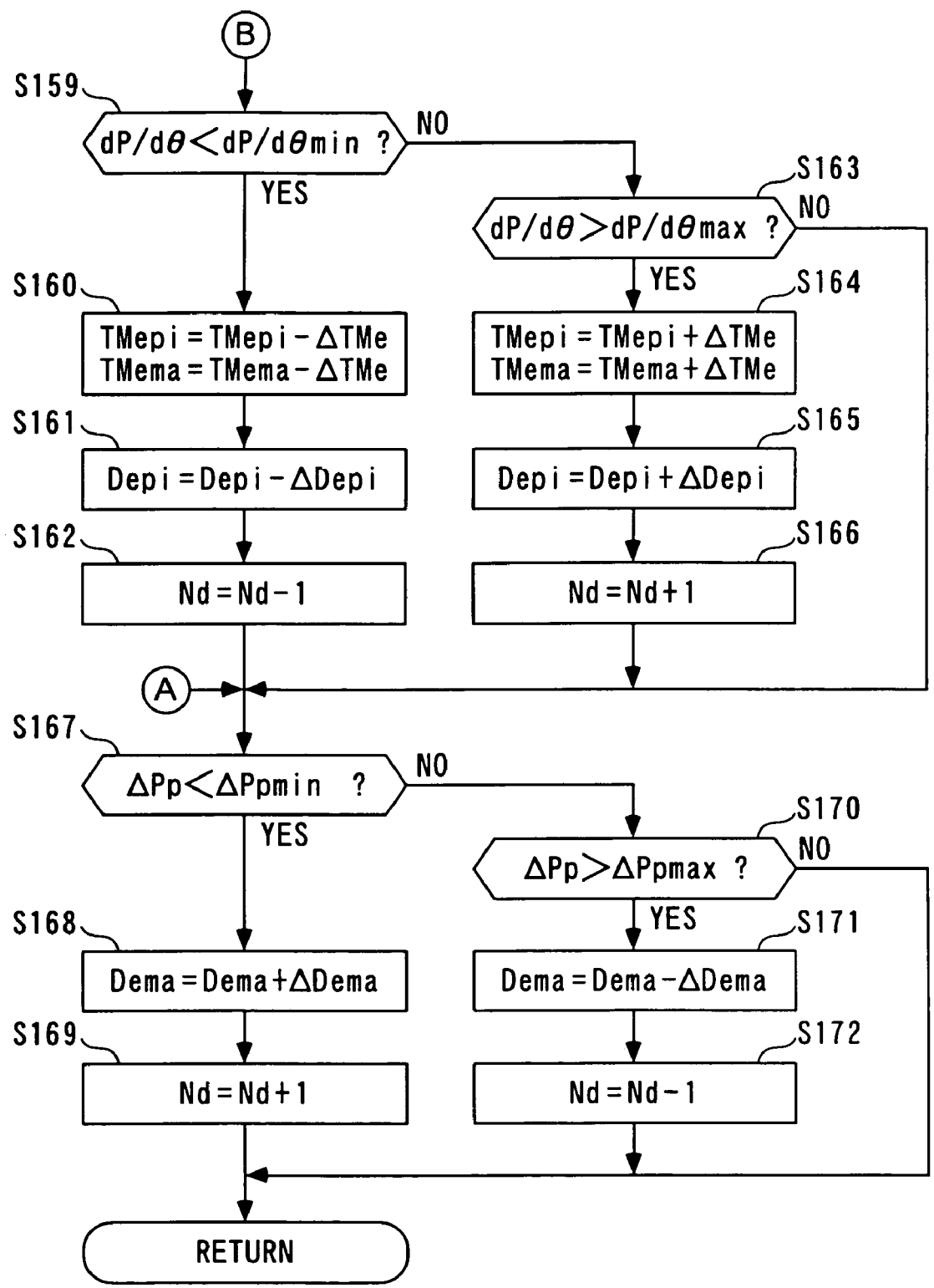
FIG. 15 is a flowchart showing a continuation of the in-cylinder pressure feedback control process shown in FIG. 14.
Figure 16:
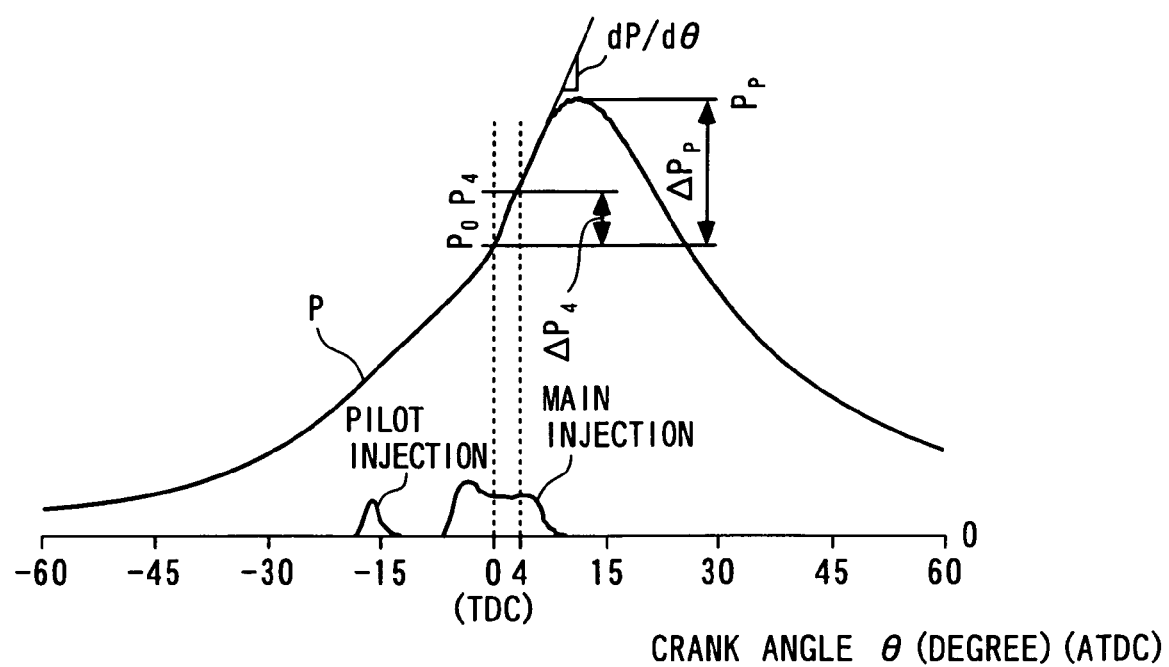
FIG. 16 is a diagram useful in explaining combustion parameters used in the in-cylinder pressure feedback control process shown in FIGS. 14 and 15.

FIGS. 14 to 16 show the in-cylinder pressure F/B control process in the case where pilot injection is performed in the normal combustion mode. In this case, as shown in FIG. 16, peak differential pressure $\Delta Pp$ is used as a combustion parameter in addition to the fixed point differential pressure $\Delta P4$ between the two fixed points (4 degrees after the TDC position and the TDC position) and the maximum pressure increasing rate $dP/d\theta$ as used in the case of the low-temperature combustion mode. The peak differential pressure $\Delta Pp$ represents the difference (=Pp−P0) between a peak value Pp of the in-cylinder pressure P, obtained after the TDC position, and the value P0 of the in-cylinder pressure P, obtained at the TDC position.

In the control process shown in FIGS. 14 and 15, first, in steps 141 to 166, an injection time period Depi and injection timing TMepi of the pilot injection, and injection timing TMema in main injection are corrected according to the fixed point differential pressure $\Delta P4$ and the maximum pressure increasing rate $dP/d\theta$, and thereafter in steps 167 to 172, an injection time period Dema in the main injection is corrected according to detected peak differential pressure $\Delta Pp$.

First, in the step 141, it is determined whether or not the fixed point differential pressure $\Delta P4$ is smaller than a minimum allowable value $\Delta P4_{min}$. If the answer to this question is affirmative (Yes), it is determined whether or not the maximum pressure increasing rate $dP/d\theta$ is smaller than the minimum allowable value $dP/d\theta_{min}$ (step 142). If the answer to this question is affirmative (Yes), i.e. if $\Delta P4<\Delta P4_{min}$, and at the same time $dP/d\theta<dP/d\theta_{min}$ hold, in other words, if the fixed point differential pressure $\Delta P4$ and the maximum pressure increasing rate $dP/d\theta$ are both too small, it is judged that the injection timings TMepi and TMema of the pilot injection and the main injection are both too early, and to retard them, values obtained by subtracting the predetermined value $\Delta TMe$ from the respective values of TMepi and TMema are set to new value of the injection timings TMepi and TMema to update them (step 143).

If the answer to the question of the step 142 is negative (No), it is determined whether or not the maximum pressure increasing rate $dP/d\theta$ is larger than the maximum allowable value $dP/d\theta_{max}$ (step 144). If the answer to this question is affirmative (Yes), i.e. if $\Delta P4>\Delta P4_{min}$, and at the same time $dP/d\theta>dP/d\theta_{max}$ hold, in other words, if the fixed point differential pressure $\Delta P4$ is too small, and the maximum pressure increasing rate $dP/d\theta$ is too large, it is judged that the injection time period Depi of the pilot injection is too short, and to increase the injection time period Depi, a value obtained by adding a predetermined value $\Delta Depi$ for use in the pilot injection to the value of Depi is set to a new value of the injection time period Depi to update the injection time period Depi (step 145), and the increase/decrease counter Nd is incremented (step 146). On the other hand, if the answer to the question of the step 144 is negative (No), i.e. if the maximum pressure increasing rate $dP/d\theta$ is within the allowable range, it is judged that the injection timings TMepi and TMema of the pilot injection and the main injection are both too early, and that the injection time period Depi of the pilot injection is too short, so that the values of TMepi and TMema are retarded (step 147), and the value of Depi is increased (step 148), followed by incrementing the increase/decrease counter Nd (step 146).

On the other hand, if the answer to the question of the step 141 is negative (No), it is determined whether or not the fixed point differential pressure $\Delta P4$ is larger than a maximum allowable value $\Delta P4_{max}$ (step 150). If the answer to this question is affirmative (Yes), i.e. if $\Delta P4>\Delta P4_{max}$ holds, which means that the fixed point differential pressure $\Delta P4$ is too large, in steps 151 to 158 following the step 150, correction is performed according to the maximum pressure increasing rate $dP/d\theta$, similarly to the case of the fixed point differential pressure $\Delta P4$ being too small. More specifically, if $dP/d\theta>dP/d\theta_{max}$ holds (Yes to step 151), which means that the value of $dP/d\theta$ is too large, it is judged that the injection timings TMepi and TMema of the pilot injection and the main injection are both too late, and to advance them, values obtained by adding the predetermined value $\Delta TMe$ to the respective values of TMepi and TMema are set to new values of the injection timings TMepi and TMema to update them (step 152). Further, if $dP/d\theta<dP/d\theta_{min}$ holds (Yes to step 153), which means that the value of $dP/d\theta$ is too small, it is judged that the injection time period Depi of the pilot injection is too long, and to decrease the injection time period Depi, a value obtained by subtracting the predetermined value $\Delta Depi$ from the value of Depi is set to a new values of the injection timing Depi to update the injection time period Depi (step 154), and the increase/decrease counter Nd is decremented (step 155). Further, if the maximum pressure increasing rate $dP/d\theta$ is within the allowable range (No to step 153), it is judged that the injection timings TMepi and TMema of the pilot injection and the main injection are both too late, and that the injection time period Depi of the pilot injection is too long, the values of TMepi and TMema are advanced (step 156), and the value of Depi is decreased (step 157), followed by decrementing the increase/decrease counter Nd (step 158).

Furthermore, if the answer to the question of the step 150 is negative (No), i.e. if the fixed point differential pressure $\Delta P4$ is within the allowable range, in steps 159 to 166, correction is performed according to the maximum pressure increasing rate $dP/d\theta$. More specifically, if $dP/d\theta<dP/d\theta_{min}$ holds (Yes to step 159), and the value of $dP/d\theta$ is too small, it is judged that the injection timings TMepi and TMema of the pilot injection and the main injection are both too early, and that the injection time period of the pilot injection is too long, so that the values of TMepi and TMema are retarded (step 160), while the value of DEPI is decreased (step 161), followed by decrementing the increase/decrease counter Nd (step 162). Inversely, if $dP/d\theta>dP/d\theta_{max}$ holds (Yes to step 163), which means that the value of $dP/d\theta$ is too large, it is judged that the injection timings TMepi and TMema of the pilot injection and the main injection are both too late, and that the injection time period Depi of the pilot injection is too short, so that the values of TMepi and TMema are advanced (step 164), while the value of Depi is increased (step 165), followed by incrementing the increase/decrease counter Nd (step 166). Further, if the answer to the question of the step 163 is negative (No), i.e. if the fixed point differential pressure $\Delta P4$ and the maximum pressure increasing rate $dP/d\theta$ are both within the allowable range, the process proceeds to the next step 167 without making any correction.

In the step 167, it is determined whether or not the peak differential pressure $\Delta Pp$ is smaller than a minimum allowable value $\Delta Pp_{min}$. If the answer to this question is affirmative (Yes), i.e. if $\Delta Pp<\Delta Pp_{min}$ holds, it is judged that the injection time period Dema of the main injection is too short, and to increase the injection time period Dema, a value obtained by adding a predetermined value $\Delta Dema$ for use in the main injection to the value of Dema is set to a new value of the injection time period Dema to update the injection time period Dema (step 168), and the increase/decrease counter Nd is incremented (step 169). On the other hand, if the answer to the question of the step 167 is negative (No), it is determined whether or not the peak differential pressure $\Delta Pp$ is larger than a maximum allowable value $\Delta Pp_{max}$ (step 170). If the answer to this question is affirmative (Yes), i.e. if $\Delta Pp>\Delta Pp_{max}$, holds, it is judged that the injection time period Dema of the main injection is too long, and to decrease the injection time period Dema, a value obtained by subtracting the predetermined value $\Delta Dema$ from the value of Dema is set to a new value of the injection time period Dema to update the injection time period Dema (step 171), followed by decrementing the increase/decrease counter Nd (step 172). Further, if the answer to the question of the step 170 is negative (No), i.e. if the peak differential pressure $\Delta Pp$ is within the allowable range, the present process is immediately terminated without correcting the injection time period Dema.

As described hereinabove, when the pilot injection is performed in the normal combustion mode, by comparing the fixed point differential pressure $\Delta P4$ and the maximum pressure increasing rate $dP/d\theta$ with the maximum and minimum allowable values $\Delta P4_{max}$, and $\Delta P4_{min}$, and $dP/d\theta_{max}$ and $dP/d\theta_{min}$ thereof, the injection timing TMepi and injection time period Depi of the pilot injection and the injection timing TMema of the main injection, can be optimized as required. Further, by comparing the peak differential pressure $\Delta Pp$ with the maximum and minimum allowable values $\Delta Pp_{max}$ and $\Delta Pp_{min}$, the injection time period Dema of the main injection can be optimized as required.

Figure 17:
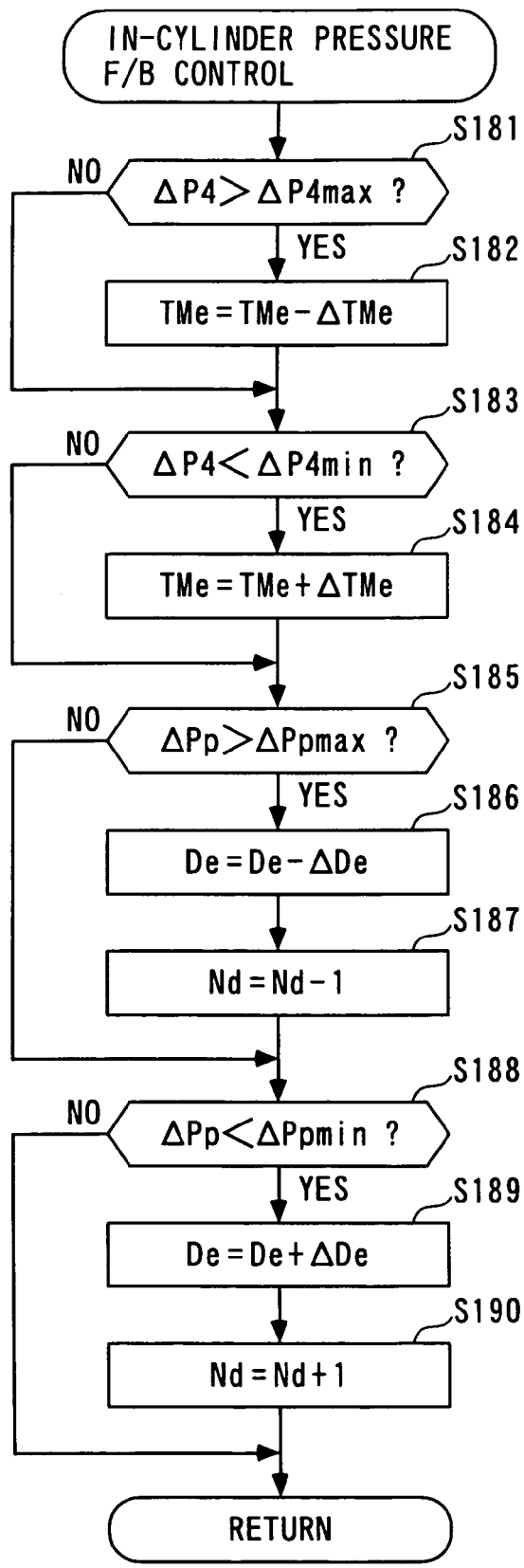
FIG. 17 is a flowchart showing an in-cylinder pressure feedback control process in the case where the pilot injection is not performed in the normal combustion mode.

FIG. 17 shows the in-cylinder pressure F/B control process in the case where the pilot injection is not performed in the normal combustion mode. In this case, the fixed point differential pressure ΔP4 and the peak differential pressure ΔPp, used in the above-described case where the pilot injection is performed, are employed as combustion parameters. In this process, first, it is determined whether or not the fixed point differential pressure ΔP4 is larger than the maximum allowable value $ΔP4_{max}$ (step 181). If the answer to this question is affirmative (Yes), i.e. if $ΔP4>ΔP4_{max}$ holds, it is judged that the injection timing TMe is too early, and a value obtained by subtracting the predetermined value ΔTMe from the value of TMe is set to a new value of the injection timing TMe to update the TMe value (step 182). If the answer to the question of the step 181 is negative (No), it is determined whether or not the fixed point differential pressure ΔP4 is smaller than the minimum allowable value $ΔP4_{min}$ (step 183). If the answer to this question is affirmative (Yes), i.e. if $ΔP4<ΔP4_{min}$ holds, it is judged that the injection timing TMe is too late, and a value obtained by adding the predetermined value ΔTMe to the value of TMe is set to a new value of the injection timing TMe to update the TMe value (step 184). Further, if the answer to the question of the step 183 is negative (No), i.e. if the fixed point differential pressure ΔP4 is within the allowable range, the process proceeds to a step 185, without correcting the injection timing TMe.

In the step 185, it is determined whether or not the peak differential pressure ΔPp is larger than the maximum allowable value $ΔPp_{max}$. If the answer to this question is affirmative (Yes), i.e. if $ΔPp>ΔPp_{min}$ holds, it is judged that the injection time period De is too long, and a value obtained by subtracting the predetermined value ΔDe from the value of De is set to a new value of the injection time period De to update the De value (step 186), followed by decrementing the increase/decrease counter Nd (step 187). If the answer to the question of the step 185 is negative (No), it is determined whether or not the peak differential pressure ΔPp is smaller than the minimum allowable value $ΔpP_{min}$ (step 188). If the answer to this question is affirmative (Yes), i.e. if $ΔPp<ΔpP_{min}$ holds, it is judged that the injection time period De is too short, and a value obtained by adding the predetermined value ΔDe to the value of De is set to a new value of the injection time period De to update the De value (step 189), followed by incrementing the increase/decrease counter Nd (step 190). Further, if the answer to the question of the step 188 is negative (No), i.e. if the peak differential pressure ΔPp is within the allowable range, the present process is immediately terminated without correcting the injection time period De.

As described above, when the pilot injection is not performed in the normal combustion mode, by comparing the fixed point differential pressure ΔP4 with the maximum and minimum allowable values $ΔP4_{max}$ and $ΔP4_{min}$, the injection timing TMe can be optimized as required. Further, by comparing the peak differential pressure ΔPp with the maximum and minimum allowable values $ΔPp_{max}$ and $ΔPp_{min}$, the injection time period De can be optimized as required.

Figure 18:
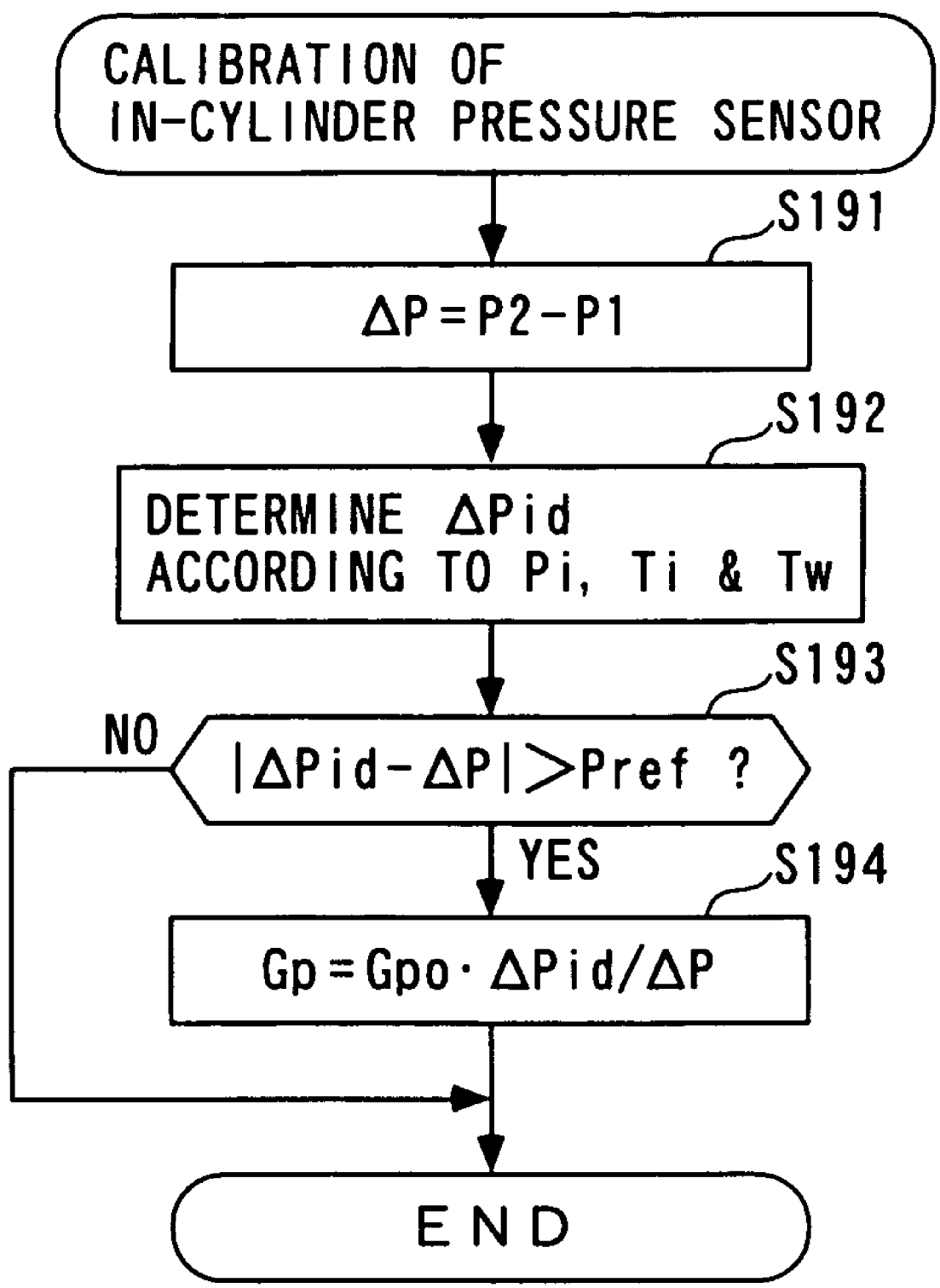
FIG. 18 is a flowchart showing a process for calibrating an in-cylinder pressure sensor.
Figure 19:
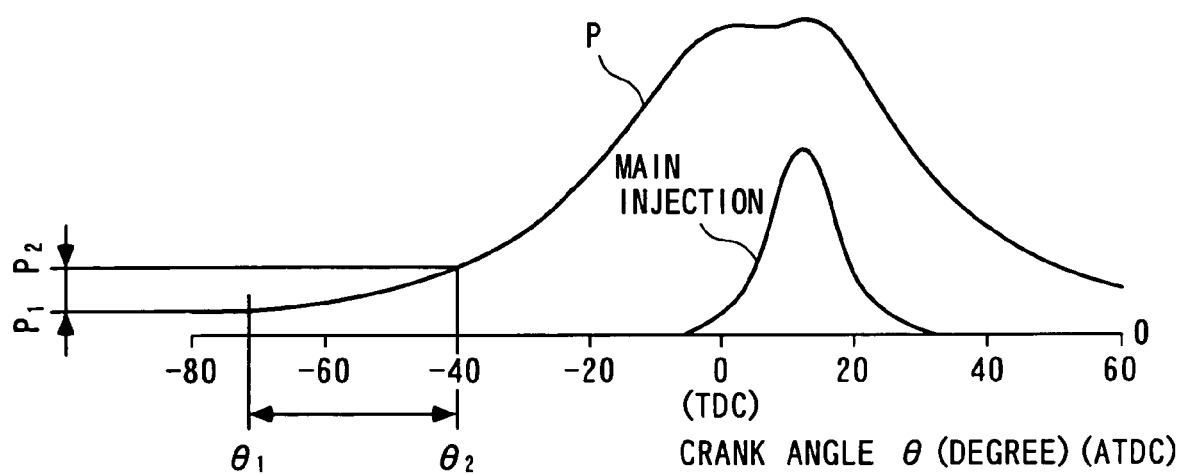
FIG. 19 is a diagram useful in explaining parameters used in the process shown in FIG. 18.

FIGS. 18 and 19 show a process for calibrating the in-cylinder pressure sensor 21. This calibration process is for compensating for variation and deviation of the gain of the control, due to the manufacturing errors and aging of the in-cylinder pressure sensor 21, on board.

In this process, first, the difference (P2−P1) between the values P2 and P1 of the in-cylinder pressure P, detected at two fixed points θ2 and θ1 of the crank angle θ, respectively, is calculated as detected differential pressure ΔP (step 191). It is preferable that the above fixed points θ1 and θ2 are set to crank angles θ which make it possible to minimize adverse influence of the injection and combustion of fuel on the in-cylinder pressure P. In the present embodiment, the fixed points θ1 and θ2 are set to respective crank angles of 70 degrees and 40 degrees before the TDC position. Then, an ideal differential pressure ΔPid is determined by searching a map (not shown) according to the intake manifold pressure Pi, the actual intake manifold temperature Ti, and the engine coolant temperature Tw (step 192). If the intake manifold pressure Pi, the actual intake manifold temperature Ti, and the engine coolant temperature Tw are determined, the in-cylinder pressure P is almost unconditionally determined with respect to the crank angle θ. In view of this, in this map, the relationship between the values of Pi, Ti, and Tw, and the in-cylinder pressure P at the two fixed points is determined in advance by bench test, and the differential pressure between the fixed points θ2 and θ1 is defined as ideal differential pressure ΔPid to be obtained.

Then, it is determined whether or not the absolute value of the difference between the ideal differential pressure ΔPid and the detected differential pressure ΔP is larger than a reference value Pref (step 193). If the answer to this question is negative (No), i.e. if |ΔPid−ΔP|≦Pref holds, it is judged that a variation or deviation in the gain of the in-cylinder pressure sensor 21 is small and within an allowable range, and the present process immediately terminated without correcting the gain. On the other hand, if the answer to the question of the step 193 is affirmative (Yes), i.e. if |ΔPid−ΔP|>Pref holds, it is judged that the variation or deviation in the gain of the in-cylinder pressure sensor 21 is large, and the gain Gp of the in-cylinder pressure sensor 21 is corrected to a value obtained by multiplying an initial gain Gpo by a ratio (ΔPid/ΔP) between the ideal differential pressure ΔPid and the detected differential pressure ΔP (step 194), followed by terminating the present process.

By carrying out the above process, it is possible to properly correct the variation or deviation in the gain Gp of the in-cylinder pressure sensor 21, using the result of its own detection. Further, as described hereinabove, the in-cylinder pressure F/B control is performed basically based on the difference between the fixed points according to the result of detection by the in-cylinder pressure sensor 21. In contrast, in the present process, not the absolute value of the result of detection by the in-cylinder pressure sensor 21 but the gain Gp is corrected. This makes it possible to perform the in-cylinder pressure F/B control accurately without being adversely affected by a drift of the in-cylinder pressure sensor 21.

Next, learning control of the fuel injection parameter Q* will be described with reference to FIGS. 20 to 24. The learning control is for compensating for aging of the fuel injection system including the injector 6, by periodically rewriting and updating the Q*i,j map based on the results of the above-described in-cylinder pressure F/B control, etc. to thereby make the injection amount and injection timing appropriate, and accordingly update the correction function f(α, β)i,j to thereby make the correction function f(α, β)i,j appropriate.

Figure 20:
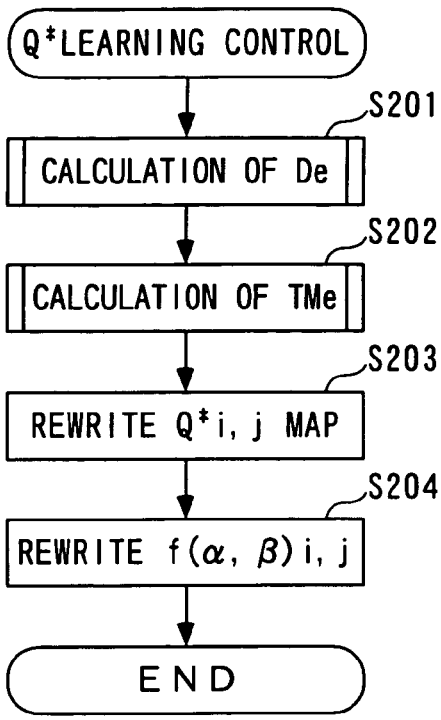
FIG. 20 is a flowchart showing a process for learning control of a fuel injection parameter Q*.

FIG. 20 shows a process for performing the above learning control. First, the injection time period De of the fuel injection parameter Q*i,j is calculated in a step 201. This calculation is performed according to a subroutine shown in FIG. 21. It should be noted that the calculation is performed on the precondition that Qf−∫dQ/dθ characteristics, as shown in FIG. 22, indicative of the relationship between an injection amount Qf and a generated heat amount ∫dQ/dθ are obtained in advance by bench test in the normal combustion mode e.g. in a complete combustion state.

Further, it is assumed that the generated heat amount ∫dQ/dθ was calculated during operation of the engine 3 as required e.g. by the following equation (21):

$$\int dQ/d\theta = \int [1/(\kappa-1)\{\kappa PdV + VdP\}] \qquad (21)$$

Figure 21:
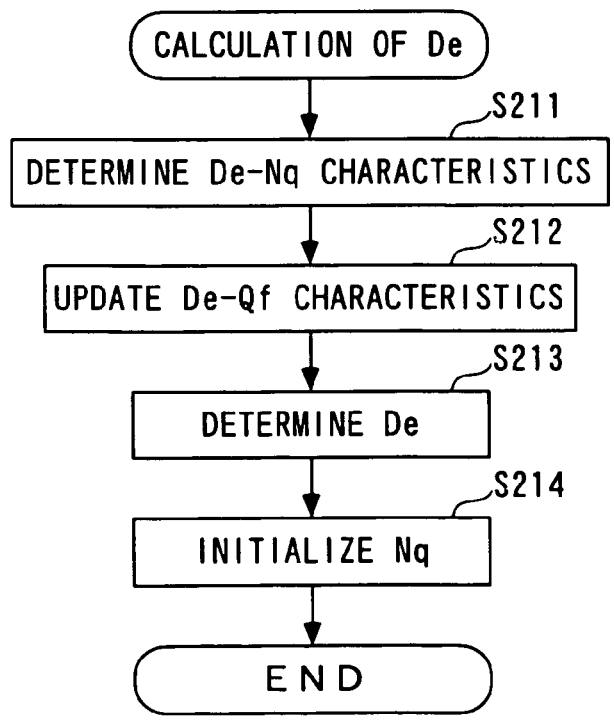
FIG. 21 is a flowchart showing a subroutine for calculating an injection time period.
Figure 22:
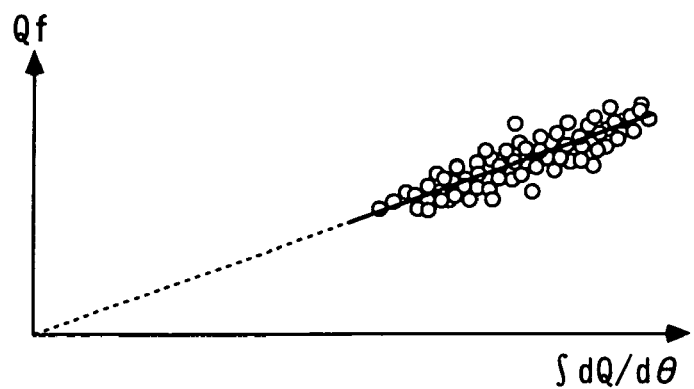
FIG. 22 is a diagram showing the relationship between an injection amount and a generated heat amount.
Figure 23:
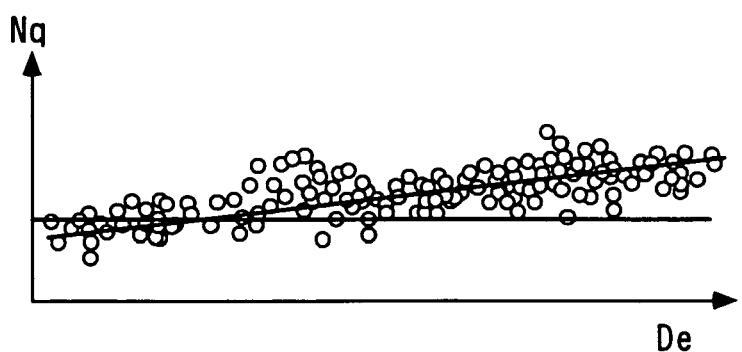
FIG. 23 is a diagram showing the relationship between the injection time period and the count of an increase/decrease counter.

First, in a step 211 shown in FIG. 21, De-Nd characteristics indicative of the relationship between the injection time period De and the count Nd of the increase/decrease counter are determined. As described hereinbefore, in the in-cylinder pressure F/B control, the count Nd is incremented whenever the injection time period De is increased by a predetermined value ΔDe, from the injection time period De in the $Q^*i,j$ map at each address i,j, and decremented whenever the same is increased from the injection time period De in the $Q^*i,j$ map at each address i,j. Therefore, the count Nd represents the amount of deviation of the injection time period De from an initial value in the $Q^*i,j$ map. More specifically, as shown in FIG. 23, values of the count Nd are plotted in association with respective injection time periods De, and the values of the count Nd are statistically processed to thereby determine the De-Nd characteristics. Through the above statistical process, it is possible to determine the De-Nd characteristics properly representing actual deviations in the injection time period De while eliminating adverse influences of errors contained in data.

Figure 24:
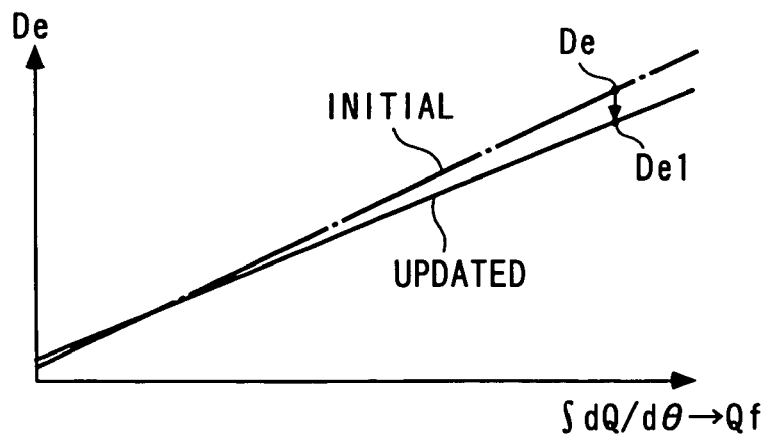
FIG. 24 is a diagram showing the relationship between the injection time period and the injection amount.

Then, De-Qf characteristics indicative of the relationship between the injection time period De and the fuel injection amount Qf are updated using the De-Nd characteristics determined in the step 211 (step 212). More specifically, as shown in FIG. 24, the De-Nd characteristics are overlaid onto a table in which the abscissa represents the injection amount Qf converted from the calculated generated heat amount ∫dQ/dθ and the FIG. 22 Qf–∫dQ/dθ characteristics, and the ordinate represents the injection time period De, whereby the De-Qf characteristics are rewritten and updated.

Then, the injection time period De is finally determined using the updated De-Qf characteristics (step 213). More specifically, as shown in FIG. 24, each injection time period De of the fuel injection parameter $Q^*i,j$ is converted into a value De1 on the updated De-Qf characteristics, which is associated with the same injection amount Qf as that of De-Qf characteristics before the update. Then, the count Nd is initialized (step 214), followed by terminating the present subroutine.

Referring again to FIG. 20, in a step 202 following the step 201, the injection timing TMe of the fuel injection parameter $Q^*i,j$ is calculated. Although not shown, calculation of the injection timing TMe is performed similarly to the calculation of the injection time period De: In the in-cylinder pressure F/B control, the count Nt of the increase/decrease counter as a result of increments and/or decrements each performed whenever injection timing TMe is advanced or retarded by the predetermined value ΔTMe, is obtained for each address i,j in the $Q^*i,j$ map and stored, and then while subjecting the obtained values of the count Nt to statistical processing, TMe-Nt characteristics indicative of the relationship between the injection timing TMe and the count Nt are determined to thereby determine the injection timing TMe.

Subsequently, the $Q^*i,j$ map is updated by rewriting all values of the fuel injection parameter $Q^*i,j$ in the $Q^*i,j$ map, using the injection time period De and the injection timing TMe determined in the steps 201 and 202, respectively (step 202). This makes it possible to make appropriate the fuel injection parameter $Q^*i,j$ while compensating for deviation of the characteristics of the fuel injection system including the injector 6, caused by aging of the fuel injection system and the like. Then, the correction function f(α, β)i,j is updated by rewriting the correction variables αi,j and βi,j (step 204), followed by terminating the present process. When the values of the fuel injection parameter $Q^*i,j$ are rewritten as described above, the relationship between the actual in-cylinder oxygen amount mo2 and the imaginary in-cylinder oxygen amount mo2v in the steady state of the engine 3 is changed, and hence by updating the correction function f(α, β)i,j in accordance with the change, it is possible to properly determine the imaginary in-cylinder oxygen amount mo2v.

Figure 25:
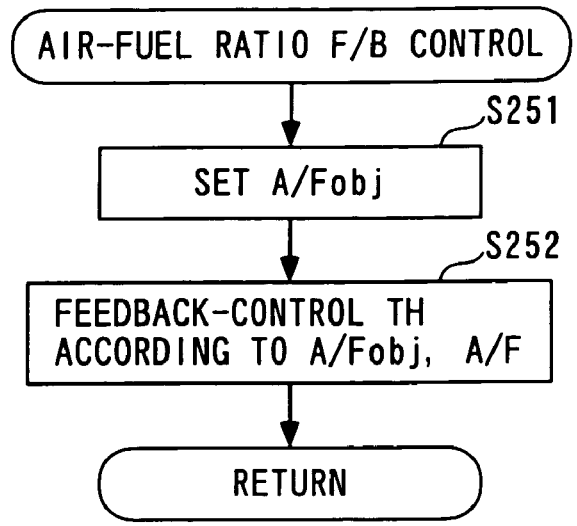
FIG. 25 is a flowchart showing an air-fuel ratio feedback control process.

FIG. 25 shows a feedback control process of the air-fuel ratio, which is performed in the rich operation. In the process, first, a target air-fuel ratio A/Fobj is set according to the accelerator pedal opening AP and the engine speed Ne (step 251). Then, the throttle valve opening TH is set by the feedback control according to the air-fuel ratio A/F detected by the oxygen concentration sensor 29 such that the detected air-fuel ratio A/F becomes equal to the target air-fuel ratio A/Fobj (step 252), followed by terminating the present process. As described above, in addition to the control of the above-described fuel injection parameter $Q^*i,j$, the intake air amount Fa is corrected by feedback-controlling the throttle valve opening TH according to the detected air-fuel ratio A/F, whereby it is possible to accurately control the actual air-fuel ratio to the target air-fuel ratio A/Fobj. It should be noted that the intake air amount Fa may be corrected by feedback control of the degree of opening of the EGR control valve 14b instead of or together with the control of the throttle valve opening TH.

Figure 26:
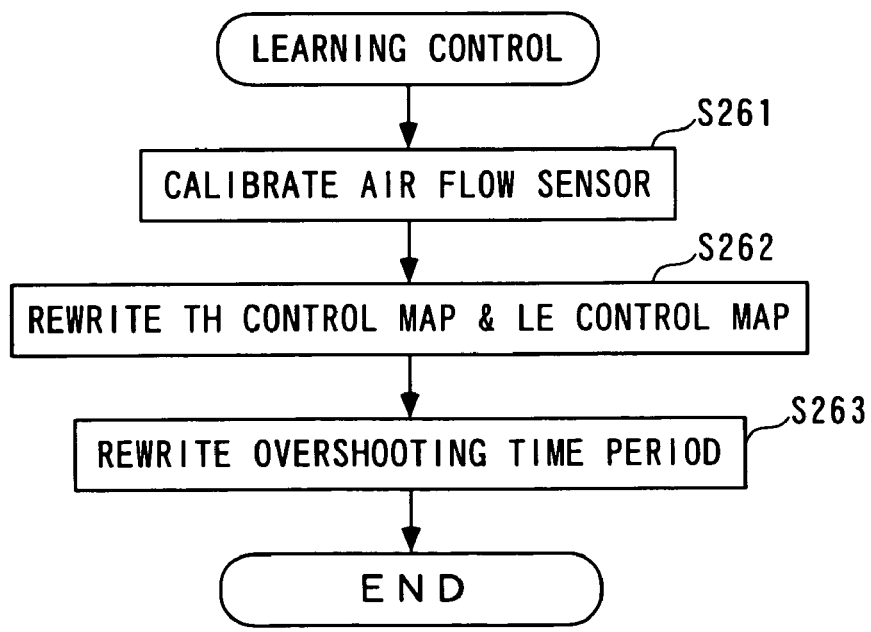
FIG. 26 is a flowchart showing a process for learning control of control parameters and the like other than the fuel injection parameter Q*.
Figure 27:
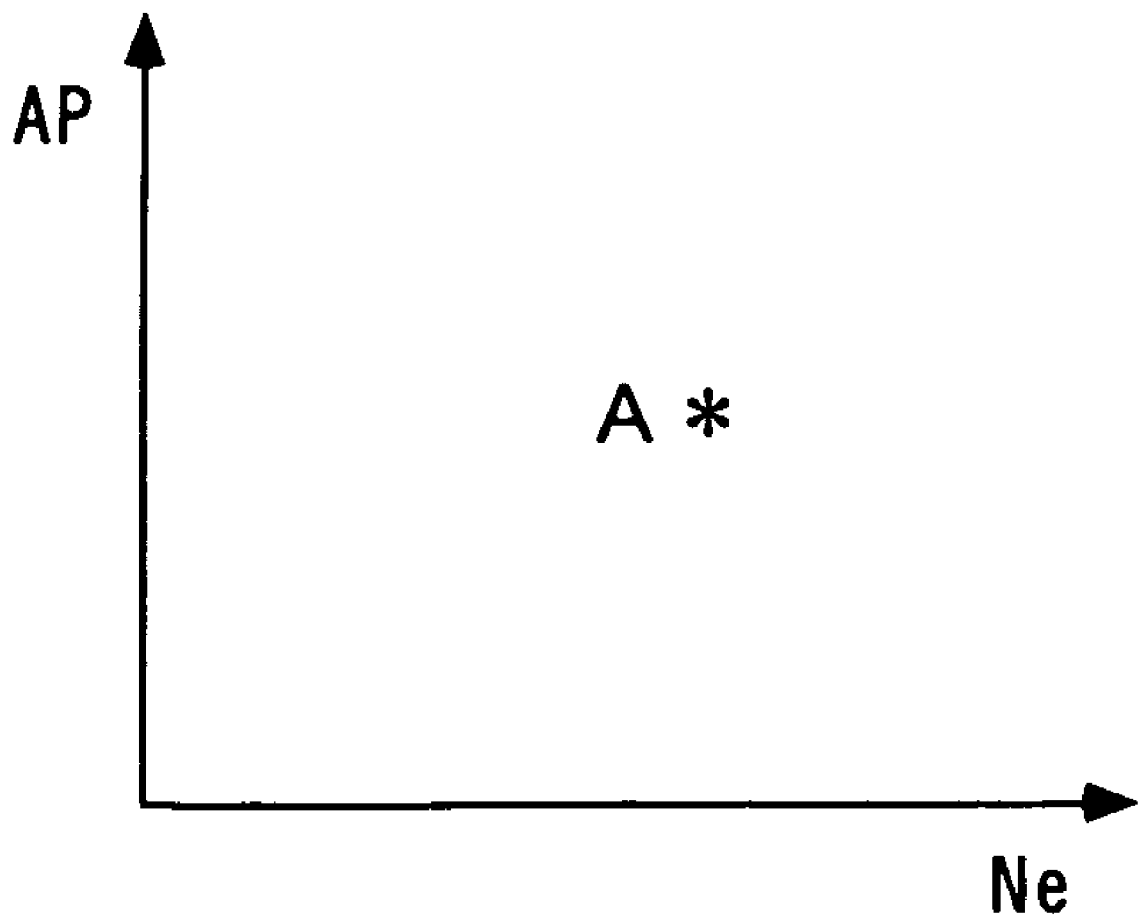
FIG. 27 is a diagram showing an A* map used by a control system according to a second embodiment of the present invention.

FIG. 26 shows a process for learning control of control parameters other than the fuel injection parameter $Q^*i,j$ described above. This learning control is for optimizing the intake air amount Fa and the EGR gas flow rate Fe, and carried out when the De-Qf characteristics are updated and optimized in the learning control of the fuel injection parameter $Q^*i,j$. In a step 261 for performing the learning control process, output characteristics of the air flow sensor 27 are calibrated according to the air-fuel ratio A/F detected by the oxygen concentration sensor 29 and the updated De-Qf characteristics. Then, maps (not shown) for controlling the throttle valve opening TH and the EGR valve opening LE, respectively, are rewritten (step 262). Further, the overshooting time period TMos in the transient state of the engine 3 is rewritten (step 263), followed by terminating the present process.

Next, a description will be given of a control system according to a second embodiment of the present invention with reference to FIGS. 27 to 32. This control system is identical in hardware configuration to the control system according to the first embodiment, and hence description thereof is omitted.

It should be noted that in the present embodiment, the ECU executes, similarly to the first embodiment, the process for calculating an in-cylinder condition parameter, shown in FIG. 3, the process for setting a $Q^*i,j$ map, shown in FIG. 4, the process for setting correction variables αi,j and βi,j, shown in FIG. 6, and the process for determining a fuel injection parameter $Q^*$ shown in FIG. 7.

In the present embodiment, in the low-temperature combustion mode, fuel injection control mainly based on the in-cylinder oxygen amount and the engine speed Ne (hereinafter referred to a "the O2-based LTC control"), described hereinafter, is carried out, while in the normal combustion mode, on a low-load side where the intake air amount can be controlled by changing the throttle valve opening TH and the EGR valve opening LE, fuel injection control mainly based on the in-cylinder oxygen amount and the engine speed Ne (hereinafter referred to "the O2-based STD control"), described hereinafter, is carried out, and on a high-load side where the throttle valve 7 is fully open and the EGR control valve 14b is fully closed, fuel injection control based on the accelerator pedal opening AP and the engine speed Ne (hereinafter referred to as "the pedal-based STD control"), described hereinafter, is carried out.

Hereinafter, a description will be given of processes performed particularly in the present embodiment by the ECU 2. The ECU 2 determines an air-adjusting parameter A* by searching an A* map shown in FIG. 27 according to the engine speed Ne and the accelerator pedal opening AP. The air-adjusting parameter A* is a vector using the target throttle valve opening THR, a target EGR valve opening LER, a target vane opening VOR, and a target swirl valve opening SVOR as elements. On grid points of the address i,j on the A* map, there are set respective values of the target throttle valve opening THR, the target EGR valve opening LER, the target vane opening VOR, and the target swirl valve opening SVOR suitable for associated values of the engine speed Ne and the accelerator pedal opening AP. The ECU 2 drives the associated actuators such that actual throttle valve opening TH, the EGR valve opening LE, the vane opening VO, and the swirl valve opening SVO become equal to respective target values calculated by searching the A* map. Thus, control of the intake air amount, the flow rate of recirculated exhaust gases, boost pressure, and swirl, dependent on the engine speed Ne and the accelerator pedal opening AP, is carried out.

It should be noted that the A* map is provided in a manner associated with each of the O2-based LTC control, the O2-based STD control, and the pedal-based STD control, described above, and further a normal lean operation map, a PM (Particulate Matter) oxidation map, an NOx reduction map, and a sulfur-removing map are set for each of these types of control. Assuming that A/FLN, A/FLP, A/FRN, and A/FRS represent air-fuel ratios set using the normal lean operation map, the PM oxidation map, the NOx reduction map, and the sulfur-removing map, respectively, the relationship of A/FLN>A/FLP>A/FRS>A/FRN holds therebetween.

Further, the Q*i,j map and the Ti,j map employed in the first embodiment are each set separately for the lean operation and for the rich operation. For the lean operation, these are provided a normal lean operation map and a PM (Particulate Matter) oxidation map, and for the rich operation, there are provided a NOx reduction map and a sulfur-removing map. Assuming that A/FLN, A/FLP, A/FRS, and A/FRN represent air-fuel ratios set using the normal lean operation map, the PM oxidation map, the NOx reduction map, and the sulfur-removing map, respectively, the relationship of A/FLN>A/FLP>A/FRS>A/FRN holds therebetween.

Next, a description will be given of fuel injection control carried out during transition from the lean operation to the rich operation, and during transition from the rich operation to the lean operation (hereinafter referred to as "the air-fuel ratio-switching control).

Figure 28:
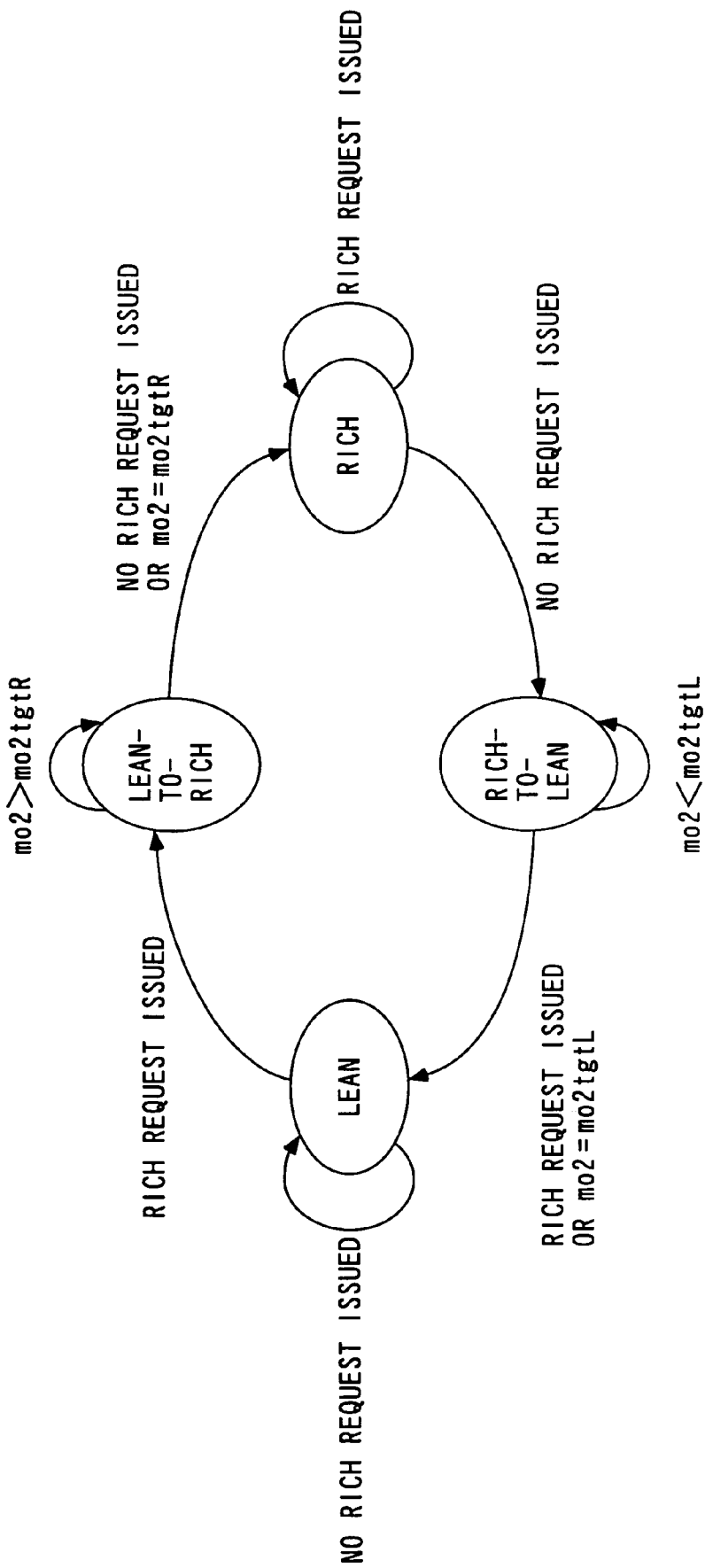
FIG. 28 is a diagram illustrating control states between which transition occurs in an air-fuel ratio-switching control process.

FIG. 28 is a diagram illustrating control states between which transition occurs in the air-fuel ratio-switching control process. In FIG. 28, four states, that is, a lean state, a lean-to-rich state (transient state from the lean state to a rich state), the rich state, and a rich-to-lean state (transient state from the rich state to the lean state) are illustrated. A target in-cylinder oxygen amount mo2tgtL in the lean state, and a target in-cylinder oxygen amount mo2tgtR in the rich state are determined using a map set in advance by bench test according to the accelerator pedal opening AP and the engine speed Ne.

The air-fuel ratio-switching control is performed in principle as follows:

1) The engine 3 is operated in the lean state during normal operation thereof. For example, when NOx-reducing enrichment is necessitated, and an enriching request (air-fuel ratio-switching command for switching to a rich air-fuel ratio) is issued, the engine combustion mode is shifted to the lean-to-rich state.

2) In the lean-to-rich state, when the imaginary in-cylinder oxygen amount mo2v has reached the target in-cylinder oxygen amount mo2tgtR in the rich state, or when the enriching request has ceased to be issued, the engine combustion mode shifts to the rich state. It should be noted that when the enriching request has ceased to be issued, the engine combustion mode is further immediately shifted from the rich state to the rich-to-lean state.

3) In the rich state, when the enriching request has ceased to be issued (when air-fuel ratio-switching command for switching to a lean air-fuel ratio is issued), the engine combustion mode is shifted to the rich-to-lean state.

4) In the rich-to-lean state, when the imaginary in-cylinder oxygen amount mo2v has reached the target in-cylinder oxygen amount mo2tgtL in the lean state, or when the enriching request has been issued, the engine combustion mode is shifted to the lean state. It should be noted that when the enriching request has been issued, the engine combustion mode further immediately shifts from the lean state to the lean-to-rich state.

In the lean state, the air-adjusting parameter A* and the fuel injection parameter Q* are set using the aforementioned associated lean operation maps, that is, the respective associated normal lean operation maps or the respective associated PM oxidation maps, whereas in the rich state, the air-adjusting parameter A* and the fuel injection parameter Q* are set using the aforementioned respective associated rich operation maps, that is, the respective associated NOx reduction maps and the respective associated sulfur-removing maps.

In the lean-to-rich state or the rich-to-lean state, the air-adjusting parameter A* is calculated using the associated map for a transition destination, and the throttle valve opening TH is mainly controlled such that the in-cylinder oxygen amount mo2 becomes equal to the target in-cylinder oxygen amount mo2tgtR or mo2tgtL. Further, the fuel injection parameter Q* is calculated as follows: First, an oxygen ratio Oxyratio is calculated by the following equation (22). The oxygen ratio Oxyratio is a parameter which assumes a value of 0 at the start of air-fuel ratio transition, and a value of 1 at a time point of completion of the air-fuel ratio transition, and represents the degree of progress of switching of the air-fuel ratio.

$$Oxyratio = |mo2v - mo2ini|/|mo2ini - mo2tgt| \qquad (22)$$

wherein mo2v represents an imaginary in-cylinder oxygen amount, mo2ini an in-cylinder oxygen amount immediately before the air-fuel ratio switching, and mo2tgt a target in-cylinder oxygen amount after the air-fuel ratio switching.

Next, as expressed by the following equation (23), a ratio parameter Q*ratio is calculated according to the oxygen ratio Oxyratio. A function f(Oxyratio) will be described hereinafter. Then, the fuel injection parameter Q* is calculated by applying the ratio parameter Q*ratio to the following equation (24).

$$Q^*\text{ratio} = f(Oxy\text{ratio}) \tag{23}$$

$$Q^* = Q^*ini + Q^*\text{ratio} \times (Q^*tgt - Q^*ini) \tag{24}$$

wherein Q*ini represents a fuel injection parameter immediately before the air-fuel ratio switching, and Q*tgt a target fuel injection parameter after the air-fuel ratio switching.

The above calculation of the fuel injection parameter Q* using the equations (22) to (24) is performed so as to suppress torque shock caused by the switching of the air-fuel ratio. Hereinafter, a description will be given of how to set the function f(Oxyratio).

Figure 29:
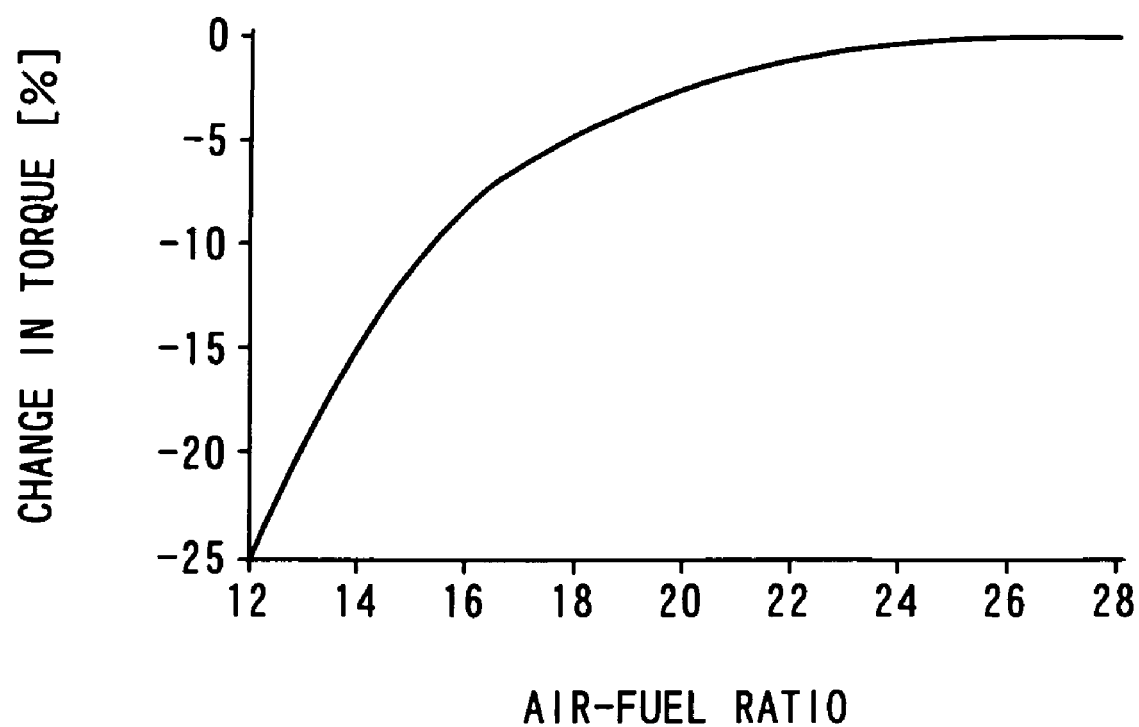
FIG. 29 is a diagram which is useful in explaining changes in engine output torque caused by changes in the air-fuel ratio.

FIG. 29 shows changes in the output torque of the engine in accordance with changes in the air-fuel ratio which are caused by changing the intake air amount in a state where the amount of fuel supplied to the engine is made constant. As the intake air amount is decreased from a lean state of air-fuel ratio A/F=28 to thereby enrich the air-fuel ratio, the output torque decreases first with a gentle slope, and then as the air-fuel ratio is reduced, it is decreased with a steeper slope. That is, the changing characteristics of the output torque are not linear but exponential.

As described above, the change in the torque with respect to the change in the air-fuel ratio is nonlinear, and hence to suppress the change in the torque during switching of the air-fuel ratio, it is necessary to adjust the fuel amount nonlinearly. More specifically, when the engine combustion mode is switched from the lean state to the rich state, first, the fuel amount is required to be slowly increased, and as the air-fuel ratio is decreased, it is required to be increased more quickly, whereas when the engine combustion mode is switched from the rich state to the lean state, first, the fuel amount is required to be quickly decreased, and as the air-fuel ratio is increased, it is required to be lower the decreasing speed of the fuel amount.

It should be noted that when the air-fuel ratio is switched, it is necessary to nonlinearly change the fuel injection timing TMe and the fuel injection pressure Pe as well.

Furthermore, although the target air-fuel ratio is approximately fixed in the rich state, the air-fuel ratio in the lean state is changed depending on load on the engine. For example, when the air-fuel ratio in the lean state (lean air-fuel ratio) is set to be decreased as the load on the engine is increased, in the lean-to-rich state, it is necessary to increase the fuel amount more quickly as the load on the engine becomes higher. Further, in the rich-to-lean state, it is necessary to decrease the fuel amount more slowly as the load on the engine becomes higher.

Figure 30A:
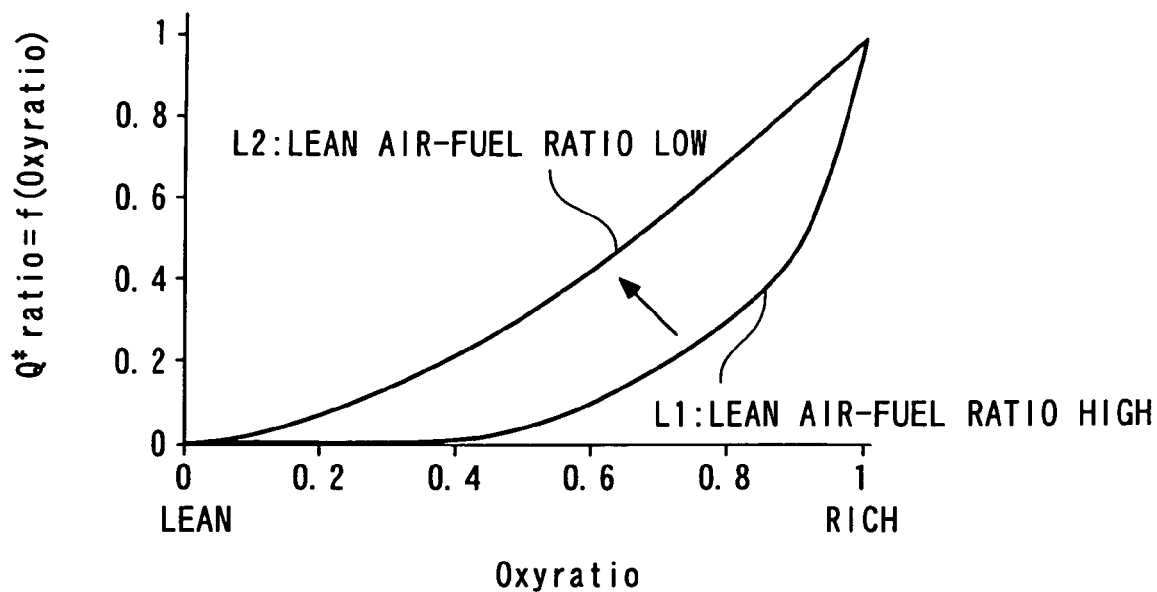
FIGS. 30A and 30B are diagrams showing functions (tables) for use in calculation of ratio parameters (Q*ratio) based on an oxygen ratio (Oxyratio)
Figure 30B:
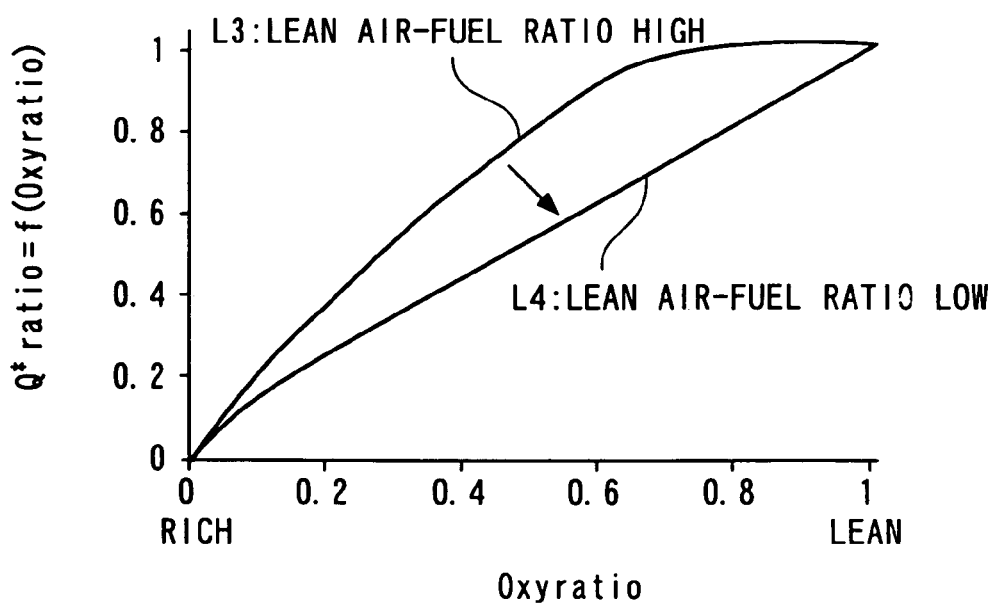

From the above study, in the present embodiment, in the lean-to-rich state, the ratio parameter Q*ratio is calculated using a function f(Oxyratio) as shown in FIG. 30A, and in the rich-to-lean state, the ratio parameter Q*ratio is calculated using a function f(Oxyratio) as shown in FIG. 30B. In FIG. 30A, a curve L1 indicates changing characteristics of the air-fuel ratio exhibited when the lean air-fuel ratio is high, and a curve L2 indicates changing characteristics of the air-fuel ratio exhibited when the lean air-fuel ratio is low. Similarly, in FIG. 30B, a curve L3 indicates changing characteristics of the air-fuel ratio exhibited when the lean air-fuel ratio is high, and a curve L4 indicates changing characteristics of the air-fuel ratio exhibited when the lean air-fuel ratio is low.

The function f(Oxyratio) shown in FIG. 30A is set such that the rate dQ*ratio/dOxyratio of a change in the ratio parameter Q*ratio with respect to a change in the oxygen ratio Oxyratio, that is, the slope of each curve is progressively increased with an increase in the oxygen ratio Oxyratio. On the other hand, the function f(Oxyratio) shown in FIG. 30B is set such that the rate of change dQ*ratio/dOxyratio is progressively decreased with an increase in the oxygen ratio Oxyratio. This tendency becomes more noticeable as the lean air-fuel ratio is higher, and when the lean air-fuel ratio is low, a change in the rate of change dQ*ratio/dOxyratio is small. In the lean-to-rich state (FIG. 30A), it is desirable to correct the ratio parameter Q*ratio such that it is increased as the lean air-fuel ratio is lower than the curve L1 as the reference curve. Further, in the rich-to-lean state (FIG. 30B), it is desirable to correct the ratio parameter Q*ratio such that it is decreased with as the lean air-fuel ratio is lower than the curve L3 as the reference curve.

By using the functions f(Oxyratio) shown in FIGS. 30A and 30B, it is possible to properly correct the change in torque during switching of the air-fuel ratio.

Next, a fuel injection control process performed by the ECU 2 during switching of the air-fuel ratio will be described with reference to FIGS. 31 and 32.

Figure 31:
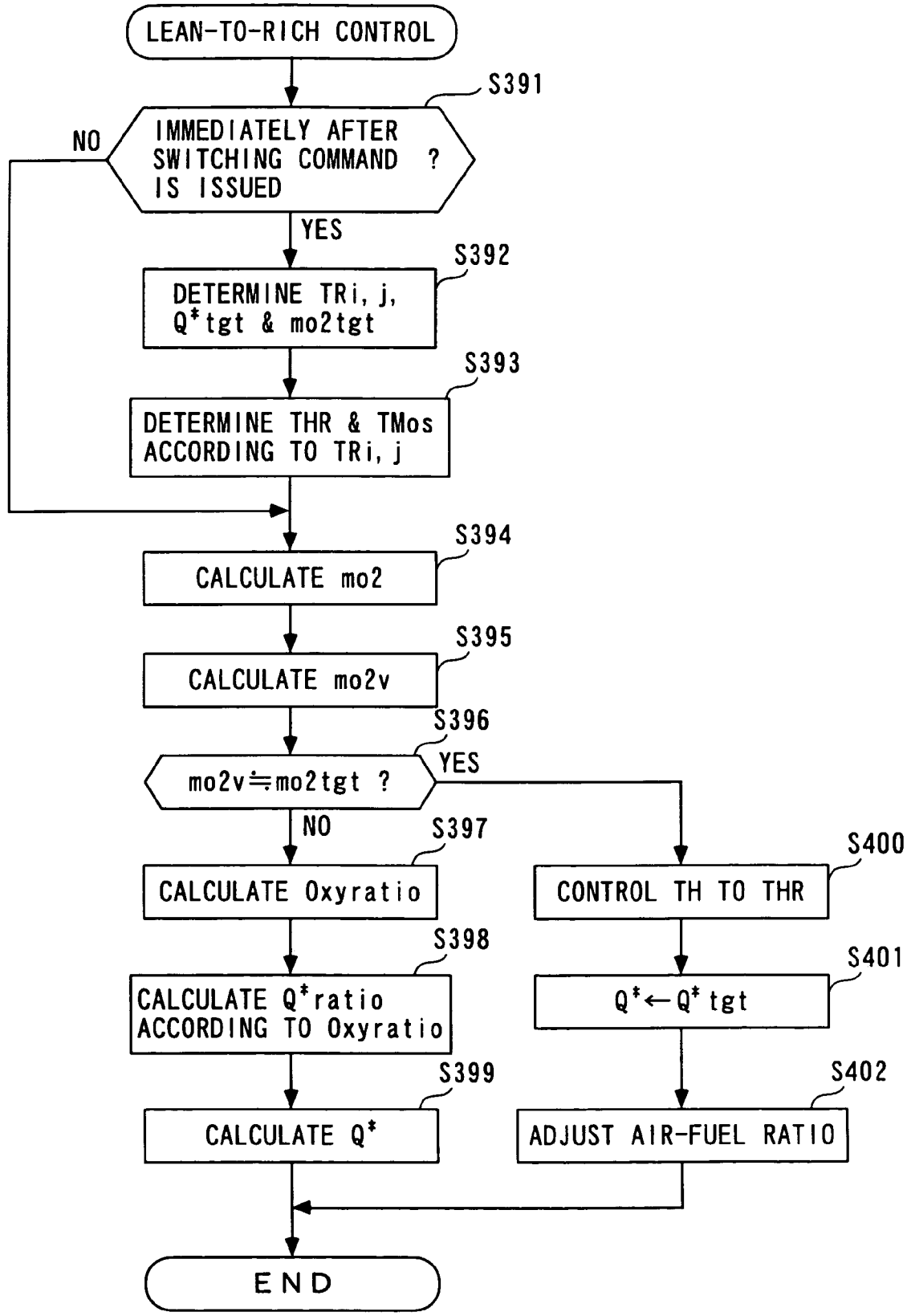
FIG. 31 is a diagram showing a control process performed during transition from the lean operation to the rich operation.

FIG. 31 shows a control process including a fuel injection control process performed during transition from the lean operation to the rich operation. In this process, first, it is determined whether or not the present loop is performed immediately after a switching command for switching from the lean operation to the rich operation has been issued (step 391). If the answer to this question is affirmative (Yes), i.e. if the present loop is performed immediately after the switching command has been issued, a target torque TRi,j, a target fuel injection parameter Q*tgt, and a target in-cylinder oxygen amount mo2tgt, as targets in the rich operation, are determined (step 392). More specifically, an address i,j, which corresponds to the same engine speed Ne as the engine speed Ne immediately before the transition and at the same time sets the same torque value as that of the torque TLi,jv immediately before the transition, is identified in a TRi,j map for use in the rich operation, and a torque TRi,j (=TLi,jv) at the address i,j is set as the target torque for the transition destination. When the address i,j of the transition destination is identified as described above, the target fuel injection parameter Q*tgt and the target in-cylinder oxygen amount mo2tgt (mo2tgtR) are also automatically determined accordingly. Further, the in-cylinder oxygen amount mo2 and the fuel injection parameter Q* at this time point are stored as an initial in-cylinder oxygen amount mo2ini and an initial fuel injection parameter Q*ini, respectively.

Then, the target throttle valve opening THR and the overshooting time period TMos corresponding to a transition time period are set according to the target torque TRi,j set in the step 392 (step 393), and the throttle valve 7 is driven according to the settings, followed by the process proceeding to a step 394. Further, if the answer to the question of the step 391 is negative (No), i.e. if the present loop is not performed immediately after the transition, the process skips over the steps 392 and 393 to the step 394. In the step 394, the actual in-cylinder oxygen amount mo2 is calculated, and then the calculated in-cylinder oxygen amount mo2 is corrected by the correction function f(α, β)i,j, whereby the imaginary in-cylinder oxygen amount mo2v is calculated (step 395).

Next, it is determined in a step 396 whether or not the calculated imaginary in-cylinder oxygen amount mo2v has become approximately equal to the target in-cylinder oxygen amount mo2tgt obtained in the step 392. If the answer to this question is negative (No), the transition to the rich operation is being performed, and hence the imaginary in-cylinder oxygen amount mo2v, the initial in-cylinder oxygen amount mo2ini, and the target in-cylinder oxygen amount mo2tgt are applied to the aforementioned equation (22), to thereby calculate the oxygen ratio Oxyratio (step 397). In a step 398, a Q*ratio table associated with the curves L1 and L2 shown in FIG. 30A is searched according to the oxygen ratio Oxyratio and interpolation is carried out according to the load on the engine (more specifically, the torque TRi or the accelerator pedal opening AP) whereby the ratio parameter Q*ratio is calculated. In a step 399, the ratio parameter Q*ratio, the initial fuel injection parameter Q*ini, and the target fuel injection parameter Q*tgt are applied to the aforementioned equation (24), whereby the fuel injection parameter Q* is calculated.

On the other hand, if the answer to the question of the step 396 is affirmative (Yes), i.e. if the imaginary in-cylinder oxygen amount mo2v has become approximately equal to the target in-cylinder oxygen amount mo2tgt, it is judged that the transition time is over, and the throttle valve opening TH is set to the target throttle valve opening THR (step 400), whereafter the fuel injection parameter Q* is set to the target fuel injection parameter Q*tgt (step 401). Then, the throttle valve opening TH, boost pressure, and so forth are finely adjusted according to the result of detection by the oxygen concentration sensor 29, whereby the air-fuel ratio A/F is adjusted (step 402), followed by terminating the present process. After the transition time is over, fuel injection control in the steady state of the engine 3 is carried out according to the engine speed Ne and the in-cylinder condition parameter [O2] based on the Q*Ri,j map for use in the rich operation.

Figure 32:
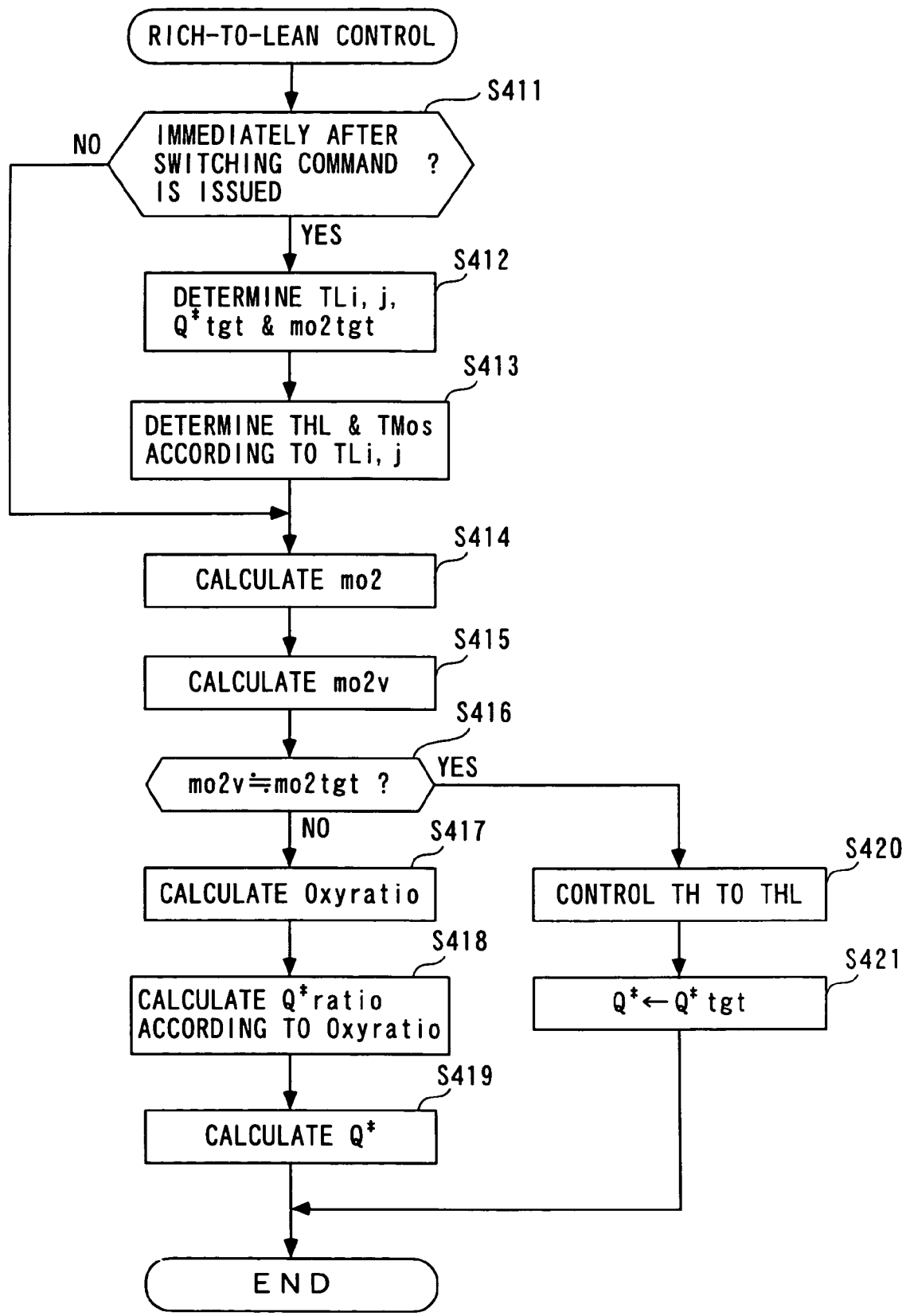
FIG. 32 is a diagram showing a control process performed during transition from the rich operation to the lean operation.

FIG. 32 shows a control process including a fuel injection control process performed during transition from the rich operation to the lean operation. Basically, this process is carried out similarly to the FIG. 31 process except that the relationship between the rich and lean operations is inverted. More specifically, immediately after a switching command for switching from the rich operation to the lean operation has been issued (Yes to step 411), the target torque TLi,j, the target fuel injection parameter Q*tgt, and the target in-cylinder oxygen amount mo2tgt, as targets in the lean operation, are determined (step 412). More specifically, an address i,j, which corresponds to the same engine speed Ne as the engine speed Ne immediately before the transition and at the same time sets the same torque value as that of the torque TRi,jv immediately before the transition, is identified in a TRi,j map for use in the lean operation, and the torque TLi,j (=TRi,jv) at the address i,j is set as the target torque of the transition destination. Further, the target fuel injection parameter Q*tgt and the target in-cylinder oxygen amount mo2tgt (mo2tgtL) are determined according to the address i,j of the transition destination. Further, the in-cylinder oxygen amount mo2 and the fuel injection parameter Q* at this time point are stored as the initial in-cylinder oxygen amount mo2ini and the initial fuel injection parameter Q*ini, respectively.

Then, the target throttle valve opening THL and an overshooting time period TMos are set according to the target torque TLi,j (step 413), and the throttle valve 7 is driven according to the settings. Next, an actual in-cylinder oxygen amount mo2 is calculated (step 414), and the calculated in-cylinder oxygen amount mo2 is corrected by the correction function f(α, β)i,j, whereby the imaginary in-cylinder oxygen amount mo2v is calculated (step 415).

If the imaginary in-cylinder oxygen amount mo2v has not reached the target in-cylinder oxygen amount mo2tgt (No to step 416), i.e. if the transition to the lean operation is being performed, the oxygen ratio Oxyratio is calculated based on the imaginary in-cylinder oxygen amount mo2v, the initial in-cylinder oxygen amount mo2ini, and the target in-cylinder oxygen amount mo2tgt (step 417). Then, a Q*ratio table associated with the curves L3 and L4 shown in FIG. 30B is searched according to the oxygen ratio Oxyratio, and interpolation is carried out according to the load on the engine (more specifically, the torque TLi or the accelerator pedal opening AP) whereby the ratio parameter Q*ratio is calculated (step 418). In a step 419, the ratio parameter Q*ratio, the initial fuel injection parameter Q*ini, and the target fuel injection parameter Q*tgt are applied to the aforementioned equation (24), whereby the fuel injection parameter Q* is calculated.

On the other hand, if the imaginary in-cylinder oxygen amount mo2v has become approximately equal to the target in-cylinder oxygen amount mo2tgt (Yes to step 416), i.e. if the transition time is over, the throttle valve opening TH is controlled to the target throttle valve opening THL (step 420), and the fuel injection parameter Q* is set to the target fuel injection parameter Q*tgt (step 421), followed by terminating the present process. After the transition time is over, fuel injection control in the steady state of the engine 3 is carried out according to the engine speed Ne and the in-cylinder condition parameter [O2] based on the Q*Li,j map for use in the lean operation.

As described hereinabove, in the present embodiment, when the air-fuel ratio is switched, the fuel injection parameter Q* is progressively changed according to the initial in-cylinder oxygen amount mo2ini before switching of the air-fuel ratio, and the target in-cylinder oxygen amount mo2tgt after the switching of the air-fuel ratio, and hence it is possible to suppress toque variation occurring during switching the air-fuel ratio. More specifically, the oxygen ratio Oxyratio indicative of the degree of progress of switching of the air-fuel ratio is calculated; the ratio parameter Q*ratio is calculated according to the oxygen ratio Oxyratio; and the fuel injection parameter Q* is progressively changed using the ratio parameter Q*ratio. Since the ratio parameter Q*ratio is set according to the operating conditions of the engine, such as the oxygen ratio Oxyratio and the load on the engine, as shown in FIGS. 30A and 30B, by taking into account the changing characteristics of the output torque with respect to the air-fuel ratio, shown in FIG. 29, it is possible to suppress torque variation sufficiently irrespective of load on the engine during switching of the air-fuel ratio.

In the present embodiment, the ECU 2 determines timing for air-fuel ratio enrichment for reducing NOx or removing sulfur, i.e. timing for switching from the lean operation to the rich operation, and timing for terminating the air-fuel ratio enrichment, i.e. timing for switching from the rich operation to the lean operation, to thereby issue the air-fuel ratio switching command, and carries out the intake air amount control process and the fuel injection control process, according to the switching command. Therefore, the ECU 2 implements switching command means, part of intake air amount control means, fuel injection parameter-determining means, ratio calculating means, and ratio parameter-setting means. More specifically, the processes in FIGS. 7, 31 and 32 correspond to the fuel injection parameter-determining means, the step 397 in FIG. 31 and the step 417 in FIG. 32 correspond to the ratio-calculating mean, and the step 398 in FIG. 31 and the step 418 in FIG. 32 correspond to the ratio parameter-setting means.

Next, a description will be given of a control system according to a third embodiment of the present invention with reference to FIGS. 33 to 35. This control system is identical in hardware configuration to the control system according to the first embodiment, and hence description thereof is omitted.

In the present embodiment, similarly to the first embodiment, the ECU executes the process for calculating an in-cylinder condition parameter, shown in FIG. 3, the process for setting a Q*i,j map, shown in FIG. 4, the process for setting correction variables αi,j and βi,j, shown in FIG. 6, and the process for determining a fuel injection parameter Q*, shown in FIG. 7.

Figure 33:
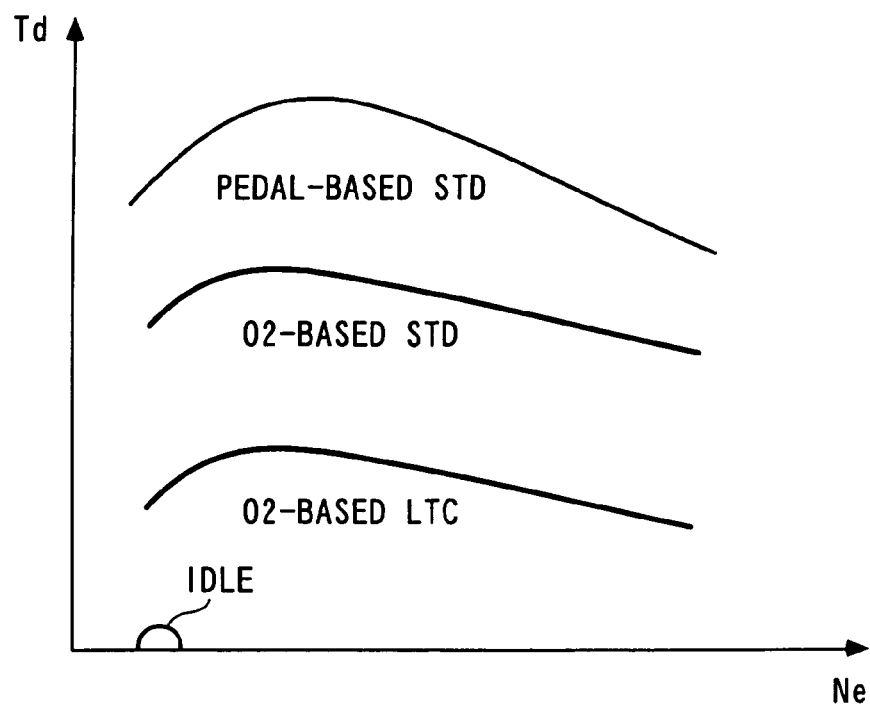
FIG. 33 is a diagram showing control regions in fuel injection control performed by a control system according to a third embodiment of the present invention.

FIG. 33 shows control regions corresponding to two combustion modes of the engine 3, that is, a low-temperature combustion mode and a normal combustion mode, on a coordinate plane defined by the engine speed Ne and demanded torque Td dependent on the accelerator pedal opening AP. An O2-based LTC control region, an O2-based STD control region, and a pedal-based STD control region are set from a low-load side in the mentioned order. More specifically, the O2-based LTC control region, the O2-based STD control region, and the pedal-based STD control region correspond to a low-load operating region, a medium-load operating region, and a high-load operating region of the engine 3. Further, the O2-based LTC control region corresponds to the low-temperature combustion mode, and the O2-based STD control region and the pedal-based STD control region correspond to the normal combustion mode. A curve LTH shown in FIG. 33 corresponds to a state in which the throttle valve 7 is fully open and the EGR valve 14b is fully closed, in other word, a border beyond which it is no longer possible to further increase the intake air amount by changing the air-adjusting parameter A*.

In the O2-based LTC control region and the O2-based STD control region, the fuel injection parameter Q* is calculated using the engine speed Ne and the in-cylinder condition parameter [O2], described hereinabove. In the following description, a fuel injection parameter-calculating map used in the O2-based LTC control region is referred to as "the Q*O2LTC map", and a fuel injection parameter-calculating map used in the O2-based STD control region is referred to as "the Q*O2STD map". Further, in the O2-based LTC control region and the O2-based STD control region, there are maps set for calculating values of the air-adjusting parameters A* adapted to these regions: an air-adjusting parameter-calculating map used in the O2-based LTC control region is referred to as "the A*LTC map", and an air-adjusting parameter-calculating map used in the O2-based STD control region is referred to as "the A*STD map". The A*LTC map is set such that the EGR rate becomes larger than in the A*STD map.

Further, in the pedal-based STD control region, a fuel injection parameter-calculating map associated with the engine speed Ne and the accelerator pedal opening AP is used. Hereinafter, the map is referred to as "the Q*PDSTD map".

The Q* O2LTC map, the Q* O2STD map, and the Q*PDSTD map are set such that air-fuel ratios realized by fuel injection executed according to set values in the respective maps are different from each other.

Next, a description will be given of transition control for controlling transition from the O2-based LTC control to the O2-based STD control, and transition control for controlling transition from the O2-based STD control to the O2-based LTC control. FIG. 34 is a diagram useful in explaining the above transition control. As shown in FIG. 34, in the case where the O2-based LTC control is being performed, as indicated by a solid line L1, when an increase in demanded torque Td (accelerator pedal opening AP) is causing an increase in the in-cylinder oxygen amount mo2, the map for use in calculation of the air-adjusting parameter A* is switched from the A*LTC map to the A*STD map when the in-cylinder oxygen amount mo2 has reached a first A* map-switching threshold value Oxy1. Then, the in-cylinder oxygen amount mo2 is increased while the output torque of the engine 3 is held such that it is approximately equal to a fixed value TH. At this time, the fuel injection parameter Q* is determined using the Q*O2LTC map such that the output torque becomes approximately equal to the fixed value TH.

When the in-cylinder oxygen amount mo2 is increased to reach a first Q* map-switching threshold value Oxy3 (>Oxy1), the map for use in calculation of the fuel injection parameter Q* is switched from the Q*O2LTC map to the Q*O2STD map.

Figure 34:
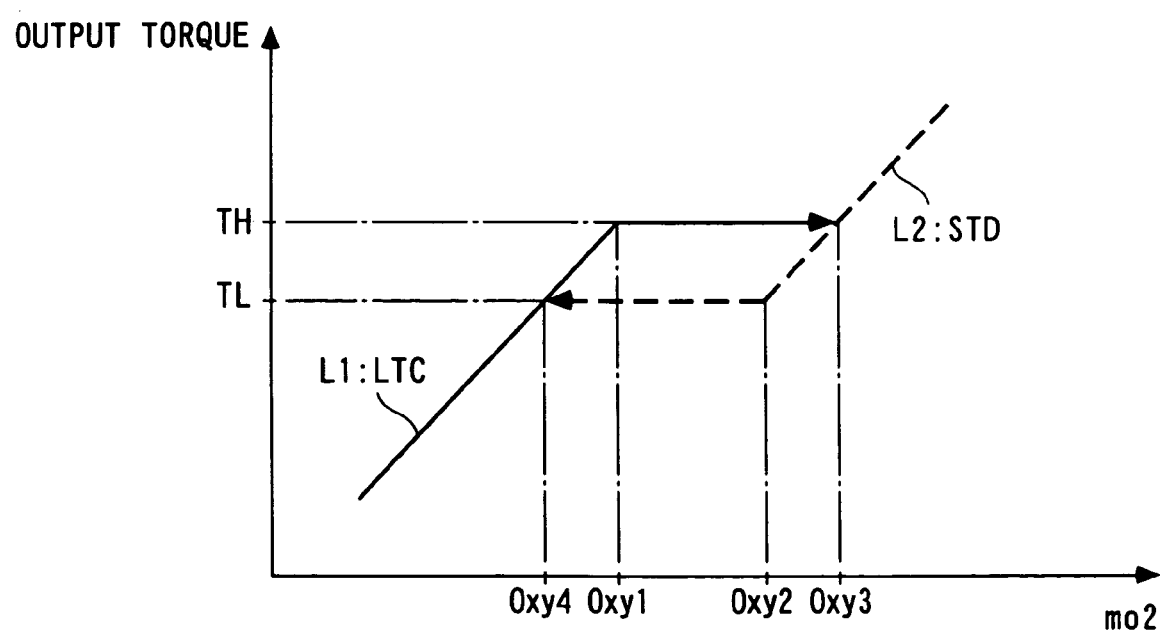
FIG. 34 is a diagram useful in explaining transition control between oxygen-based low-temperature combustion control and oxygen-based normal combustion control.

On the other hand, in the case where the O2-based STD control is being performed, as indicated by a broken line L2 in FIG. 34, when a decrease in the demanded torque Td is causing a decrease in the in-cylinder oxygen amount mo2, the map for use in calculation of the air-adjusting parameter A* is switched from the A*STD map to the A*LTC map when the in-cylinder oxygen amount mo2 has reached a second A* map-switching threshold value Oxy2 corresponding to an output torque value TL lower than the fixed value TH of output torque. Then, the in-cylinder oxygen amount mo2 is decreased while the output torque of the engine 3 is held such that it is approximately equal to the fixed value TL. At this time, the fuel injection parameter Q* is determined using the Q*O2STD map such that the output torque becomes approximately equal to the fixed value TL. Here, the second A* map-switching threshold value Oxy2 is set to a value smaller than the first Q* map-switching threshold value Oxy3.

When the in-cylinder oxygen amount mo2 is decreased to reach a second Q* map-switching threshold value Oxy4 (<Oxy2), the map for use in calculation of the fuel injection parameter Q* is switched from the Q*O2STD map to the Q*O2LTC map. Here, the second Q* map-switching threshold value Oxy4 is set to a value smaller than the first A* map-switching threshold value Oxy1.

As described above, in the present embodiment, in the case where transition from the O2-based LTC control to the O2-based STD control is performed, when the in-cylinder oxygen amount mo2 has reached the first A* map-switching threshold value Oxy1, the map for use in calculation of the air-adjusting parameter A* is switched. Then, the in-cylinder oxygen amount (intake air amount) is increased while holding the output torque from the engine 3 approximately constant, and when the in-cylinder oxygen amount mo2 has reached the first Q* map-switching threshold value Oxy3, the map for use in calculation of the fuel injection parameter Q* is switched. Further, in the case where transition from the O2-based STD control to the O2-based LTC control is performed, when the in-cylinder oxygen amount mo2 has reached the second A* map-switching threshold value Oxy2, the map for use in calculation of the air-adjusting parameter A* is switched. Then, the in-cylinder oxygen amount (intake air amount) is decreased while holding the output torque from the engine 3 approximately constant, and when the in-cylinder oxygen amount mo2 has reached the second Q* map-switching threshold value Oxy4, the map for use in calculation of the fuel injection parameter Q* is switched. This makes it possible to perform transition from the O2-based LTC control to the O2-based STD control smoothly without torque variation, and prevent the control mode from being excessively switched in response to a small amount of accelerating operation.

It should be noted that the first and second A* map-switching threshold values Oxy1 and Oxy2, and the first and second Q* map-switching threshold values Oxy3 and Oxy4 are set to optimum values by bench test. Further, to shorten time taken to increase the in-cylinder oxygen amount mo2 from the first A* map-switching threshold value Oxy1 up to the first Q* map-switching threshold value Oxy3, it is desirable to change the air-adjusting parameter A* by providing appropriate overshooting therefor. The same applies to the case of shortening time taken to decrease the in-cylinder oxygen amount mo2 from the second A* map-switching threshold value Oxy2 to the second Q* map-switching threshold value Oxy4.

Next, a description will be given of transition control for controlling transition between the O2-based STD control and pedal-based STD control.

Figure 35A:
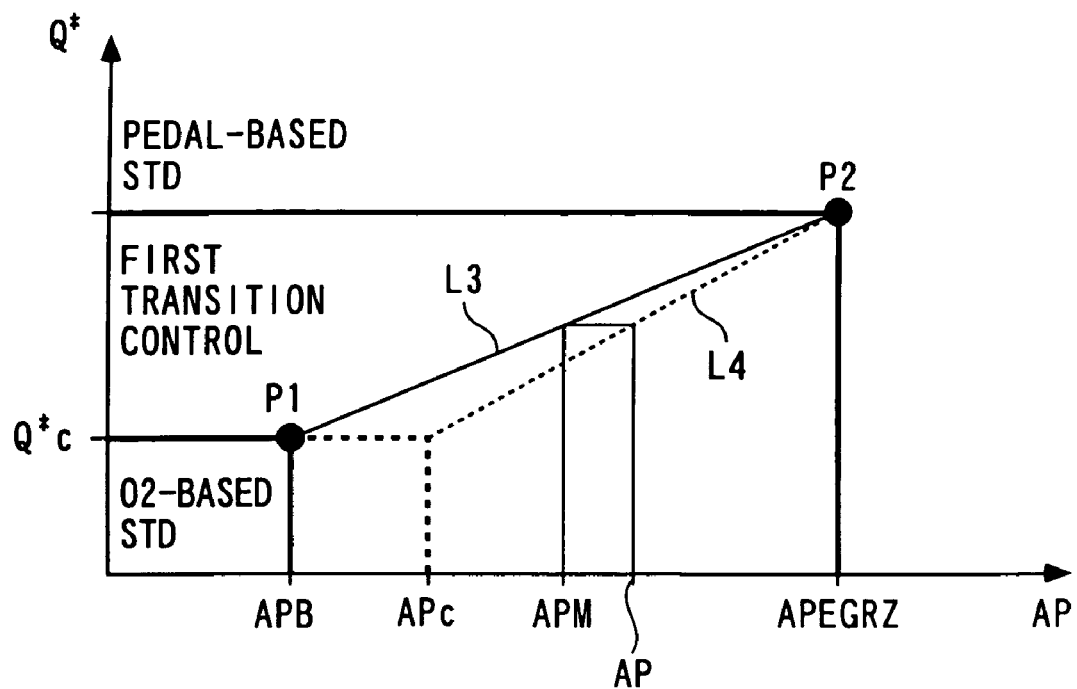
FIGS. 35A and 35B are diagrams useful in explaining transition control between the oxygen-based normal combustion control and pedal-based normal combustion control.

FIG. 35A is a diagram useful in explaining transition control for controlling transition from the O2-based STD control to the pedal-based STD control (transition control during acceleration). As shown in FIG. 35A, a first transition control region is set between the O2-based STD control region and the pedal-based STD control region. In the first transition control region, basically, the fuel injection parameter Q* is calculated using a first transition control reference map (hereinafter referred to as "the Q*O2PD map") indicated by a solid line L3. The Q*O2PD map is a map in which map values are set according to the engine speed Ne and the accelerator pedal opening AP, and in this map, the accelerator pedal opening AP is set from a reference accelerator pedal opening APB corresponding to a point P1 to a zero EGR opening APEGRZ corresponding to a point P2. The reference accelerator pedal opening APB is a value of the accelerator pedal opening AP in which the in-cylinder oxygen amount mo2 becomes equal to a critical oxygen amount mo2c in an operating condition of the engine 3 used as a reference condition (hereinafter referred to as "the reference operating condition"), and the zero EGR opening APEGRZ represents a value of the accelerator pedal opening AP in which the EGR valve 14b is fully closed in the reference operating condition. The critical oxygen amount mo2c is a maximum in-cylinder oxygen amount mo2 in the O2-based STD control region, and a fuel injection parameter Q* corresponding to the critical oxygen amount mo2c is a critical fuel injection parameter Q*c.

Since the actual operating condition of the engine 3 deviates from the reference operating condition, an accelerator pedal opening APc in which the in-cylinder oxygen amount mo2 reaches the critical oxygen amount mo2c (hereinafter referred to as "the critical accelerator pedal opening APc) assumes a value different from that of the reference accelerator pedal opening APB, e.g. as shown in FIG. 35A. Therefore, in this case, the Q*O2PD map values indicated by the solid line L3 cannot be used as reference values as they are. To overcome the problem, in the present embodiment, the accelerator pedal opening AP in the first transition control region is converted into a map-searching pedal opening APM, and the Q*O2PD map is searched according to the map-searching pedal opening APM and the engine speed Ne. This makes the use of the Q*O2PD map values substantially equivalent to the use of values of a correction map indicated by a broken line L4.

More specifically, the detected accelerator pedal opening AP is converted into the map-searching pedal opening APM e.g. by the following equation (25), and the Q*O2PD map is searched according thereto to thereby calculate the fuel injection parameter Q*. Then, when the accelerator pedal opening AP has reached the zero EGR opening APEGRZ, the fuel injection control is switched from the first transition control to the pedal-based STD control.

$$APM = APEGRZ - \frac{APEGRZ - APB}{APEGRZ - APc}(APEGRZ - AP) \quad (25)$$

According to the first transition control, it is possible to perform smooth transition from the O2-based STD control to the pedal-based STD control, when the accelerator pedal is stepped on more deeply for acceleration. Further, the detected accelerator pedal opening AP is converted into the map-searching pedal opening APM based on the critical accelerator pedal opening APc, which is a value of the accelerator pedal opening assumed when the in-cylinder oxygen amount mo2 has reached the critical oxygen amount mo2c, to thereby search the Q*O2PD map according to the map-searching pedal opening APM. This makes it possible to perform smooth transition to the pedal-based STD control, even if the operating condition of the engine 3 deviates from the reference operating condition.

Figure 35B:
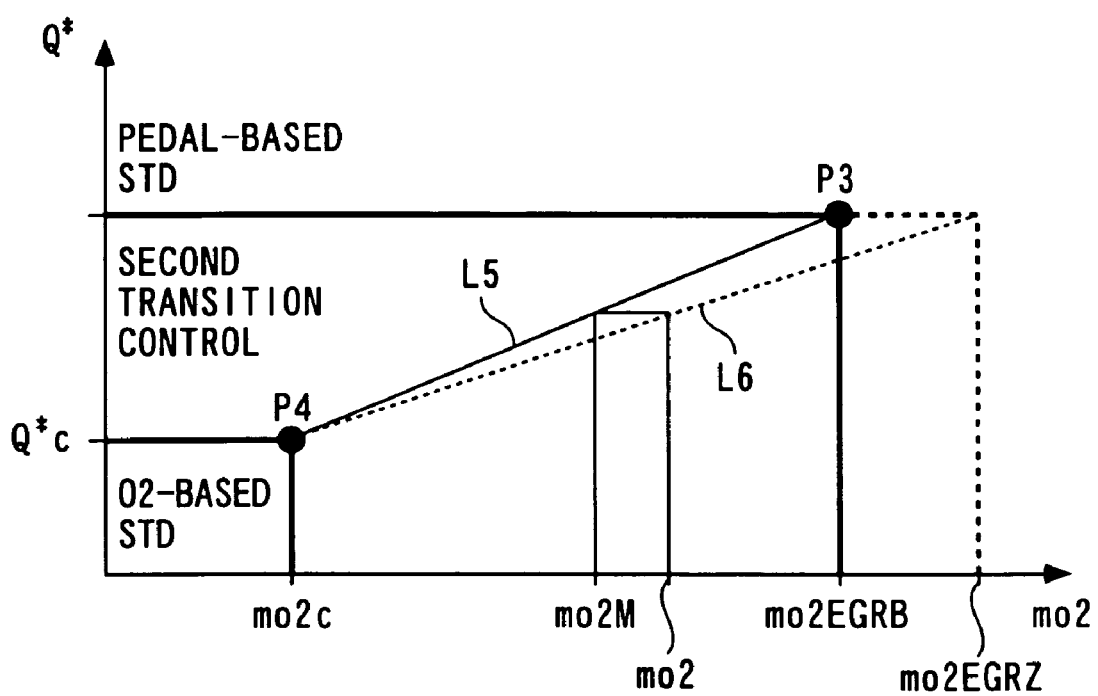

FIG. 35B is a diagram useful in explaining transition control for controlling transition from the pedal-based STD control to the O2-based STD control (transition control during deceleration). As shown in FIG. 35B, a second transition control region is set between the O2-based STD control region and the pedal-based STD control region. In the second transition control region, basically, the fuel injection parameter Q* is calculated using a second transition control reference map (hereinafter referred to as "the Q*PDO2map") indicated by a solid line L5. The Q*PDO2 map is a map in which map values are set according to the engine speed Ne and the in-cylinder oxygen amount mo2. In this map, the in-cylinder oxygen amount mo2 covers a range from a reference zero EGR oxygen amount mo2EGRB corresponding to a point P3 to the critical oxygen amount mo2c corresponding to a point P4. The reference zero EGR oxygen amount mo2EGRB is an in-cylinder oxygen amount mo2 to be assumed when the accelerator pedal opening AP is equal to the zero EGR opening APEGRZ.

Since the actual operating condition of the engine 3 deviates from the reference operating condition, an in-cylinder oxygen amount mo2EGRZ assumed when the accelerator pedal opening AP has become equal to the zero EGR opening APEGRZ (hereinafter referred to as "the zero EGR oxygen amount mo2EGRZ"), for example, assumes a value different from that of the reference zero EGR oxygen amount mo2EGRB, e.g. as shown in FIG. 35B. Therefore, in this case, the Q*PDO2 map values indicated by the solid line L5 cannot be used as reference values as they are. To overcome this problem, in the present embodiment, the in-cylinder oxygen amount mo2 in the second transition control region is converted into a map-searching oxygen amount mo2M, and the Q*PDO2 map is searched according to the map-searching oxygen amount mo2M and the engine speed Ne. This makes the use of the Q*PDO2 map values substantially equivalent to the use of values of a correction map indicated by a broken line L6.

More specifically, the calculated in-cylinder oxygen amount mo2 is converted into the map-searching oxygen amount mo2M e.g. by the following equation (26), and the Q*PDO2 map is searched according to the map-searching oxygen amount mo2M to thereby calculate the fuel injection parameter Q*. Then, when the in-cylinder oxygen amount mo2 has reached the critical oxygen amount mo2c, the fuel injection control is switched from the second transition control to the O2-based STD control.

$$mo2M = mo2c + \frac{mo2EGRB - mo2c}{mo2EGRZ - mo2c}(mo2 - mo2c) \quad (26)$$

According to the second transition control, it is possible to perform smooth transition from the pedal-based STD control to the O2-based STD control, when the accelerator pedal is returned for deceleration. Further, the in-cylinder oxygen amount mo2 calculated as required is converted into the map-searching oxygen amount mo2M, based on the zero EGR oxygen amount mo2EGRZ, which is an in-cylinder oxygen amount to be obtained when the accelerator pedal opening AP has become equal to the zero EGR opening APEGRZ, to thereby search the Q*PDO2 map according to the map-searching oxygen amount mo2M. This makes it possible to perform smooth transition to the O2-based STD control, even if the operating condition of the engine 3 deviates from the reference operating condition.

When the accelerator pedal is stopped during execution of the first transition control or the second transition control, the fuel injection parameter Q* calculated when the accelerator pedal is stopped is held, and when the accelerator pedal starts to be moved again, the direction of the subsequent transition control is determined according to the polarity of the time derivative value of the accelerator pedal opening AP. More specifically, if the accelerator pedal is stopped during execution of the first transition control, and thereafter the accelerator pedal opening AP starts to be increased again, transition control toward the point P2 is continued. On the other hand, if the accelerator pedal opening AP starts to be decreased after stoppage of the accelerator pedal, transition control for returning to the point P1 is executed. Further, if the accelerator pedal is stopped during execution of the second transition control, and thereafter the accelerator pedal opening AP starts to be decreased again, transition control toward the point P4 is continued. On the other hand, if the accelerator pedal opening AP starts to be increased after stoppage of the accelerator pedal, transition control for returning to the point P3 is executed.

It should be noted that the present invention is not limited to the embodiments described above, but can be practiced in various forms. For example, although in the above-described embodiments, the estimated value Fe_hat of the EGR gas flow rate is calculated by taking only the first-order lag in response of the EGR system 14 into account, it is to be understood that an appropriate model other than this may be employed. Further, although the optimum combustion state for setting the fuel injection parameter Q* is determined by bench test, this determination may be performed using an appropriate combustion model. Furthermore, although in the in-cylinder pressure F/B control, the injection time period De and the injection timing TMe out of the parameters constituting the fuel injection parameter Q* are corrected, the injection pressure Pe may be corrected in addition thereto or in place thereof.

Further, although the fuel injection parameter Q* is comprised of the injection time period De, the injection timing TMe, and the injection pressure Pe, it may be formed by one or two of these parameters. Furthermore, although in the above embodiment, the present invention is applied to control of the diesel engine by way of example, this is not limitative, but it may be applied to control of other types of internal combustion engine, such as gasoline engines.

Moreover, the present invention can be applied to control of engines for ship propulsion machines, such as outboard motors having a vertically-disposed crankshaft.

It is further understood by those skilled in the art that the foregoing are preferred embodiments of the invention, and that various changes and modifications may be made without departing from the spirit and scope thereof.

What is claimed is:

1. A control system for an internal combustion engine that draws air into a cylinder via an intake system, supplies fuel injected from an injector into the cylinder, and recirculates part of exhaust gases emitted from the engine to the intake system as EGR gases by an EGR system, comprising:
    intake air amount control means for controlling an amount of intake air drawn into the cylinders via the intake system;
    intake air amount-detecting means for detecting the amount of intake air;
    EGR gas flow rate-estimating means for estimating a flow rate of EGR gases according to response delay of recirculation of the EGR gases by the EGR system;
    in-cylinder oxygen amount-estimating means for estimating an amount of oxygen existing in the cylinder, based on the detected intake air amount and the estimated flow rate of EGR gases;
    engine speed-detecting means for detecting a rotational speed of the engine;
    fuel injection parameter-determining means for determining a fuel injection parameter based on the detected rotational speed of the engine and the estimated in-cylinder oxygen amount; and
    injector control means for controlling the injector based on the determined fuel injection parameter.

2. A control system as claimed in claim 1, wherein the fuel injection parameter comprises at least one of an injection time period, injection timing, and injection pressure of the injector.

3. A control system as claimed in claim 2, further comprising:
    fuel injection parameter-setting means for setting in advance the fuel injection parameter according to the rotational speed of the engine and the in-cylinder oxygen amount; and
    fuel injection parameter-storing means for storing the set fuel injection parameter, and
    wherein said fuel injection parameter-determining means determines the fuel injection parameter by reading out the fuel injection parameter from said fuel injection parameter-storing means according to the rotational speed of the engine and the estimated in-cylinder oxygen amount.

4. A control system as claimed in claim 3, further comprising:
    transient state-determining means for determining whether or not the engine is operated in a transient state; and in-cylinder oxygen amount-correcting means for correcting the in-cylinder oxygen amount when the engine is operated in the transient state, and wherein said fuel injection parameter-determining means determines the fuel injection parameter by reading out the fuel injection parameter from said fuel injection parameter-storing means according to the rotational speed of the engine and the corrected in-cylinder oxygen amount.

5. A control system as claimed in claim 1, further comprising:

accelerator pedal stepped-on amount-detecting means for detecting a stepped-on amount of an accelerator pedal; and load-detecting means for detecting load on the engine, wherein said fuel injection parameter-determining means determines the fuel injection parameter based on the rotational speed of the engine and the detected stepped-on amount of the accelerator pedal in place of the rotational speed of the engine and the in-cylinder oxygen amount, when the detected load on the engine is higher than a predetermined value.

6. A control system as claimed in claim 1, further comprising:

combustion state-detecting means for detecting a combustion state of the engine; and fuel injection parameter-correcting means for correcting the fuel injection parameter according to the detected combustion state of the engine.

7. A control system as claimed in claim 6, further comprising corrected fuel injection parameter-storing means for storing the corrected fuel injection parameter, and wherein said fuel injection parameter-determining means determines the fuel injection parameter by reading out the corrected fuel injection parameter from said corrected fuel injection parameter-storing means.

8. A control system as claimed in claim 1, further comprising:

oxygen concentration-detecting means for detecting concentration of oxygen in exhaust gases; and intake air amount-correcting means for correcting the intake air amount according to the detected oxygen concentration.

9. A control system as claimed in claim 1, further comprising switching command means for instructing switching of an air-fuel ratio of a mixture to be burned in the cylinder from a lean air-fuel ratio to a rich air-fuel ratio, or switching thereof from the rich air-fuel ratio to the lean air-fuel ratio, and wherein when said switching command means instructs switching of the air-fuel ratio, said fuel injection parameter-determining means determines the fuel injection parameter such that the fuel injection parameter is progressively changed, according to the estimated in-cylinder oxygen amount before the switching of the air-fuel ratio, and a target in-cylinder oxygen amount after the switching of the air-fuel ratio.

10. A control system as claimed in claim 1, wherein said fuel injection parameter-determining means determines the fuel injection parameter by searching a fuel injection parameter map according to the detected engine speed and the estimated in-cylinder oxygen amount, wherein the fuel injection parameter map comprises a fuel injection parameter map for use in low-temperature combustion, which is adapted to a low-load operating region of the engine, and a fuel injection parameter map for use in normal combustion, which is adapted to an operating region on a higher-load side than the low-load operating region, and wherein said fuel injection parameter-determining means switches the fuel injection parameter map by providing a hysteresis between switching of the fuel injection parameter map from the fuel injection parameter map for use in low-temperature combustion to the fuel injection parameter map for use in normal combustion, and switching of the fuel injection parameter map from the fuel injection parameter map for use in normal combustion to the fuel injection parameter map for use in low-temperature combustion.

11. A control system as claimed in claim 10, further comprising air-adjusting parameter-calculating means for calculating an air-adjusting parameter for control of the intake air amount by searching an air-adjusting parameter map according to an operating condition of the engine, wherein said intake air amount control means controls the intake air amount according to the calculated air-adjusting parameter, wherein the air-adjusting parameter map comprises an air-adjusting parameter map for use in low-temperature combustion, which is adapted to the low-load operating region of the engine, and an air-adjusting parameter map for use in normal combustion, which is adapted to the operating region on the higher-load side, and wherein in a case where said air-adjusting parameter-calculating means is using the air-adjusting parameter map for use in low-temperature combustion, when the in-cylinder oxygen amount has reached a first threshold value, said air-adjusting parameter-calculating means switches the air-adjusting parameter map to the air-adjusting parameter map for use in normal combustion, whereas in a case where said air-adjusting parameter-calculating means is using the air-adjusting parameter map for use in normal combustion, when the in-cylinder oxygen amount has reached a second threshold value, which is larger than the first threshold value, and in which output torque of the engine becomes smaller than output torque thereof corresponding to the first threshold value, said air-adjusting parameter-calculating means switches the air-adjusting parameter map to the air-adjusting parameter map for use in low-temperature combustion.

12. A control system as claimed in claim 11, wherein in a case where said fuel injection parameter-determining means is using the fuel injection parameter map for use in low-temperature combustion, when the air-adjusting parameter map has been switched to the air-adjusting parameter map for use in normal combustion, said fuel injection parameter-determining means determines the fuel injection parameter such that the output torque of the engine is held approximately constant until the in-cylinder oxygen amount reaches a third threshold value larger than the second threshold value, and switches the fuel injection parameter map to the fuel injection parameter map for use in normal combustion when the in-cylinder oxygen amount has reached the third threshold value, whereas in a case where said fuel injection parameter-determining means is using the fuel injection parameter map for use in normal combustion, when the air-adjusting parameter map has been switched to the air-adjusting parameter map for use in low-temperature combustion, said fuel injection parameter-determining means determines the fuel injection parameter such that the output torque of the engine is held approximately constant until the in-cylinder oxygen amount reaches a fourth threshold value smaller than the first threshold value, and switches the fuel injection parameter map to the fuel injection parameter map for use in low-temperature combustion when the in-cylinder oxygen amount has reached the fourth threshold value.

13. A control system as claimed in claim 1, further comprising accelerator pedal stepped-on amount-detecting means for detecting a stepped-on amount of an accelerator pedal of a vehicle driven by the engine, wherein said fuel injection parameter-determining means determines the fuel injection parameter by searching a first fuel injection parameter map according to the detected engine speed and the estimated in-cylinder oxygen amount when the engine is in a first operating region, whereas when the engine is in a second operating region on a higher-load side than the first operating region, said fuel injection parameter-determining means determines the fuel injection parameter by searching a second fuel injection parameter map according to the detected engine speed and accelerator pedal stepped-on amount, and wherein said fuel injection parameter-determining means determines the fuel injection parameter by using a first transition control map having the fuel injection parameter set according to the engine speed and the accelerator pedal stepped-on amount, when the first fuel injection parameter map is switched to the second fuel injection parameter map, whereas when the second fuel injection parameter map is switched to the first fuel injection parameter map, said fuel injection parameter-determining means determines the fuel injection parameter by using a second transition control map having the fuel injection parameter set according to the engine speed and the in-cylinder oxygen amount.

14. A control system as claimed in claim 13, wherein when using the first transition control map, said fuel injection parameter-determining means corrects the detected accelerator pedal stepped-on amount according to a value of the accelerator pedal stepped-on amount to be assumed when the in-cylinder oxygen amount has reached a predetermined threshold value of the oxygen amount, and searches the first transition control map according to the corrected accelerator pedal stepped-on amount, whereas when using the second transition control map, said fuel injection parameter-determining means corrects the in-cylinder oxygen amount according to a value of the in-cylinder oxygen amount to be assumed when the accelerator pedal stepped-on amount has reached a predetermined threshold value of the accelerator pedal stepped-on amount, and searches the second transition control map according to the corrected in-cylinder oxygen amount.

* * * * *